United States Patent
Kavaler et al.

(10) Patent No.: US 10,788,580 B1
(45) Date of Patent: *Sep. 29, 2020

(54) POSITION AND/OR DISTANCE MEASUREMENT, PARKING AND/OR VEHICLE DETECTION, APPARATUS, NETWORKS, OPERATIONS AND/OR SYSTEMS

(71) Applicants: Robert Kavaler, Kensington, CA (US); Luca Fusina, Verona (IT)

(72) Inventors: Robert Kavaler, Kensington, CA (US); Luca Fusina, Verona (IT)

(73) Assignee: SENSYS NETWORKS, Berkeley, CA (US)

( * ) Notice: Subject to any disclaimer, the term of this patent is extended or adjusted under 35 U.S.C. 154(b) by 660 days.

This patent is subject to a terminal disclaimer.

(21) Appl. No.: 15/238,676

(22) Filed: Aug. 16, 2016

(51) Int. Cl.
| | |
|---|---|
| *G01S 13/93* | (2020.01) |
| *G08G 1/14* | (2006.01) |
| *G01S 13/02* | (2006.01) |
| *G01S 7/00* | (2006.01) |
| *G01S 7/40* | (2006.01) |
| *G01S 13/931* | (2020.01) |

(52) U.S. Cl.
CPC ............ *G01S 13/931* (2013.01); *G01S 7/003* (2013.01); *G01S 7/4004* (2013.01); *G01S 13/0209* (2013.01); *G08G 1/14* (2013.01); *G01S 2013/9314* (2013.01)

(58) Field of Classification Search
CPC .. G01S 13/931; G01S 7/4004; G01S 13/0209; G01S 7/003; G01S 2013/9314; G08G 1/14

USPC .......................................................... 342/21
See application file for complete search history.

(56) References Cited

U.S. PATENT DOCUMENTS

| | | | |
|---|---|---|---|
| 7,899,583 B2* | 3/2011 | Mendelson | G08G 1/14 701/1 |
| 2005/0116855 A1* | 6/2005 | Toennesen | G01S 13/582 342/70 |
| 2007/0177011 A1* | 8/2007 | Lewin | B62D 15/0285 348/118 |
| 2008/0266138 A1* | 10/2008 | Ponert | G08G 1/04 340/932.2 |

(Continued)

FOREIGN PATENT DOCUMENTS

WO    WO2013049418    *   4/2013

*Primary Examiner* — Frank J McGue
(74) *Attorney, Agent, or Firm* — Earle Jennings

(57) ABSTRACT

The following are disclosed: Vehicle parking detection, sensors and an On-Board Device (OBD) to create a parking session. Radars, microwave antennas, rechargeable power supplies and their power management circuits. A localized communications protocol between the wireless nodes and repeaters within a wireless network is disclosed. Wireless sensors and wireline sensors. The networks and/or systems may support parking spot management/monitoring, vehicle traffic analysis and/or management of stationary and/or moving vehicles, monitor storage areas and/or manage production facilities. These networks and/or systems may be operated to generate reports of incorrectly parked vehicles, such as reserved parking spots for other vehicles, vehicles parked in multiple parking spots and/or overstaying the time they are permitted to park.

16 Claims, 36 Drawing Sheets

(56) References Cited

U.S. PATENT DOCUMENTS

| | | | |
|---|---|---|---|
| 2013/0073350 A1* | 3/2013 | Blustein | G08G 1/14 705/13 |
| 2014/0225763 A1* | 8/2014 | Kavaler | G08G 1/142 342/70 |
| 2017/0232961 A1* | 8/2017 | Gusikhin | B60W 30/06 701/23 |

* cited by examiner

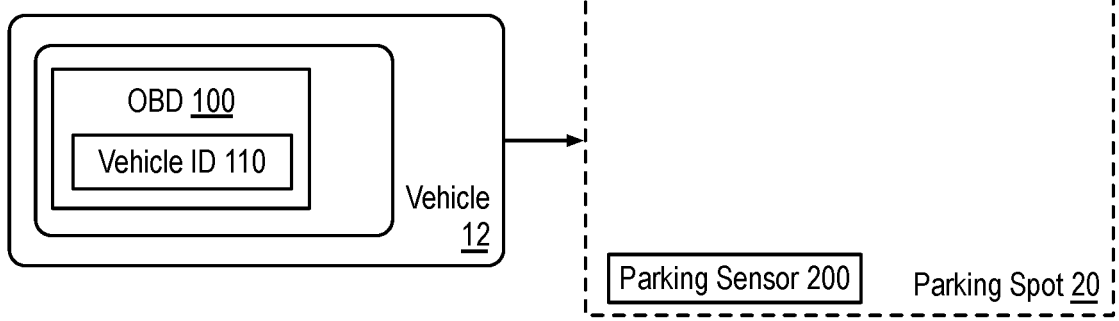
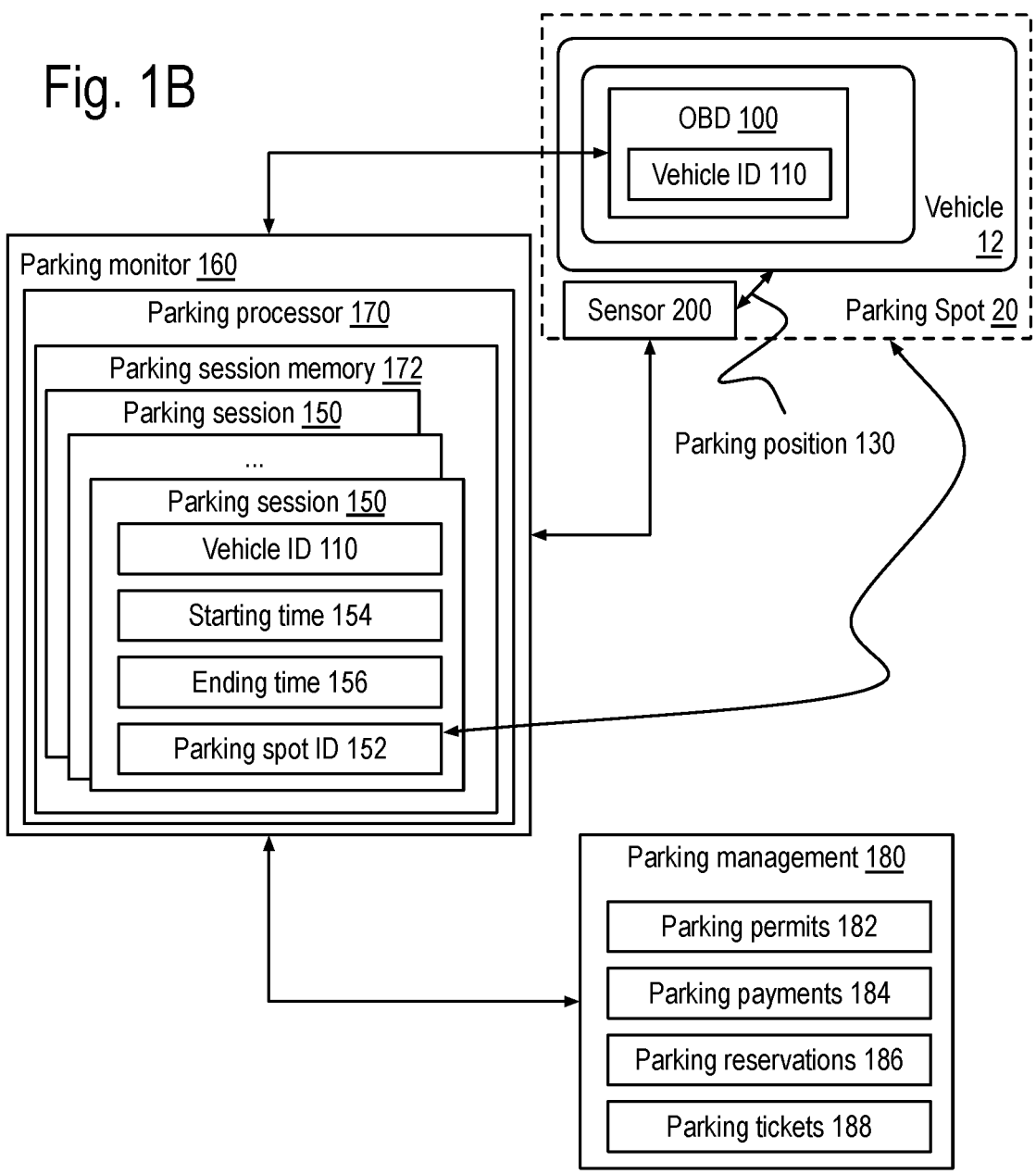

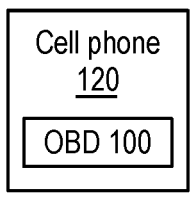 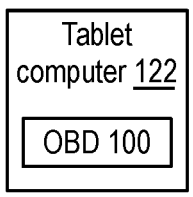 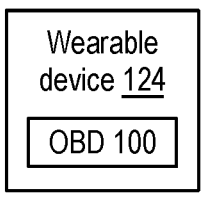 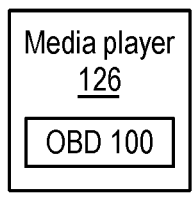
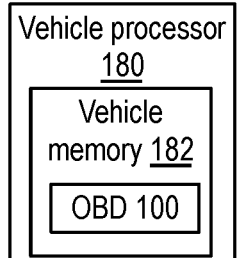 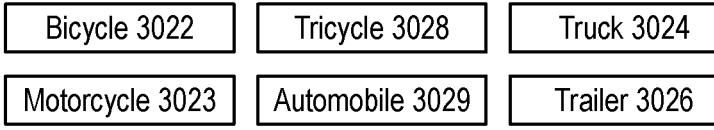
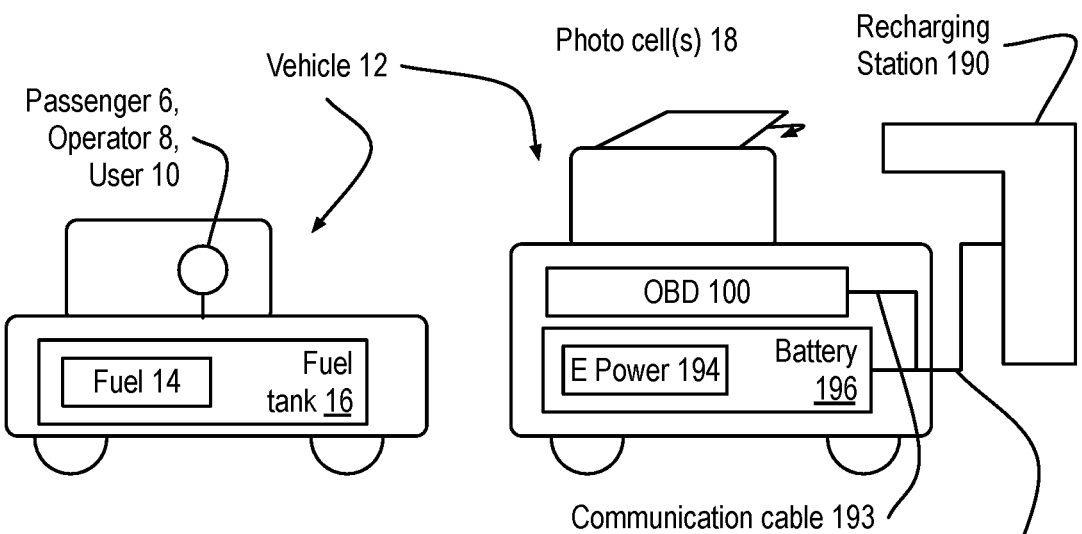

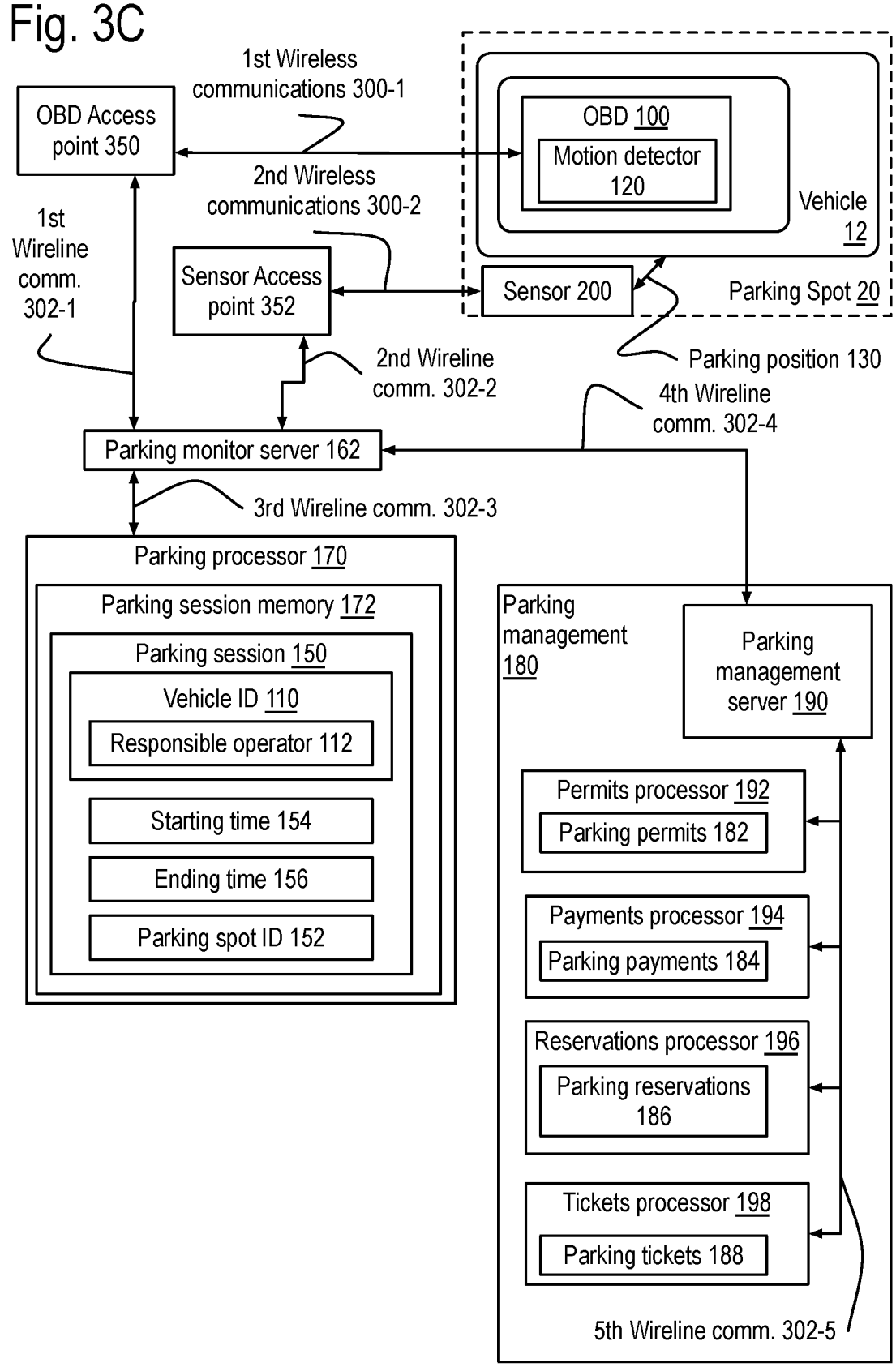

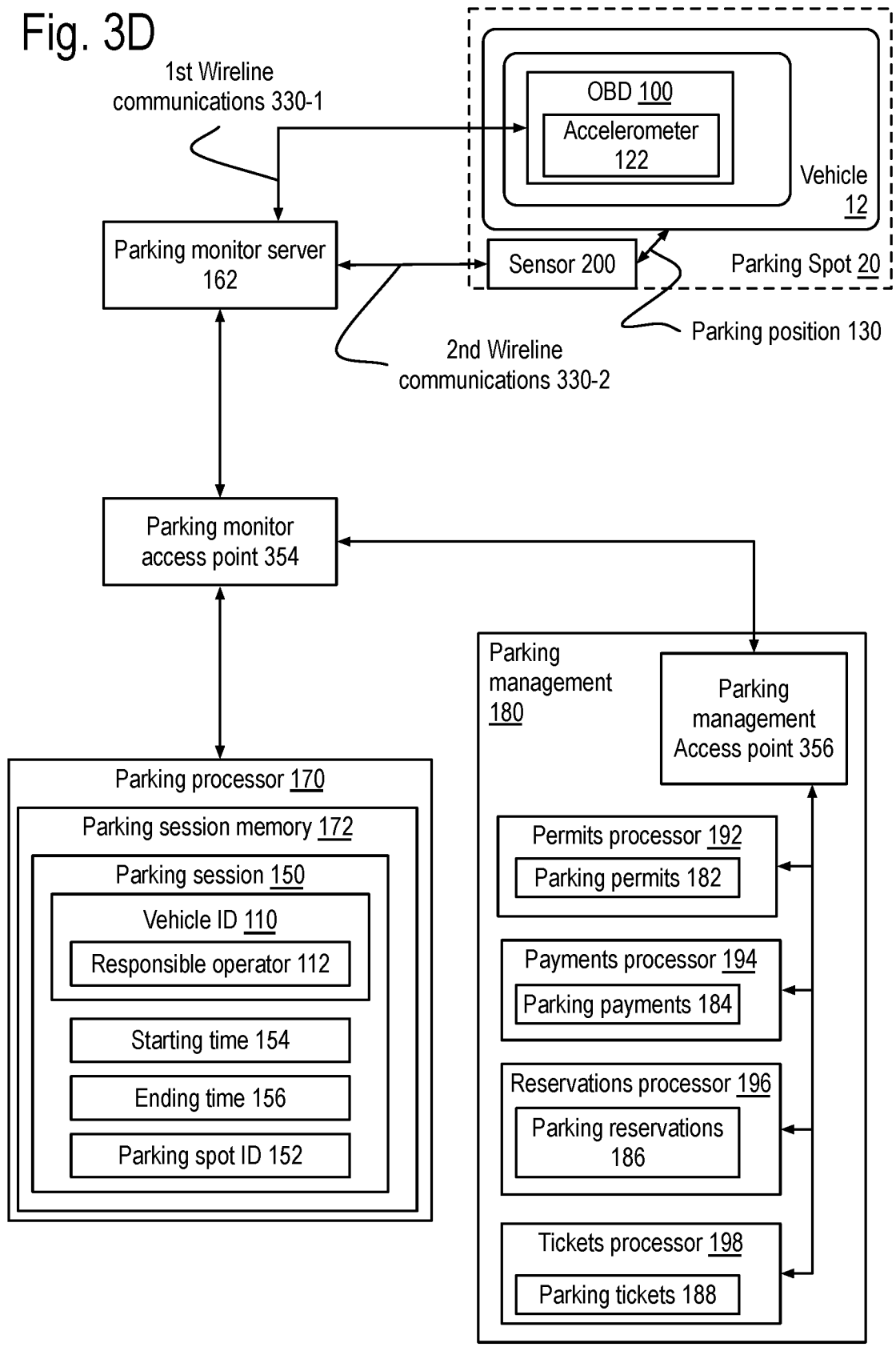

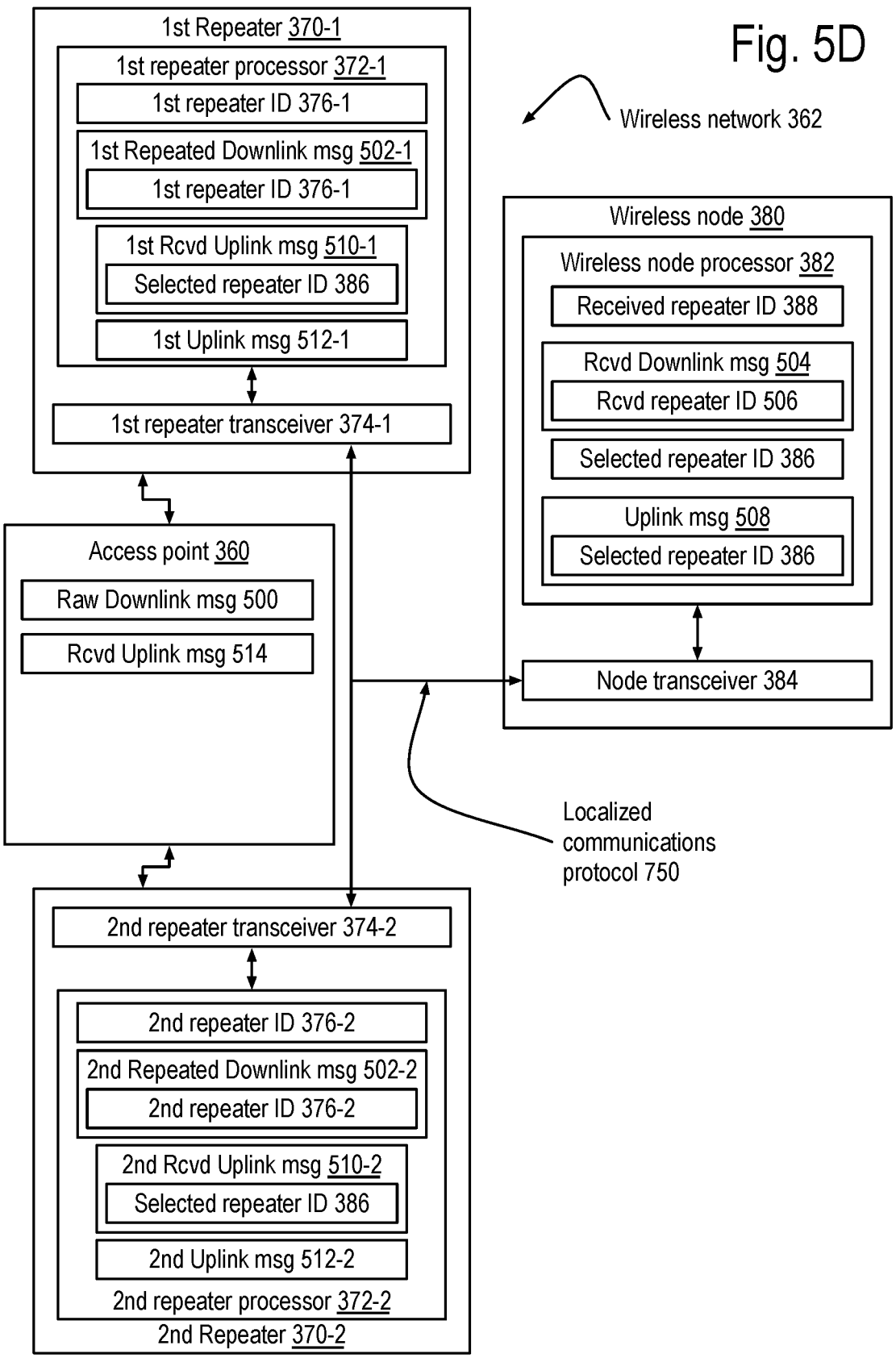

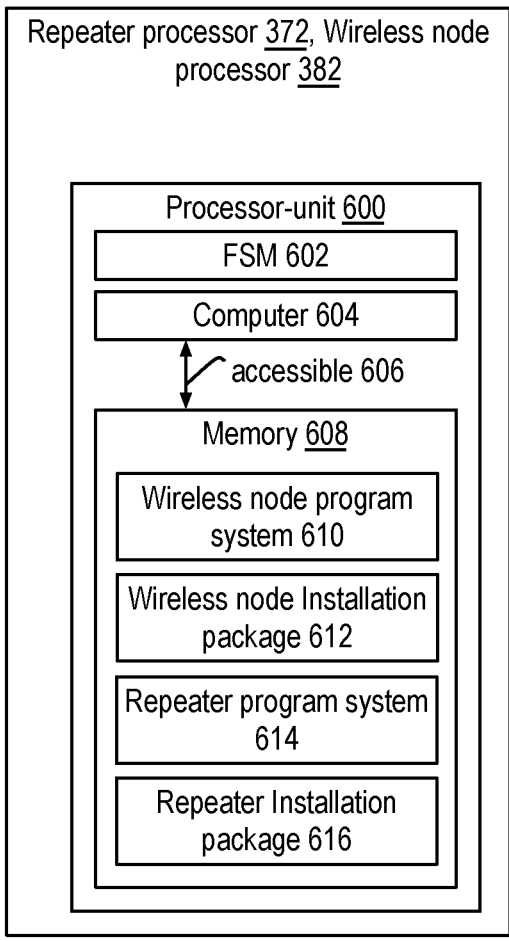
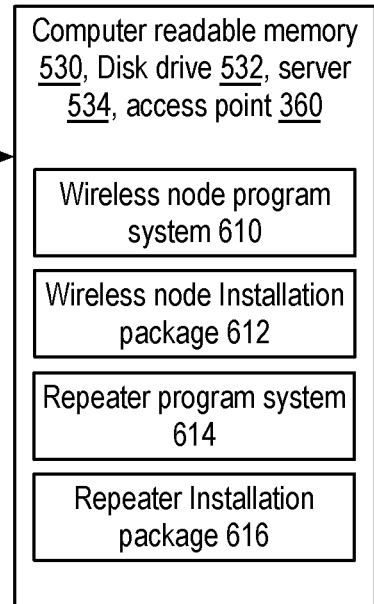
Fig. 6A
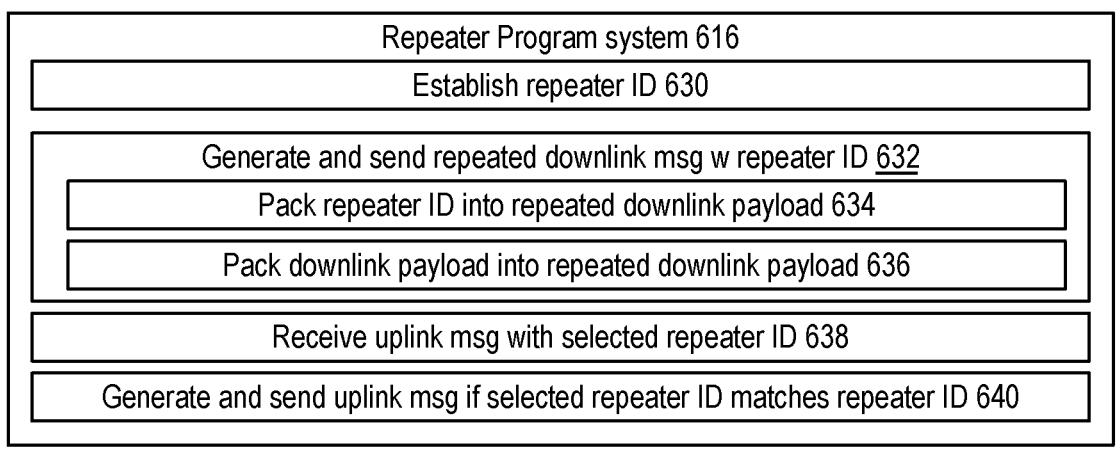
Fig. 6B

Fig. 7C
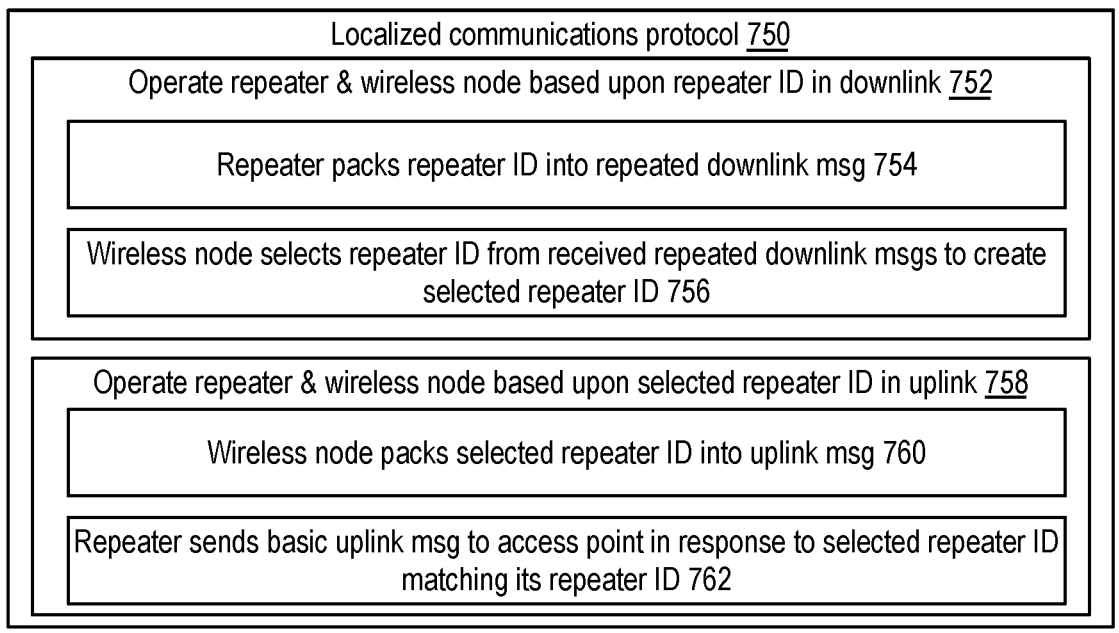
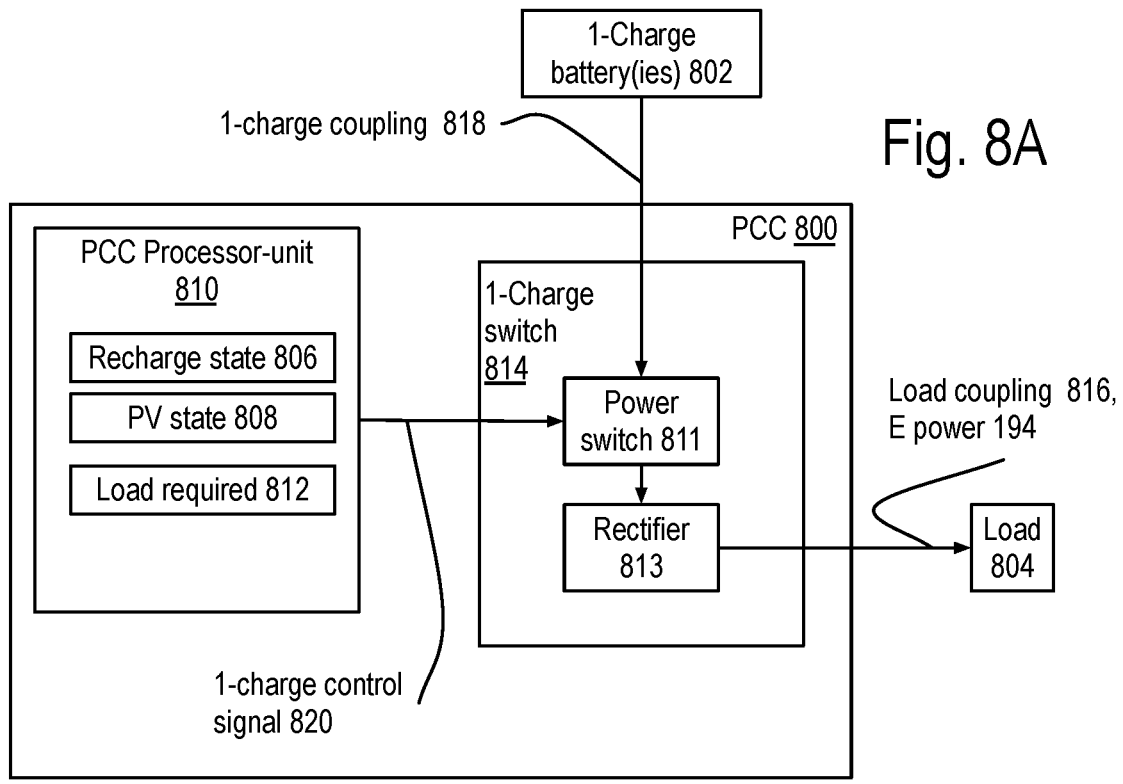
Fig. 8A

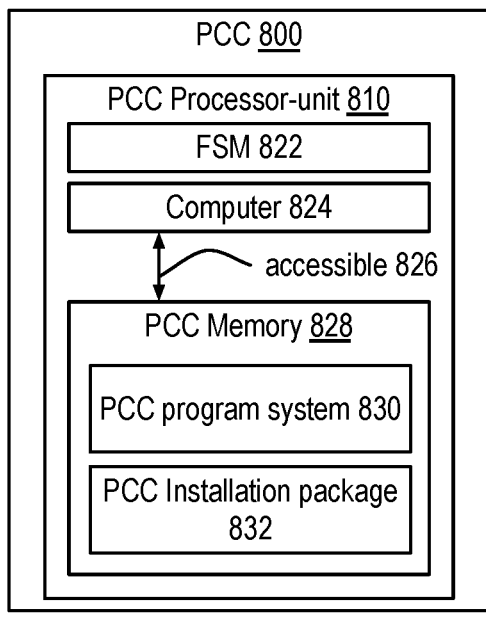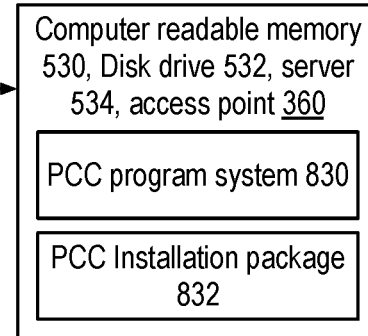
Fig. 8B
Fig. 8C
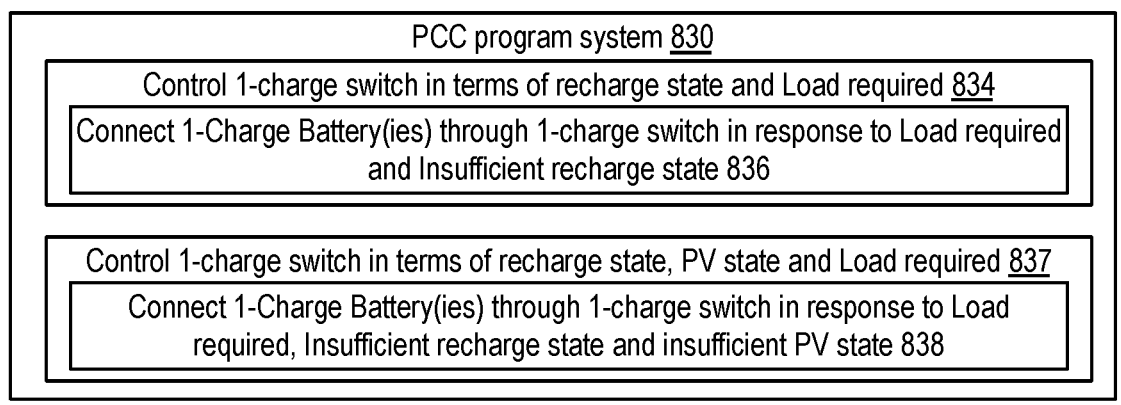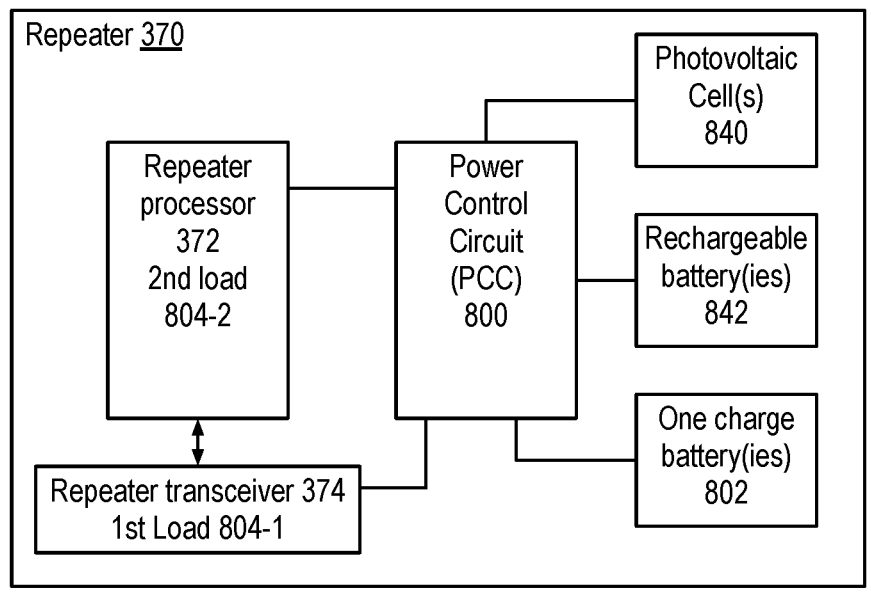
Fig. 8D

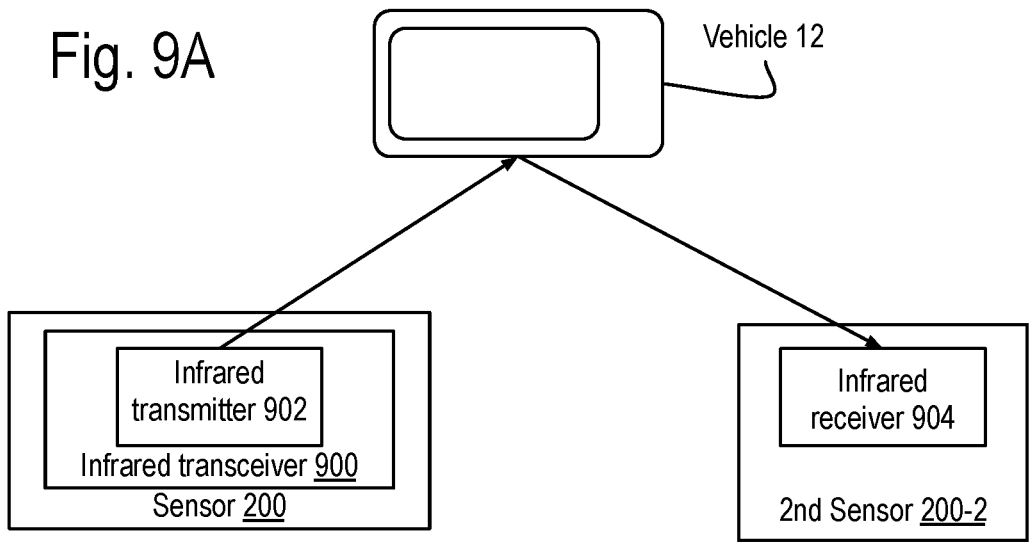
Fig. 9A
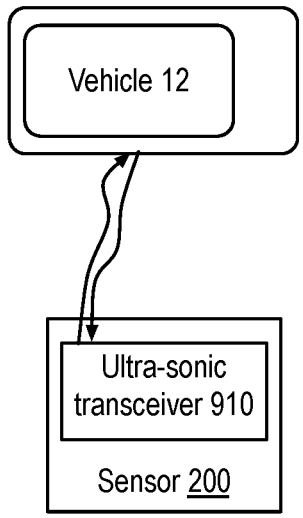
Fig. 9B
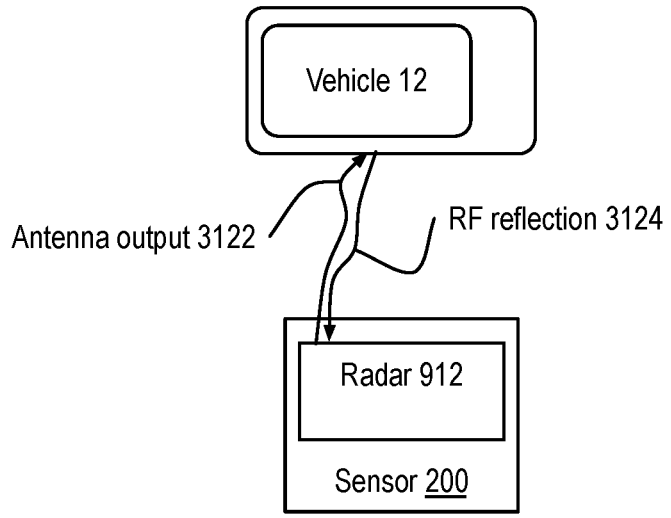
Fig. 9C
Fig. 9D
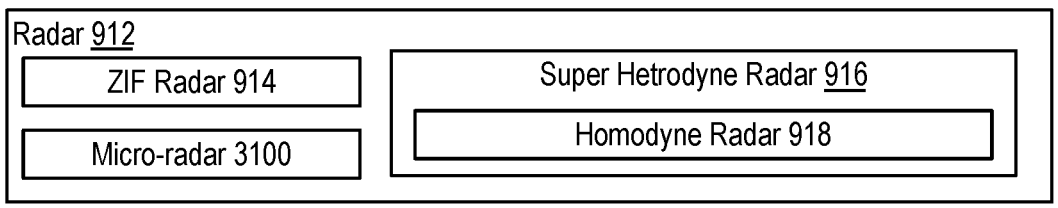

Fig. 11E
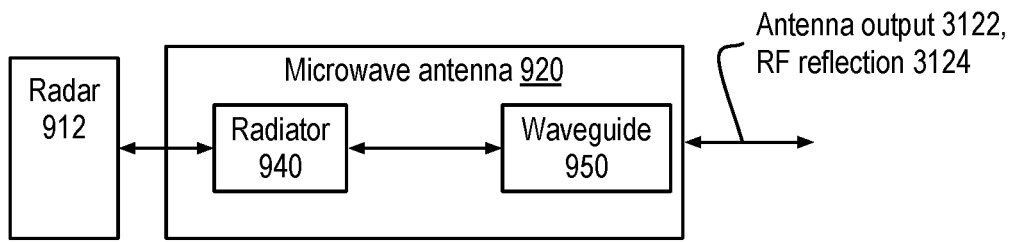
Fig. 11F
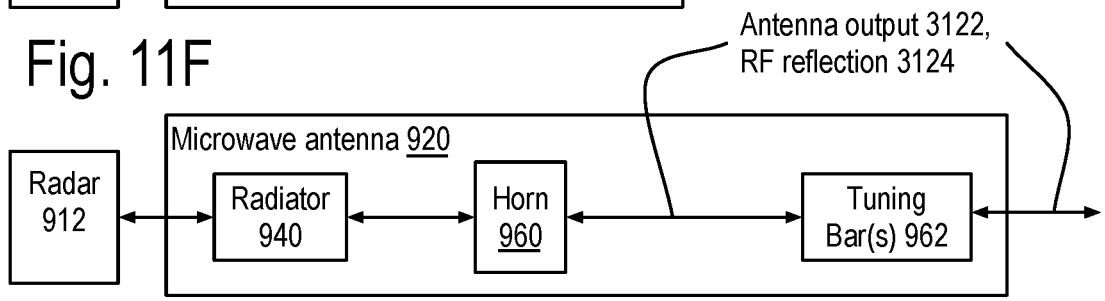
Fig. 11G
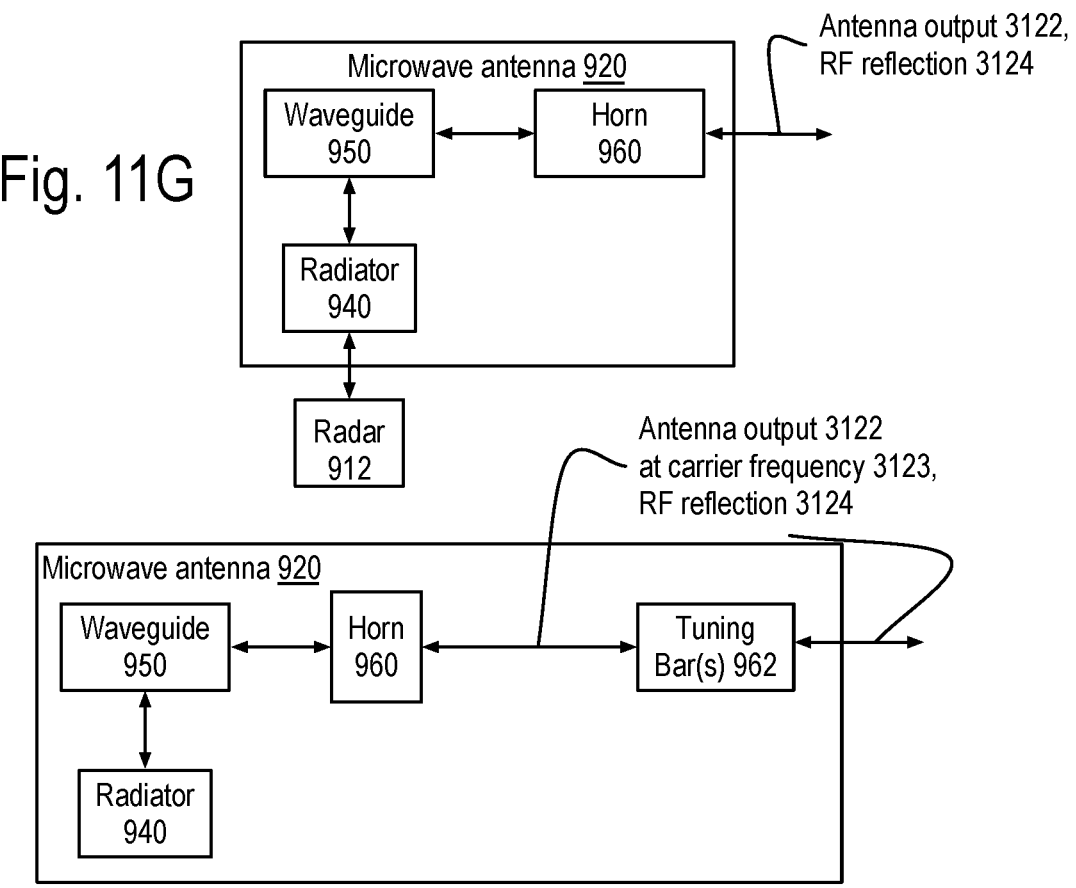
Fig. 11H

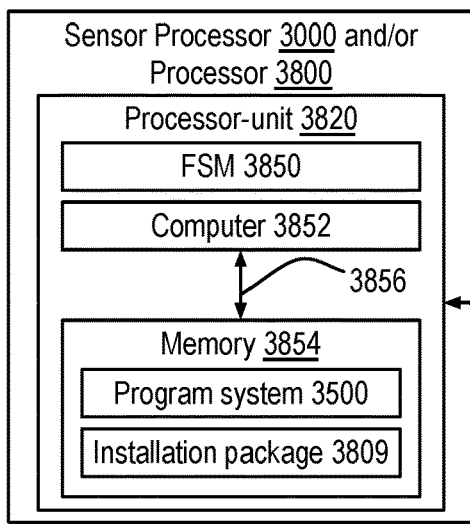
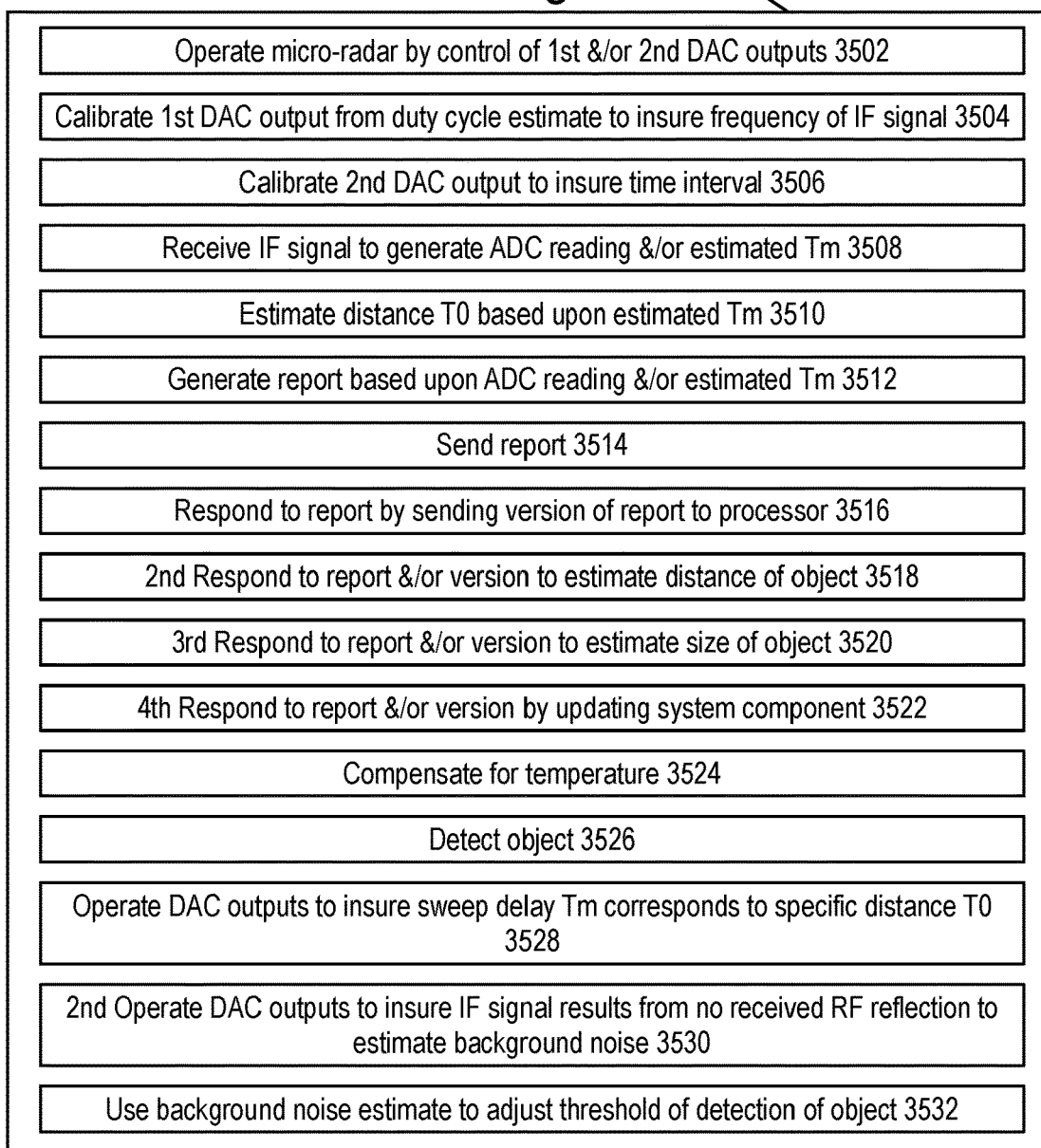

POSITION AND/OR DISTANCE MEASUREMENT, PARKING AND/OR VEHICLE DETECTION, APPARATUS, NETWORKS, OPERATIONS AND/OR SYSTEMS

CROSS REFERENCE TO RELATED PATENT APPLICATIONS

This application claims priority to
Provisional patent application No. 61/539,909, filed Sep. 27, 2011, entitled "Solar/Primary Power Apparatus and Method",
Provisional patent application No. 61/581,620 filed Dec. 29, 2011, entitled "Micro-Radar, Micro-Radar Sensor Nodes, Networks and Systems",
Provisional patent application No. 61/582,157, filed Dec. 30, 2011, entitled "Wireless and Wireline Sensor Nodes, Micro-Radar, Networks and Systems",
Provisional patent application No. 61/623,044, filed Apr. 11, 2012, entitled "Micro-Radar, Micro-Radar Sensor Nodes, Networks and Systems",
Provisional patent application No. 61/676,893, filed Jul. 28, 2012, entitled "Micro-Radar, Micro-Radar Sensor Nodes, Networks and Systems",
Provisional patent application No. 61/669,643, filed Jul. 9, 2012, entitled "Detecting a Parking Session",
Provisional patent application No. 61/671,630, filed Jul. 13, 2012, entitled "Detecting a Parking Session",
Provisional patent application No. 61/676,893, filed Jul. 28, 2012, entitled "Micro-Radar, Micro-Radar Sensor Nodes, Networks and Systems", and
Provisional patent application No. 61/706,709, filed Sep. 27, 2012, entitled "Position and/or Distance Measurement, Parking and/or Vehicle Detection, Apparatus, Networks, Operations and/or Systems",
each which is incorporated herein in their entirety.

TECHNICAL FIELD

This disclosure relates to vehicle parking detection that may interact with sensors and an On-Board Device (OBD) to create a parking session. The parking session may identify the vehicle parked in one or more parking spots. This disclosure also relates to radars, microwave antennas, rechargeable power supplies and their power management circuits, that may be used in sensors. The sensors may operate as nodes in a network. The network may employ at least one wireline communications protocol and/or at least one wireless communications protocol. This disclosure also relates to localized communications protocols between the wireless nodes and repeaters within a wireless network. The wireless sensors may be adapted for use in the ground of a parking area and/or parking strip and/or roadway. Alternatively, sensors may be adapted for installation into posts, walls, ceilings and/or poles near the parking spots. The networks and/or systems may support parking spot management/monitoring, vehicle traffic analysis and/or management of stationary and/or moving vehicles, monitor storage areas and/or manage production facilities. These networks and/or systems may be operated to generate reports of incorrectly parked vehicles, such as reserved parking spots for other vehicles, vehicles parked in multiple parking spots and/or overstaying the time they are permitted to park.

BACKGROUND OF THE INVENTION

There are five areas of technical background affecting this application: parking system management, radars, antennas, power management, and wireless communications protocols. Each area has technical problems discussed below.

Parking System Management:

Sensor-based parking detection systems are becoming increasingly popular, affordable and economical. These systems can determine when a vehicle enters a parking spot and when it leaves, but they cannot detect or identify a specific vehicle in a specific parking spot. However there are several potential applications that cannot be supported without knowing which vehicle is in which parking spot:

Parking tickets cannot automatically be generated for an unidentified vehicle illegally parked in a parking spot. Examples include
a vehicle parked in a parking spot reserved for another,
a vehicle parked in a parking spot whose paid time has run out,
a vehicle parked in the parking spot without paying the parking fee and
a vehicle parked in a spot not designated for parking.
Parking fees cannot be automatically requested for the time the unidentified vehicle spends parked in the parking spot.
Parking spot reservations cannot be confirmed without knowing the identity of the vehicle that is parked in the reserved parking spot.

Most parking structures and parking areas have designated parking spots where drivers should park their vehicles. Often, vehicles are parked appropriately and with high efficiency, allowing the parking structure to be optimally used.

However, some vehicles may be parked incorrectly, often taking up more than one parking spot and/or sticking out into the parking traffic lane.
Taking up more than one parking spot lowers the efficiency of the parking facility, frustrating other drivers trying to park and lowering the revenue of the parking facility.
Vehicles sticking out into the parking traffic lane can lead to dangerous situations in which traffic accidents occur.
What is needed is an automated, reliable process that can note incorrectly parked vehicles and report these incorrectly parked vehicles to a parking management system and/or to a parking enforcement authority. The vehicle owner may be charged more and/or possibly issued a parking ticket.

Regarding Radars:

There has been extensive development of radar since the 1930's for detecting aircraft and ships at a distance, often over the horizon. Such systems routinely use many kilowatts to megawatts for transmitting their radar pulses.

What is disclosed herein are micro-radars that use ten milli-Watts (mW) or less of power to transmit their pulses.
Micro-radars are used to detect vehicles and determine distances, where the distances involved are typically within a few meters of the micro-radar.
One of the technical problems with existing micro-radar technology has to do the difficulties calibrating and maintaining the calibration of a micro-radar unit.
In solving these problems, micro-radars can be inexpensively implemented and recalibrated throughout the life of a sensor without human intervention.

Regarding Antennas:

There is extensive literature about microwave antennas.
However only a small fraction of that literature is relevant to applications involving a microwave antenna interacting with a transceiver whose active signals are in the range of less than 10 milli-watts. Such microwave antennas will be referred to as having a micro-power range compatible with the micro-radars of this disclosure.

These antennas are small antennas with a maximum physical dimension that is less than 7 centimeters (cm).

Microwave antennas tend to have a transmission and reception pattern. This pattern has lobes all around the antenna when plotted with the antenna at the center of the plane of maximum transmission power and receptivity.

Microwave antenna components were, and are, very poor at determining the location of an object, even to the point of knowing whether it is coming from the left or the right side of the antenna.

The way this problem was solved in large radars was with the use of a large array of antennas and/or a parabolic reflector, which changed the lobe pattern to one that dominated a half of the plane to indicate direction.

However, these approaches cannot be used in small, micro-power antenna applications. There is simply no room for such approaches.

Existing small, micro-power antennas cannot be used to detect which half of the plane an object is in. Put another way, they cannot detect whether a vehicle is parked to the left or the right of a micro-radar sensor. The sensor cannot tell which of two parking spots 20 is occupied.

Regarding Power Management:

One common prior art configuration of remote power supplies includes one or more solar cells and rechargeable batteries.

Where there are significant periods of either massive cloud cover or very little daylight, solar cells may be unable to charge rechargeable batteries.

Regarding Wireless Communications Protocols:

There are a number of wireless communication protocols, many of which have successfully implemented hand-off of a moving radio client or user within a cellular network from one base station to another.

In other applications, a sea of clients, in particular wireless sensors, may be fixed in location and wirelessly interface through repeaters to access points.

Allocating which wireless repeater passes on messages from which wireless sensor node to the access point can be solved with static allocation software, but at a steep price: These allocations may fail to respond to a changing wireless environment, such as the parking of a large truck or container between a wireless sensor and a repeater.

SUMMARY OF THE INVENTION

This patent application discloses embodiments that may be combined to provide new and improved products and services in a variety of technical fields. Because of the diversity of applications and embodiments, a discursive approach is being taken to simplify the presentation of this disclosure. The discussion will introduce an application of the various embodiments. After the introductory discussion each embodiment will then be summarized in turn.

This disclosure begins with the interaction of a vehicle 12 equipped with an On-Board Device (OBD) and at least one sensor located near or in a parking spot 20.

The interaction determines a parking session for the vehicle 12 parked in the parking spot 20.

The parking session may include
a vehicle identification 110 of the vehicle 12 derived from the interaction with the OBD 100 when the vehicle 12 is parked,
a parking spot 20 identification associated with the parking spot 20 by the sensor,
a starting time 154 and/or an ending time 156.
The ending time 156 may not be set for a vehicle 12 that is still parked in the parking spot 20.
Also, the starting time 154 may be "swept away" for instance, at midnight.

In some embodiments, the interaction with the OBD 100 also derives a responsible operator 112 of the vehicle 12. The responsible operator 112 may be the vehicle 12's owner, a designated driver, and/or a manager of the vehicle 12. The responsible operator 112 may be contacted about the vehicle 12's parking, may be responsible for paying parking tickets 188, parking fees and/or reserving the parking spot 20.

Here are some examples of the responsible operator 112:
In a family, a husband may be the responsible operator 112 of a first vehicle 12 and the mother may be the responsible owner of a second vehicle 12.
Continuing the example of a family, a child may operate a vehicle 12 to which one of the parents is the responsible operator 112.
Alternatively, a child may be going on a long car trip or to college, and the child may become the responsible operator 112.

Examples of the OBD 100 include at least one of the following
A cell phone 120 and/or a tablet computer 122 and/or a wearable device 124 and/or a media player 126 may be operated to implement the OBD 100. These embodiments may or may not remain in the vehicle 12 once parked and the occupant(s) depart from the vehicle 12.
A vehicle 12 may include the OBD 100 and/or may be configured to operate as the OBD 100. The vehicle 12 may implement a bicycle, a motorcycle, a tricycle, an automobile, a truck and/or a trailer.

The parking session, and the interactions supporting it, may include determining when and how the vehicle 12 is parked in more than one parking spot 20. The determination of the vehicle 12 parking in multiple parking spots 20 may involve interactions with more than one sensor.

The sensor may be adapted for installation on, or in, at least one of the following:
a post or a pole, possibly on or near a street or lane,
a wall and/or a ceiling, possibly as part of a building, such as a parking facility, and/or
a pavement and/or a floor upon which the vehicle 12 may travel and/or park.

The sensor may be implemented as a wireline sensor and/or a wireless sensor.

The sensor may include any combination of an infrared sensor, an ultrasonic sensor and/or a radar. Such sensors may be configured to operate in accord with the preceding discussion. In particular, the sensor may include a radar coupled to at least one microwave antenna.

The sensor may be configured to operate the radar and the microwave antenna to transmit an antenna output. The antenna output reflects off of the vehicle 12 to create a Radio Frequency (RF) reflection. The RF reflection is received by the micro-radar. The sensor uses the received RF reflection to at least partly create a distance and a direction from the sensor to the vehicle 12.

The microwave antenna may be adapted to form a single sided lobe pattern with a focused direction. The single sided lobe pattern is used to generate the direction from the sensor to the vehicle 12.

The sensor may further include the radar coupled via a microwave switch to the microwave antenna and to a second microwave antenna. This may provide an advantage of being able to determine parking sessions 150 for the vehicle 12 in one of several parking spots 20.

The radar may be coupled via the microwave switch to more than two microwave antennas to determine parking sessions 150 for more than two parking spots 20.

The radar may be implemented as a micro-radar adapted for small power outputs less than or equal to 10 milli-watts. In some implementations of the parking sensors 200, the radar is preferably implemented as a micro-radar.

The radar may further be implemented as a Zero Intermediate Frequency (ZIF) radar or a superheterodyne radar including a Intermediate Frequency (IF) stage in its transmitter and/or its receiver. The superheterodyne radar may be further implemented as a homodyne radar that shares a single oscillator with both its transmitter and receiver.

The superheterodyne radar may include a calibration circuit used to configure the antenna output and the response to receiving the RF reflection. This circuit helps address problems one of the inventors found through laboratory and field testing. Various embodiments may address some or all of these problems.

The prior art includes a discussion that radar transmission signals in multi-GigaHertz (GHz) bands are unaffected by changing weather conditions. While this is true, the prior art overlooks some issues that the inventor has had to cope with. The inventor has found each of the following issues to seriously affect at least some installations of micro-radar:

Different manufacturing runs may alter the operating characteristics of the micro-radar, even in a laboratory setting.

Varying temperature/weather conditions may alter the operating characteristics.

Varying ground conditions for a micro-radar embedded in the ground may alter the operating characteristics.

The micro-radar components may also drift over time even when there are little or no changes in the weather or ground conditions. The component drift may also alter the operating characteristics.

Often, there may be variations in the noise in the Intermediate Frequency (IF) signal that can compromise the detection and/or distance estimate.

Often, there is a need to operate the micro-radar in a manner that minimizes power consumption. For example, in some wireless sensor nodes, there is a very limited amount of power that can be generated and/or stored by the wireless sensor node, requiring that a micro-radar use power in a frugal manner.

The micro-radar may be calibrated response to at least one output of a Digital to Analog Converter (DAC) and sometimes preferably two DAC outputs. The DAC output may be used to generate an analog sum including an exponentially changing signal and the output of the DAC. Here are two examples of the response of the micro-radar to distinct analog sums, either or both of which may be incorporated into the micro-radar and/or its operations:

First, the micro-radar may operate in response to a first analog sum of a first DAC output, an exponentially changing signal, and a clock pulse. The response may include generating a receiver mixing signal that is asserted at a succession of time delays that are a function of the first analog sum.

Second, the micro-radar may be operated based upon a second analog sum of a second exponentially changing signal and a second DAC output to control the Intermediate Frequency of the down converted RF signal. This second sum may control a duty cycle of a pulse generating oscillator output without changing its frequency. The duty cycle may be measured as the high time divided by the period of the oscillator output.

The wireless sensor may be configured to wirelessly communicate with the access point to at least partly determine the parking session. Generating the parking session may require that the access point communicate with more than one sensor. Also, the network may be generating and/or maintaining multiple parking sessions 150 at the same time, which will often be based upon communications with the access point.

The wireless sensor may wirelessly communicate through a repeater to the access point.

The wireless network may include the wireless sensor and at least two repeaters configured to wirelessly communicate between the wireless sensor and the access point. The wireless network may implement a wireless communications protocol.

Messages sent from a wireless sensor may be routed through multiple repeaters. Sending the same message from multiple repeaters can cause a message collision at the access point.

The sensor and the repeaters may employ a localized communication scheme to limit these message collisions.

Consider the following example of a localized communication scheme:

The repeaters may employ a repeater identification code in each message sent from the repeaters to a wireless sensor to create at least one received message at the wireless sensor.

The wireless sensor may select one of the received messages to create a selected repeater identification from the repeater identification code of the selected received message.

The wireless sensor bundles the selected repeater identification into a sensor message received by the repeaters.

Each repeater examines the sensor message to see if the selected repeater identification matches its repeater identification.

The repeaters respond to the matching repeater identifications by transmitting the sensor message to the access point. This insures that just one repeater sends the sensor message, thereby avoiding message collisions at the access point.

The above example is useful in general, but there may situations of sporadic interference between the repeaters and the access point. An extension that can address this situation may include the following steps:

The repeaters may employ the repeater identification code when sending messages to the wireless sensor as above.

The wireless sensor may select more than one of the received messages to create multiple selected repeater identifications from the repeater identification code of the selected received messages.

The wireless sensor bundles the selected repeater identifications into a sensor message received by the repeaters.

Each repeater examines the sensor message to see if one of the selected repeater identifications matches its repeater identification.

The repeaters respond to the matching repeater identifications by transmitting the sensor message to the access point at a time offset from each other. This insures that just one repeater sends the sensor message at a time, thereby avoiding message collisions at the access point and improving the probability of the sensor message being received at the access point.

The wireless communication protocol may implement at least one, and sometimes several, of the following communications methods:

A Frequency Division Multiple Access (FDMA) method, whereby the wireless communications are allocated frequency bands, which may or may not remain fixed as the wireless network evolves through time.

A Time Division Multiple Access (TDMA) method that multiplexes wireless communications based upon a shared estimate across the network of time divisions.
- An example of a TDMA method may maintain a global clock count at the access point. The access point may transmit a clock synchronization message via the repeaters to all the sensors in the network. Upon receipt by each of the sensors, a local clock estimate may be updated.
- The communication to and from the sensors may be coordinated based upon the global clock count at the access point and the local clock estimates at the sensors.
- In some embodiments, the repeaters may also maintain a local clock count that may be used to synchronize their transmissions to the access point and control a time delay in sending transmissions to specific sensors.

A Spread Spectrum method, which may include implementations of at least one, and possibly more than one, of the following:
- A Code Division Multiple Access (CDMA) method uses of one or more layers of spreading codes.
  - A Frequency Hopping Multiple Access (FHMA) method uses differing frequencies band over time as estimated by the global clock count at the access point and the local clock estimate at the sensor and/or at the repeaters.
  - A Time Hopping Multiple Access (THMA) method uses differing time offsets for transmission and/or reception by the access point, the repeaters and the sensors.

An Orthogonal Frequency Division Multiple access (OFDM) method.
- The OFDM transmission of a message may include a Fourier or wavelet modulation of a part of the message to create a modulated component that is then up converted and mixed for transmission as an antenna output.
- The reception of the message may include an antenna input that is down converted to generate the modulated component, which is then transformed by the inverse Fourier or wavelet modulation to generate part of the received message.

Any of these wireless communications methods may include filtering, signal estimators, error correction encoding and/or decoding, as well as possibly other forms of encryption.

Examples of the wireless communications protocols may implement various versions of standards developed and/or maintained by the Institute of Electrical and Electronic Engineers (IEEE), the China Communications Standards Association (CCSA), European Telecommunications Standards Institute (ETSI) and/or Association of Radio Industries and Businesses (ARIB).

Examples of such standards include the IEEE 802 family of communications protocols, and from ETSI, the GSM and LTE communications protocols.

Some embodiments of the apparatus may include a Power Control Circuit (PCC) Power Control Circuit (PCC) supporting the use of a one-charge battery when a rechargeable battery and/or a photovoltaic cell are unable to supply electrical power to a load. Examples of a workload include a radio, a micro-radar, and/or a processor such as computer.

BRIEF DESCRIPTION OF THE DRAWINGS

FIG. 1A to FIG. 4B show some details of the apparatus and method of monitoring one or more parking spots to create parking sessions that may be used to manage and/or create parking permits, parking payments, parking reservations, and/or parking tickets:

FIG. 1A to FIG. 1D show the interaction of a vehicle equipped with an On-Board Device (OBD) and at least one sensor located near or in a parking spot 20.

FIG. 2A to FIG. 2H shows some examples of apparatus that may be operated to implement the OBD.

FIG. 3C to FIG. 3F show examples of the sensor implemented as a wireline sensor and/or a wireless sensor, as well as variations in the communications networks supporting the interactions of the OBD, the sensor, one or more processors supporting monitoring the parking sessions managing parking permits, payments, reservations and/or tickets based upon the parking sessions.

FIG. 4A and FIG. 4B show examples of the OBD being implemented as an application, otherwise known as a program system.

FIG. 5A to FIG. 7C show some details of the apparatus and method of localized communication between repeaters and wireless nodes in a wireless communications network including an access point.

FIG. 5A to FIG. 5F show an example walkthrough of a localized communication protocol operating between the repeaters and wireless nodes, in this case, wireless sensor nodes of a wireless network configured to use an access point based upon a wireless communications protocol.

FIG. 6A shows an example of the repeater processor and/or wireless sensor node communicating with a computer readable memory, a disk drive, a server and/ort the access point to receive a program system implementing the localized communications protocol and/or receive an installation package to install the program system.

FIG. 6B shows an example of the repeater's program system supporting the localized communication protocol.

FIG. 7C shows an overall operational description of the localized communication protocol in terms of repeaters and wireless nodes.

FIG. 8A to FIG. 8D show some examples of a Power Control Circuit (PCC) supporting the use of a one-charge battery when a rechargeable battery and a photovoltaic cell are unable to supply electrical power to a load.

FIG. 9A to FIG. 9C show examples of the sensor discussed above that may include any combination of an infrared transceiver (possibly just its transmitter or receiver), an ultrasonic transceiver and/or a radar. Such sensors may be configured to operate in accord with the preceding discussion.

FIG. 9D shows some details of the radar implemented as a micro-radar, a Zero Intermediate Frequency (ZIF) radar, a superheterodyne radar. The superheterodyne radar may further be implemented as a homodyne radar that shares an oscillator between its transmitter and receiver.

FIG. 11E to FIG. 11J show examples of the microwave antenna including a microwave injector feeding a horn antenna.

FIG. 22 shows some details of at least one of the sensor processor and/or the processor of FIG. 21 may be individually and/or collectively may be implemented as one or more instances of a processor-unit that may include a finite state machine, a computer, a program system, an inferential engine and/or a neural network. The apparatus may further include examples of a delivery mechanism, which may include a computer readable memory, a disk drive and/or a server, each configured to deliver the program system and/or an installation package to the processor-unit to implement at least part of the disclosed method and/or apparatus.

FIG. 23 shows a flowchart of the program system of FIG. 21.

DETAILED DESCRIPTION OF DRAWINGS

Figures 1C, 1D:
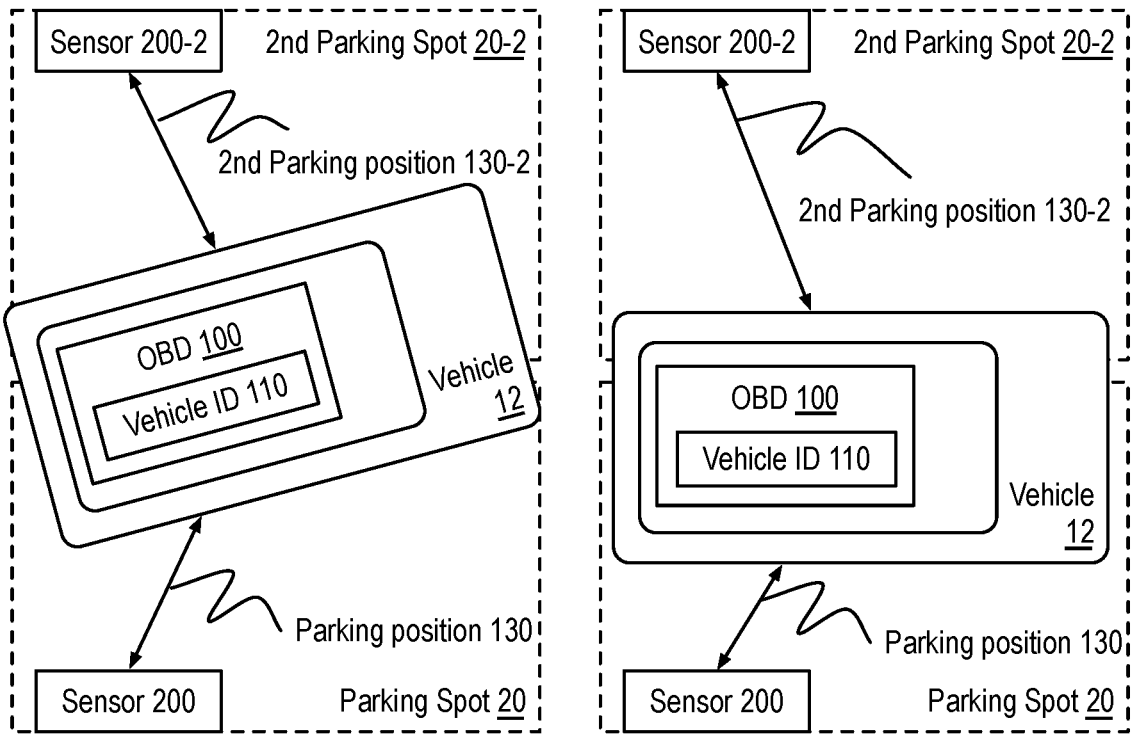

This disclosure relates to the following:
Vehicle 12 parking detection that may interact with sensors and an On-Board Device (OBD) to create a parking session identifying the vehicle 12 and one or more parking spots 20 it may be parked in.
Micro-radars, superheterdyne radars and/or homodyne radars, in particular the calibration and control of the microwave antennas, rechargeable power supplies and their power management circuits.
Communications protocols between the wireless sensors and repeaters within a wireless network.
The wireless sensors may be adapted for use in the ground of a parking area and/or parking strip and/or roadway.

Networks and/or systems may support traffic analysis and management of stationary vehicles 12 and possibly moving vehicles 12. These networks and/or systems may be operated to generate reports of vehicles 12 parking incorrectly or in multiple parking spots 20 and/or overstaying the time they are permitted to park.

This patent application discloses embodiments that may be combined to provide new and improved products and services in a variety of technical fields. Each technical discussion will begin with a summary of the Figures involved in the discussion, and then proceed to discuss those Figures in detail.

FIG. 1A to FIG. 4B show some details of the apparatus and method of monitoring one or more parking spots 20 to create parking sessions 150 that may be used to manage and/or create parking permits 182, parking payments 184, parking reservations 186, and/or parking tickets 188:

FIG. 1A to FIG. 1E show the interaction of a vehicle 12 equipped with an On-Board Device (OBD) 100 and at least one parking sensor 200 located near or in a parking spot 20.

FIG. 1F shows the parking session for the vehicle 12 of FIG. 1C and/or FIG. 1D that may involve a second parking spot 20-2.

FIG. 2A to FIG. 2H shows some examples of apparatus that may be operated to implement the OBD 100.

Figure 3A:
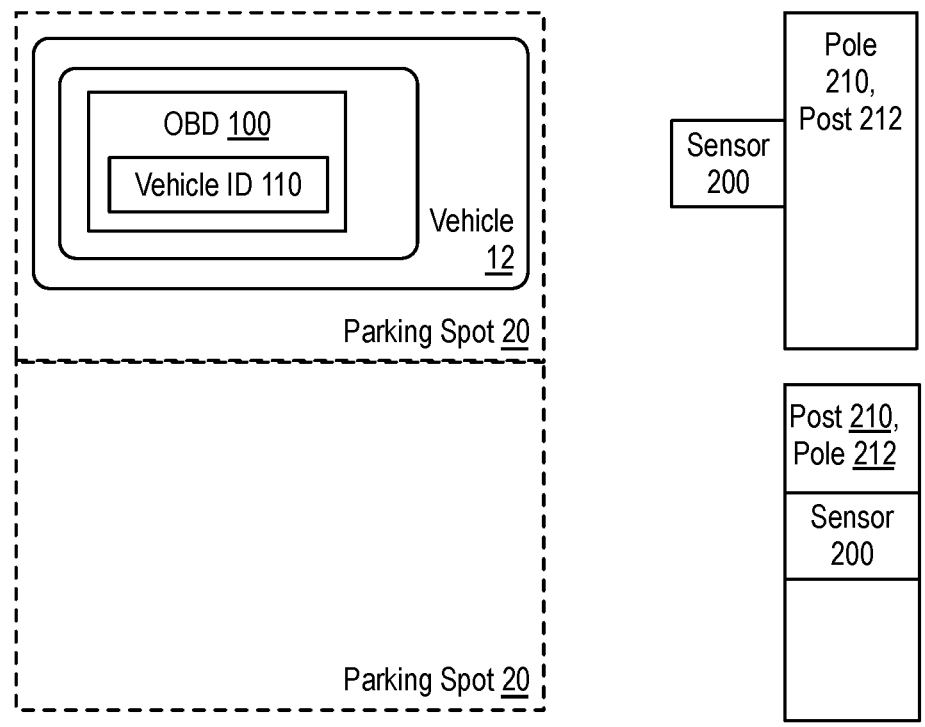
FIG. 3A and FIG. 3B show various examples of installations of the sensor.
Figure 3B:
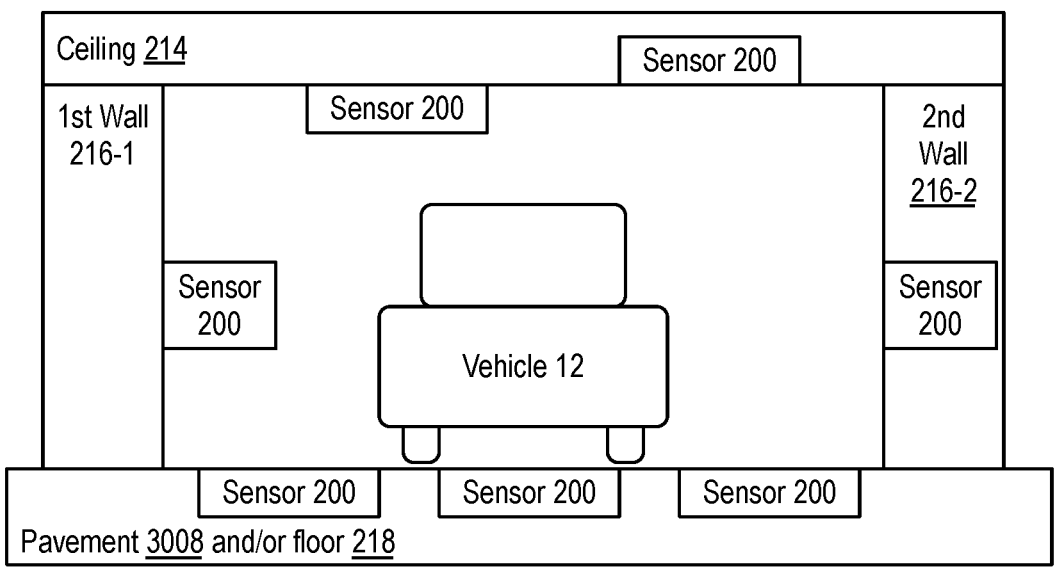

FIG. 3A and FIG. 3B show various examples of installations of the parking sensor 200.

FIG. 3C to FIG. 3F show examples of the parking sensor 200 implemented as a wireline sensor and/or a wireless sensor, as well as variations in the communications networks supporting the interactions of the OBD 100, the sensor, one or more processors supporting monitoring the parking sessions 150 managing parking permits 182, payments, reservations and/or tickets based upon the parking sessions 150.

Figure 4A:
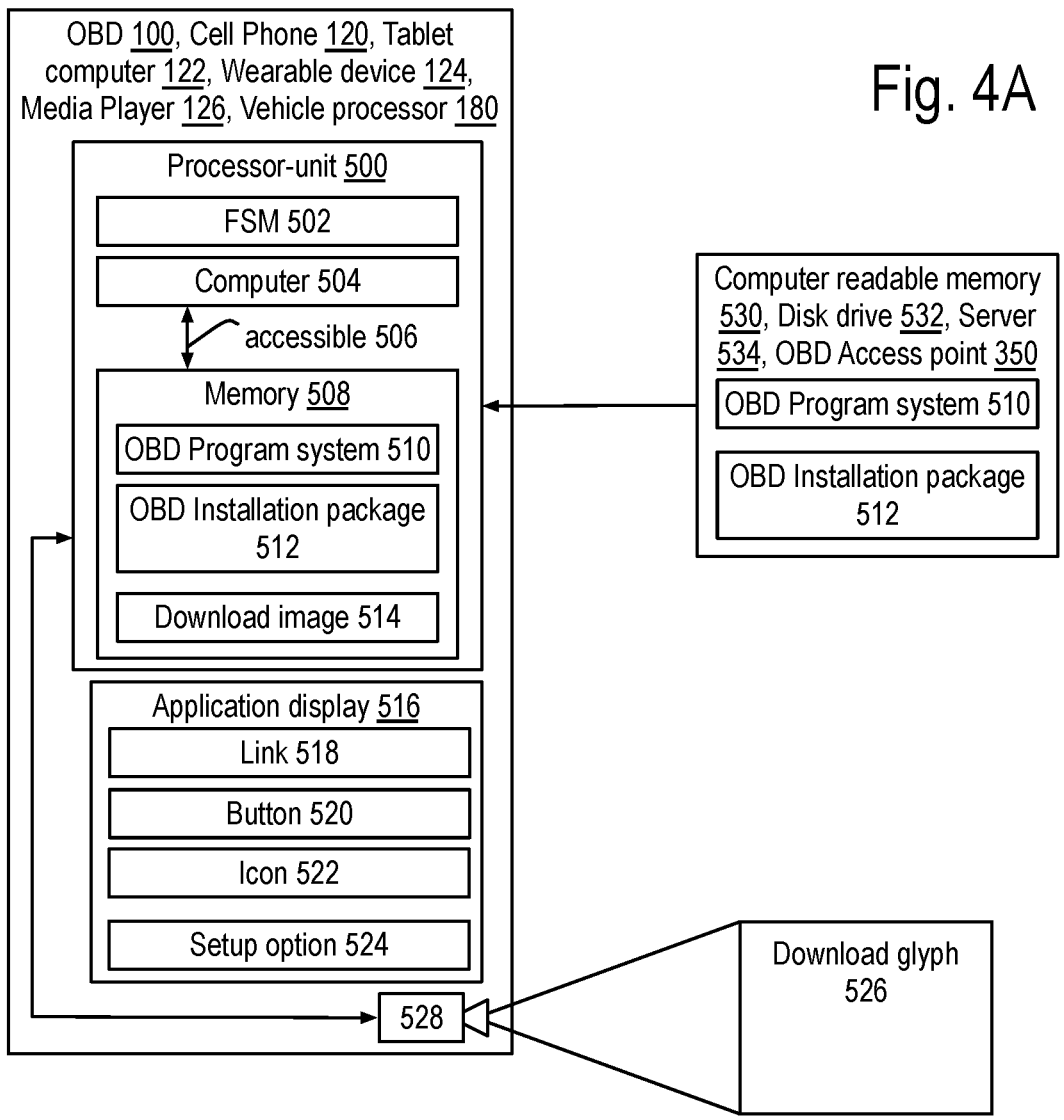
Figure 4B:
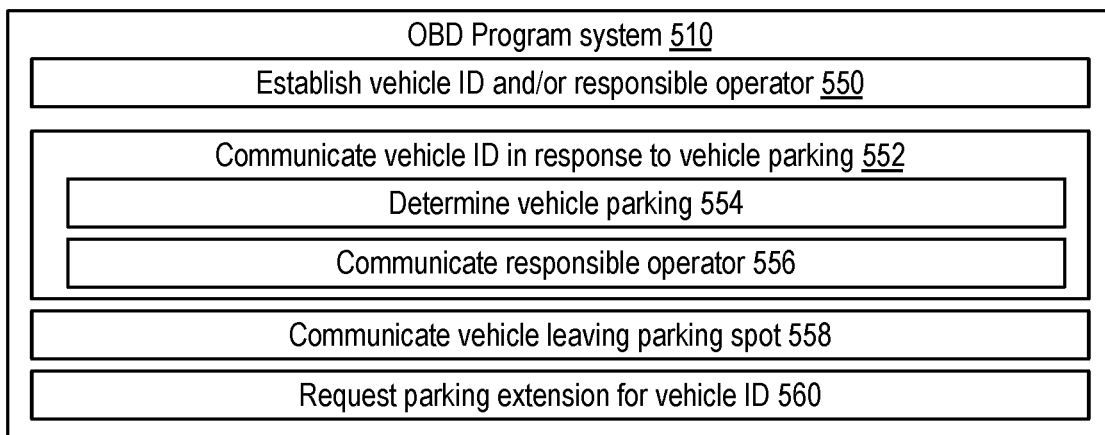

FIG. 4A and FIG. 4B show examples of the OBD 100 being implemented as an application, otherwise known as a program system.

FIG. 1A to FIG. 1E show the interaction of a vehicle 12 equipped with an On-Board Device (OBD) 100 and at least one parking sensor 200 located near or in a parking spot 20. The interaction determines a parking session 150 for the vehicle 12 parked in the parking spot 20.

The parking session 150 may include a vehicle identification 110 110 of the vehicle 12, a parking spot 20 identification 152 associated with the parking spot 20, a starting time 154 and/or an ending time 156 during which the vehicle 12 is parked in the parking spot 20. The ending time 156 may not be set for a vehicle 12 that is still parked in the parking spot 20. Also, the starting time 154 may be "swept away" for instance, at midnight.

In some embodiments, the interaction with the OBD 100 may also derive a responsible operator 112 of the vehicle 12.

The responsible operator 112 may be associated with the vehicle identification 110 as shown in FIG. 3C. This association may be established at a separate time from the parking session 150.

The responsible operator 112 may be the vehicle 12's owner, a designated driver, and/or a manager of the vehicle 12.

The responsible operator 112 may be contacted by the parking management 180 about the vehicle 12's parking, may be responsible for obtaining a parking permit 182, paying any parking tickets 188, making parking payments 184 and/or making a parking reservation 188 for the parking spot 20.

Here are some examples of the responsible operator 112:

In a family, a husband may be the responsible operator 112 of a first vehicle 12 and the mother may be the responsible operator 112 of a second vehicle 12.

Continuing the example of a family, a child may operate a vehicle 12 to which one of the parents is the responsible operator 112.

Alternatively, a child may be going on a long car trip or to college, and the child may become the responsible operator 112.

Examples of the OBD 100 include at least one of the following

The OBD 100 is configured with a Vehicle IDentifier (ID) 110 within a region that may be defined by a county, state, province, a parking service or facility, and/or a cellular phone provider service.

Figure 3E:
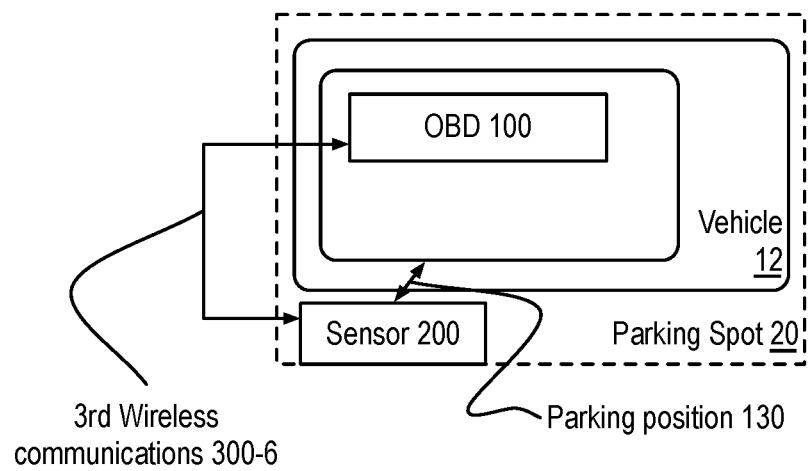

The OBD 100 may be configured to wirelessly communicate with the parking sensor 200 and/or an access point 350 as shown in FIG. 3E.

The OBD 100 may include an accelerometer 122 as shown in FIG. 3D and/or a motion detector 120 as shown in FIG. 3C. The OBD 100 may be configured to determine if the vehicle 12 is stationary or moving.

The OBD 100 may be configured to determine its range from the parking sensor 200, the access point 350 and/or another OBD 100 to at least partly determine the parking position 130. This determination may use a wireless communication capability 300-1 of the OBD 100 as shown in FIG. 3C.

A parking processor 170 will refer to a processor that creates and/or maintains a parking session 150 in a memory referred to as a parking session memory 172.

The OBD 100 may be configured to signal a person and/or a processor 170 that a parking session 150 has started as shown in FIG. 2G. The OBD 100 may be configured to display additional information for the person. That person may be an operator 8 and/or a passenger 6 of the vehicle 12. The OBD 100 may be configured to receive and respond to input from the person, who will from hereon be referred to as a user 10 of the OBD 100.

FIG. 1B shows the vehicle 12 of FIG. 1A with the OBD 100 parked in the parking spot 20.

A parking monitor 160 may interact with the OBD 100 and the parking sensor 200 to create, update and/or use the parking session 150.

Commonly, the parking monitor 160 may include at least one parking processor 170 that may include and/or access a parking session memory 172 containing one or more of the parking sessions 150.

Frequently, the parking session memory 172 may include at least one non-volatile memory component retaining the parking session 150 or a version of it, whether or not the parking session memory 172 loses power.

This can support parking management 180 functions such as monitoring parking permits 182, parking payments 184, parking space reservations 186 and/or at least partly managing parking tickets 188.

The parking session 150, and the interactions supporting it, may include determining when and how the vehicle 12 is parked in more than one parking spot 20. The determination of the vehicle 12 parking in multiple parking spots 20 may involve interactions with more than one parking sensor 200.

The parking session 150 may further include more than one of the parking spot 20 identifications to indicate that the vehicle 12 is parked in more than one of the parking spots 20.

Figure 1E:
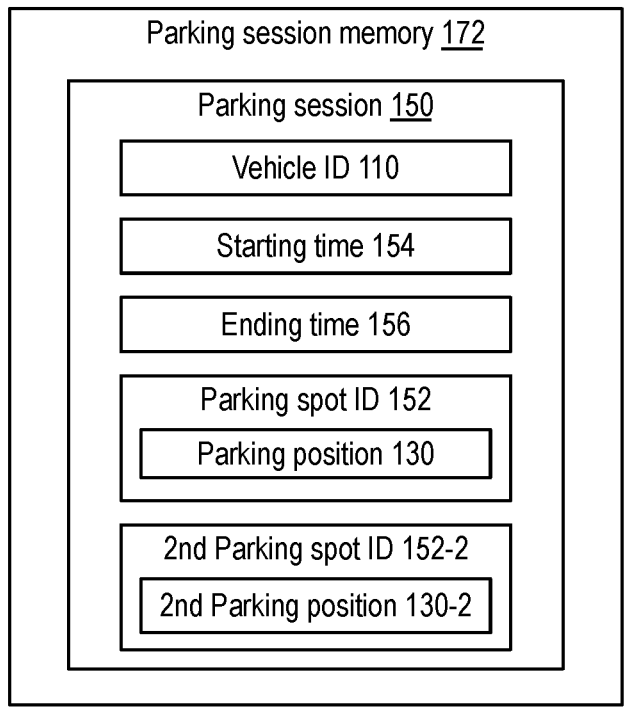
FIG. 1E shows the parking session for the vehicle of FIG. 1C and/or FIG. 1D that may involve a second parking spot.

The determination of the vehicle 12 parking in multiple parking spots 20 may involve interactions with more than one parking sensor 200 as shown in FIG. 1C and FIG. 1D, and represented by an example of the parking session 150 as shown in FIG. 1E.

There are several variations of this parking session 150 that are disclosed and claimed. The ending time 156 may not be set for a vehicle 12 that is still parked in the parking spot 20. Also, the starting time 154 may be "swept away" for instance, at midnight.

A cell phone 120 and/or a tablet computer 122 and/or a wearable device 124 and/or a media player 126 may be operated to implement the OBD 100. FIG. 1A shows the vehicle 12 including the OBD 100 and configured to indicate an identification of the vehicle 12, which will be referred to herein as the vehicle identification 110. The vehicle 12 is approaching the parking spot 20 and observed by at least one parking sensor 200 adapted to at least partly detect the vehicle 12 and its parking position 130 with respect to the parking spot 20. At the end of a parking session 150, the vehicle 12 may depart from the parking spot 20 be reversing the movement of the vehicle 12 shown in FIG. 1A.

FIG. 2A to FIG. 2H shows some examples of apparatus that may be operated to implement the OBD 100.

FIG. 2A shows a cell phone 120 may implement the OBD 100.

FIG. 2B shows a tablet computer 122 may implement the OBD 100.

FIG. 2C shows a wearable device 124 may implement the OBD 100.

FIG. 2D shows a media player 126 may implement the OBD 100.

These embodiments may or may not remain in the vehicle 12 once parked and the occupant(s) depart from the vehicle 12.

FIG. 2E shows the vehicle 12 may include the OBD 100 and/or may be configured to operate as the OBD 100. The vehicle 12 may include a vehicle processor 180, which may include (as shown) or interact with a vehicle memory 182 to implement the OBD 100. The vehicle processor 180 may implement the OBD 100, possibly by executing an application residing in a vehicle memory 182 as the OBD 100, which may further interact with wireline and/or wireless communication devices to identify the vehicle 12 as or when it is parked.

FIG. 2F shows the vehicle 12 may implement a bicycle, a motorcycle, a tricycle, an automobile, a truck and/or a trailer.

FIG. 2G shows the vehicle 12 may be adapted to at least partly travel by using a fuel 14 such as gasoline, kerosene, alcohol and/or diesel contained in a fuel tank 16.

Examples of the fuel 14 may include but are not limited to combinations of one or more of the following: gasoline, alcohol, methane, propane, kerosene, diesel fuel, and/or biodiesel.

The operator 8 may also be considered a passenger 6. The vehicle 12 may include another one or more passengers.

As used herein, the responsible operator 112 may or may not be the operator 8 of the vehicle 12. The responsible operator 112 may be a passenger 6, the owner of the vehicle 12, and/or a manager of the vehicle 12 for another entity, such as a vehicle 12 rental company.

FIG. 2H shows the vehicle 12 may be adapted to at least partly travel based upon electrical power 194, which may be provided solar cells and/or a recharging station 190 that may be associated with the parking spot 20.

The recharging station 190 may use a charging cable to deliver the electrical power 194 to the vehicle 12, possibly by charging its batteries 196.

In some embodiments, the charging cable may also include a communications cable adapted to communicate with the OBD 100.

The vehicle 12 is parked at a parking spot 20 associated with a recharging station 190 adapted to deliver electrical power 194 to the battery 196 by a charging cable 192.

The OBD 100 may communicate through the recharging station 190 using a communication cable 193, which may be adapted to interface to the OBD 100 as an Ethernet or Universal Serial Bus (USB) connection.

The vehicle 12 may include and/or use one or more solar cells (referred to herein as photovoltaic cells 18) as part of the recharging station 190, which may be separately plugged in to provide electrical power 194 to the battery 196.

FIG. 3A and FIG. 3B show various examples of installations of the parking sensor 200.

FIG. 3A shows examples of the parking sensor 200 installed on a post 212 or a pole 210, possibly on or near a street or lane.

FIG. 3B shows the parking sensor 200 installed on, and/or in, a wall 216-1 and/or 216-2 and/or a ceiling 214, possibly as part of a building, such as a parking facility, and/or a pavement 3008 and/or a floor 218 upon which the vehicle 12 may travel and/or park.

FIG. 3C and FIG. 3D show examples of the parking sensor 200 implemented as a wireline sensor and/or a wireless sensor, as well as variations in the communications networks supporting the interactions of the OBD 100, the parking sensor 200, one or more processors 192, 194, 196, and/or 198 supporting monitoring the parking sessions 150, managing parking permits 182, parking payments 184, parking reservations 186 and/or parking tickets 188 based upon the parking sessions 150.

FIG. 3C shows the OBD 100 and the parking sensor 200 wirelessly communicating with separate access points.

The OBD 100 may use a first wireless communications protocol 300-1 to communicate with the OBD access point 350.

The parking sensor 200 may use a second wireless communications protocol 300-2 to communicate with the sensor access point 352.

The access points 350 and 352 may use wireline communications through a parking monitor 160 server to communicate with at least one parking processor 170 that operates the parking session memory 172 containing the parking session 150 for the vehicle 12 parked in the parking spot 20.

Note that the access points 350 and 352 may be adapted and/or configured to respond to differing wireless communications protocols 300-1 and 300-2, respectively.

For example, the OBD access point 350 may use the first wireless communications protocol 300-1, that may implement a version of IEEE 802.11, WiMax and/or LTE to communicate wirelessly with the OBD 100.

For another example, the sensor access point 352 may be configured to respond using a second wireless communications protocol 300-21, possibly compliant with IEEE 802.14.5, M-Bus and/or M2M wireless communications protocols.

The parking monitor 160 may include a parking monitor server 162 that may further interact using a fourth wireline communications protocol 302-4 with a parking management server 190 in the parking management 180.

The parking management server 190 may communicate with a fifth wireline communications protocol 302-5 in a possibly secured manner with various processors 192, 194, 196 and/or 198 that may generate and/or maintain and/or manage parking permits 182, parking payments 184, parking reservations 186 and/or parking tickets 188.

- A permits processor 192 may operate upon, create and/or manage the parking permits 182.
- A payments processor 194 may operate upon, create and/or manage the parking payments 184.
- A reservations processor 196 may operate upon, create and/or manage the parking reservations 186.
- A tickets processor 198 may operate upon, create and/or manage the parking tickets 188.
- Note that in some embodiments, such as small towns and/or parking facilities, a single processor may manage all or a combination of the parking permits 182, the parking payments 184, the parking reservations 186 and/or the parking tickets 188.

FIG. 3D shows the OBD 100 and the parking sensor 200 communicating with a single parking monitor server 160 using at least one wireline communications protocol 330.

- The parking monitor 160 server may communicate with a parking monitor access point 354 to communicate with at least one parking processor 170 that operates the parking session memory 172 containing the parking session 150 for the vehicle 12 parked in the parking spot 20.
- The parking monitor access point 354 may also communicate with a parking monitor access point 354 that communicates in a possibly secured manner with various processors that may generate and/or maintain and/or manage parking permits 182, parking payments 184, parking reservations 186 and/or parking tickets 188.

FIG. 3E shows the parking sensor 200 communicating with the OBD 100 using a sixth wireless communications protocol 300-6, such as a wireless LAN (WLAN) protocol and/or a form of Bluetooth.

Figure 3F:
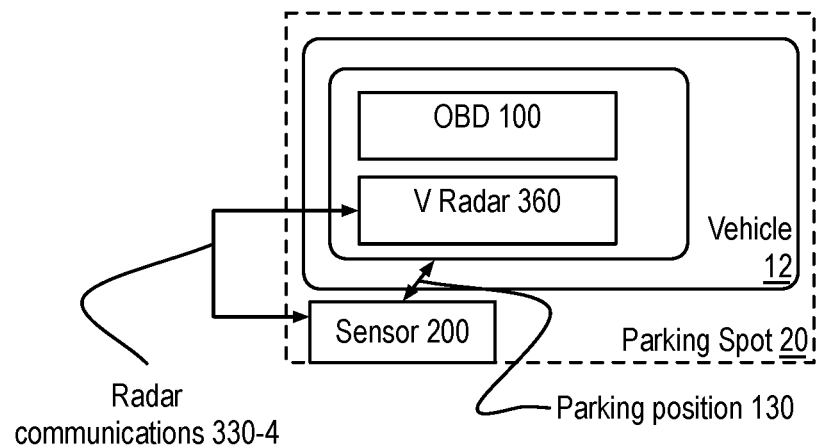

FIG. 3F shows the parking sensor 200 and a vehicle radar 360 included in the vehicle 12 communicating using a radar communications protocol 330-4, possibly to further determine the parking position 130 of the vehicle 12 in the parking spot 20.

FIG. 4A and FIG. 4B show examples of the OBD 100 being implemented as an application, otherwise known as a program system.

FIG. 4A shows that the OBD 100, possibly implemented as part of the cell phone 120, the tablet computer 122, the wearable device 124, the media player 126 and/or the vehicle processor 180 may include a processor-unit 500, an application display 516 and/or a camera 528.

- These components may be implemented as one or more instances of a processor-unit 500 that may include a finite state machine 502, a computer 504 accessibly coupled 506 to a memory 508 containing an OBD program system 510.
- Please note that other finite state machines, computers coupled to memories will be disclosed herein. Some of these may have differing reference numbers in part because they may be separately and possibly independently implemented from the embodiments related to this or other Figures.

The apparatus may further include examples of a delivery mechanism, which may include a computer readable memory 530, a disk drive 532, a server 534, and/or the OBD access point 350, each configured to deliver the OBD program system 510 and/or an OBD installation package 512 to the processor-unit 500 to implement at least part of the disclosed method and/or apparatus of the OBD 100.

These delivery mechanisms may be controlled by an entity directing and/or benefiting from the delivery to the processor-unit 500, irrespective of where the server 534 may be located, or the computer readable memory 530 or disk drive 532 was written.

Several terms will be used throughout this disclosure

As used herein, the Finite State Machine (FSM) 502 and/or 3850 found in FIG. 22 receives at least one input signal, maintains at least one state and generates at least one output signal based upon the value of at least one of the input signals and/or at least one of the states.

As used herein, the computer 504 and/or 3852 includes at least one instruction processor and at least one data processor with each of the data processors instructed by at least one of the instruction processors. At least one of the instruction processors responds to the program steps of the second program system 2300 residing in the memory 3854.

As used herein, the Inferential Engine 3858 includes at least one inferential rule and maintains at least one fact based upon at least one inference derived from at least one of the inference rules and factual stimulus and generates at least one output based upon the facts.

As used herein, the neural network 3860 maintains at list of synapses, each with at least one synaptic state and a list of neural connections between the synapses. The neural network 3860 may respond to stimulus of one or more of the synapses by transfers through the neural connections that in turn may alter the synaptic states of some of the synapses.

The OBD 100 may be implemented by a link 518, a button 520, an icon 522 and/or a setup option 524 that when triggered may execute an OBD installation package 512 that may further operate the OBD 100 to establish the vehicle identification 110 and/or identify the responsible operator 112, possibly by their cell phone 120 number, voice print, thumb and/or finger print, and/or by a login procedure.

As used herein, the application display 516 may or may not be built into the OBD 100. In some embodiments, it may be viewed by a user 10 in a head-up display, which may be a wearable device 124 and/or projected onto a viewing surface of the vehicle 12.

The processor-unit 500 may respond to a download image 514 in response to the camera 528 focused on a download glyph 526, by delivery of the OBD program system 510 and/or the OBD installation package 512.

FIG. 4B shows an example of the OBD program system 510 including at least one of the following program steps:

- Program step 550 may support establishing the vehicle identification 110 and/or the responsible operator 112.
- Program step 552 may support communicating the vehicle identification 110 in response to the vehicle 12 parking. In some embodiments, this may further include at least one of the following:
  - Program step 554 may support determining that the vehicle 12 is parking. This program step may use the motion detector 120 and/or accelerometer 122 of the OBD 100.
  - Program step 556 may support further communicating with the responsible operator 112.

Program step 558 may support communicating that the vehicle 12 is leaving the parking spot 20.

Program step 560 may support requesting a parking extension for the vehicle identification 110.

Here begins a discussion of a localized communications protocol 750 outlined in FIG. 7C and represented in a walk through of its operations and apparatus in FIGS. 5A to 7B. operating between wireless nodes 380 and repeaters 370 in a wireless network using access points 360. Such a wireless network may implement one or more wireless communications protocol 300$s$, such as the first wireless communications protocol 300-1 and/or the second wireless communications protocol 300-2 shown in FIG. 3C, which will be referred to as a generic wireless communications protocol 700 in the following Figures.

FIG. 5A to FIG. 7C show some details of the apparatus and method of localized communication between repeaters 370 and wireless nodes 380 in a wireless communications network including an access point 360.

FIG. 5A to FIG. 5F show an example walkthrough of a localized communication protocol operating between the repeaters 370 and wireless nodes 380, in this case, wireless sensor nodes of a wireless network configured to use an access point 360 based upon a wireless communications protocol 700.

FIG. 6A shows an example of the repeater processor and/or wireless sensor node communicating with a computer readable memory, a disk drive, a server and/ort the access point 360 to receive a program system implementing the localized communications protocol and/or receive an installation package to install the program system.

FIG. 6B shows an example of the repeaters program system supporting the localized communication protocol.

Figure 6C:
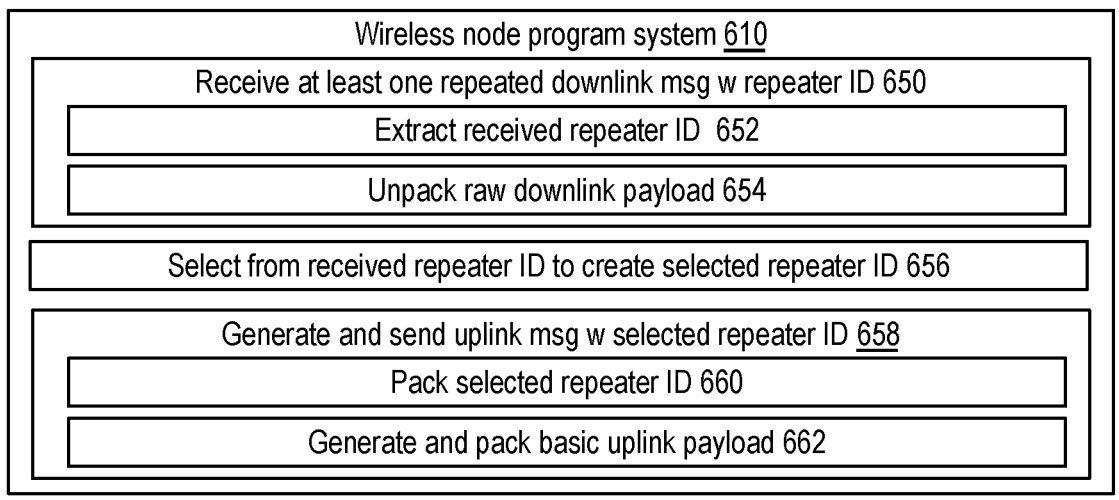
FIG. 6C shows an example of the wireless sensor program system supporting the localized communication protocol.

FIG. 6C shows an example of the wireless sensor program system supporting the localized communication protocol.

FIG. 6D to FIG. 6G show some details of the messages found in FIG. 5A to FIG. 6C.

Figure 7A:
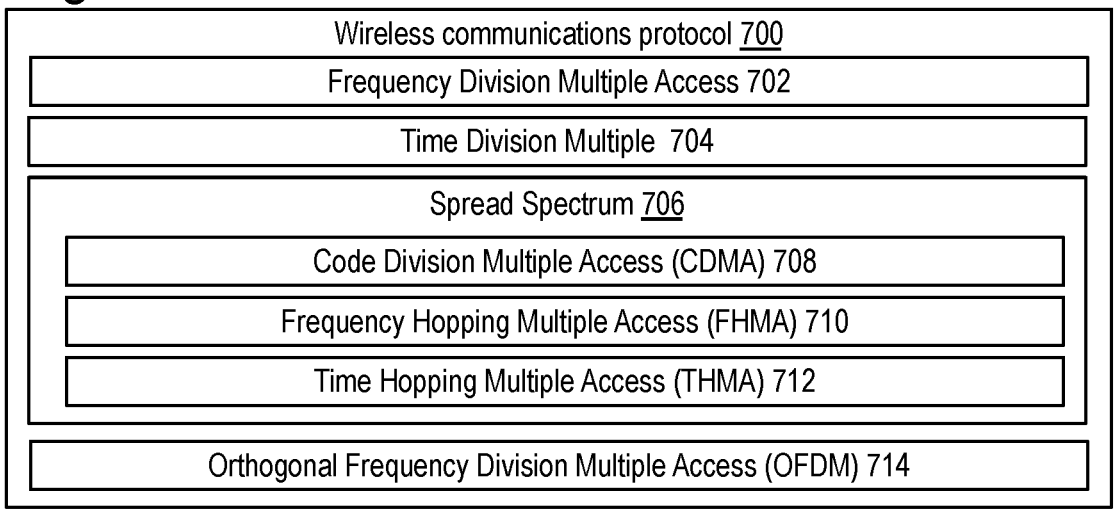
FIG. 7A and FIG. 7B show some details involved in a wireless communications protocol.
Figure 7B:
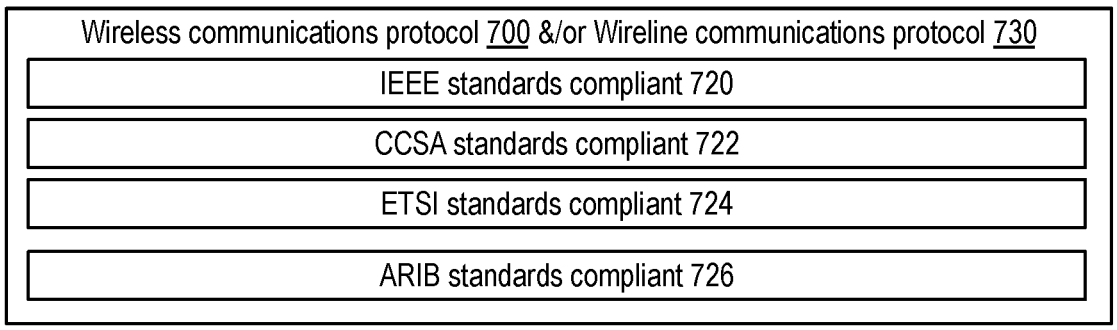

FIG. 7A and FIG. 7B show some details involved in a wireless communications protocol 300.

FIG. 7C shows an overall operational description of the localized communication protocol in terms of repeaters 370 and wireless nodes 380.

FIG. 5A to FIG. 5F show a walkthrough of a localized communication protocol 750 operating between the repeaters 370 and wireless nodes 380 of a wireless network 362 configured to use an access point 360 based upon at least one wireless communications protocol 700.

Figure 5A:
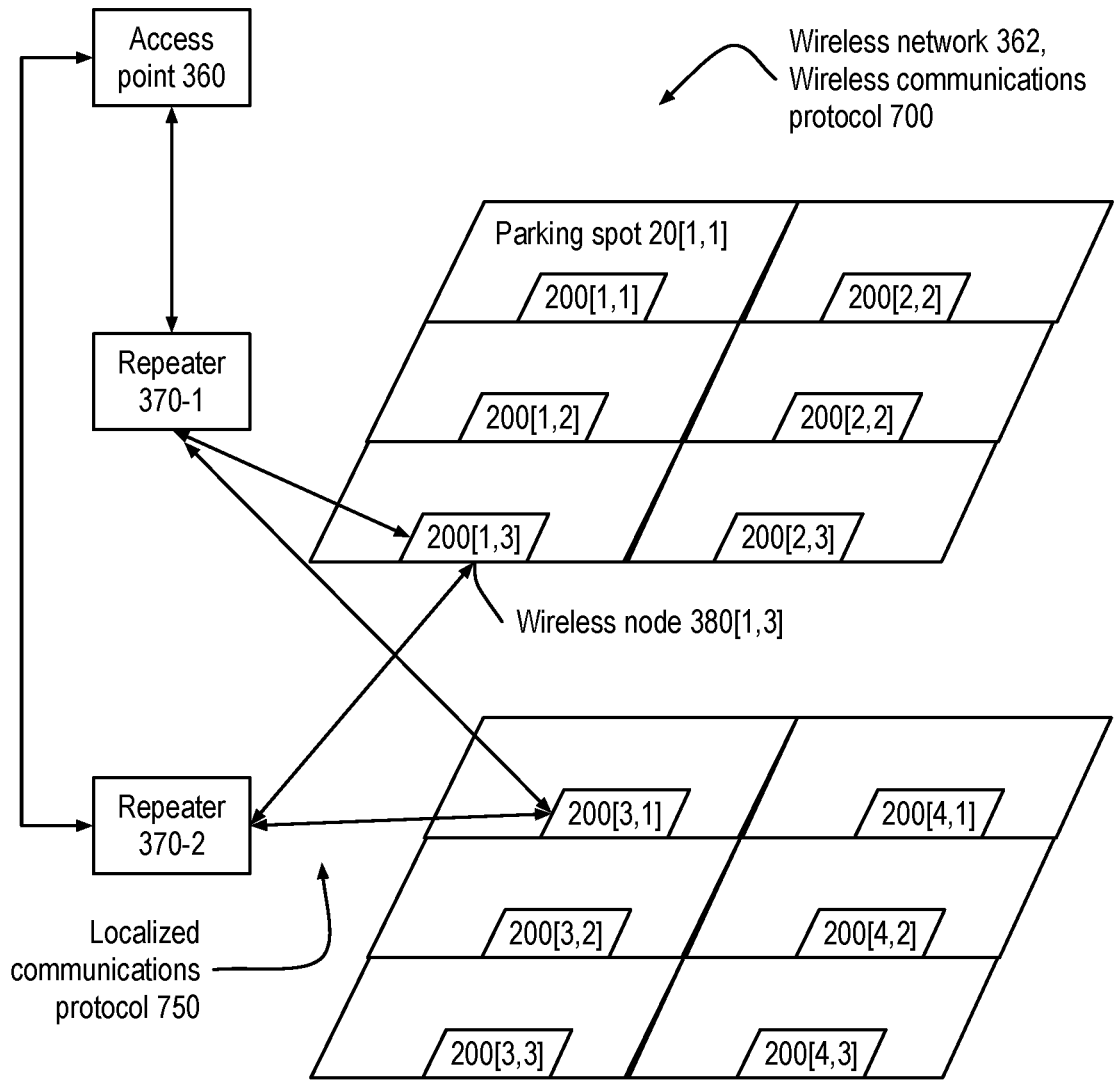

FIG. 5A shows a simplified communications diagram of the wireless network 362 implementing the wireless communications protocol 700 showing message and/or packet and/or frame communications between a single wireless node 380[1,3] implemented as the parking sensor 200[1,3].

This Figure shows a wireless network 362 as it might be applied to the parking facilities of a sporting stadium, which might include one or more hectares of parking spots 20, shown here as two grids, each including one of parking sensors 200.

By way of example, parking spot 20[1,1] is monitored by the parking sensor 200[1,1]. In a similar fashion, parking spot 20[2,2] is monitored by the parking sensor 200[2,2], and so on.

The wireless node 380[1,3] can communicate with the access point 360 through two repeaters 370-1 and 370-2.

Figure 5B:
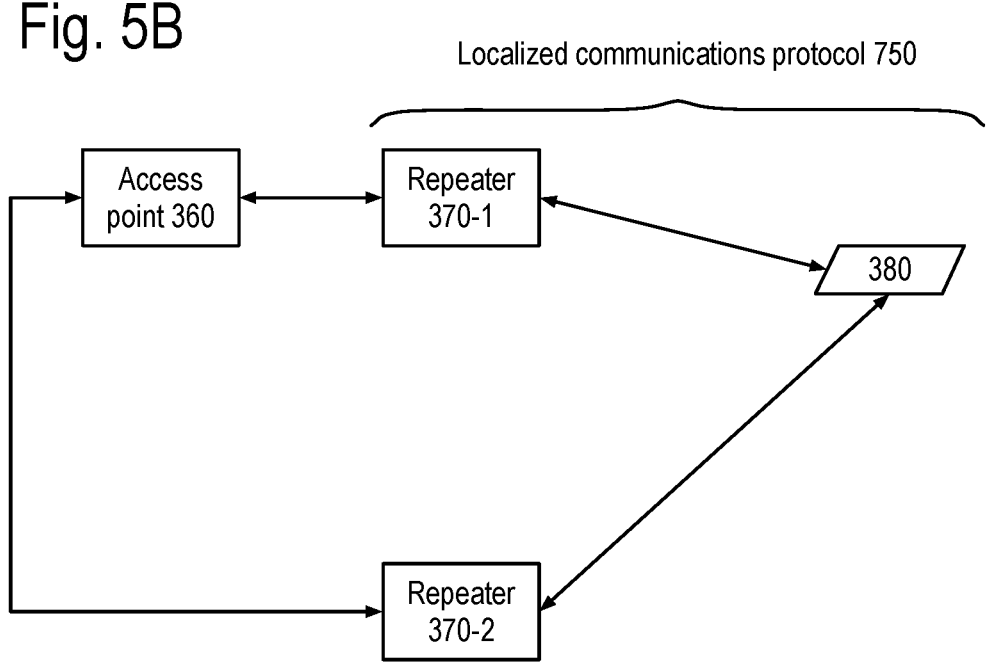

FIG. 5B shows a further simplified diagram of the wireless communications of FIG. 5A. In this Figure, the wireless nodes 380 are considered to have a fixed spatial relationship with the repeaters 370-1 and 370-2. Many network planning systems use these spatial relationships to allocate repeater services among the wireless nodes as a fixed service map.

Figure 5C:
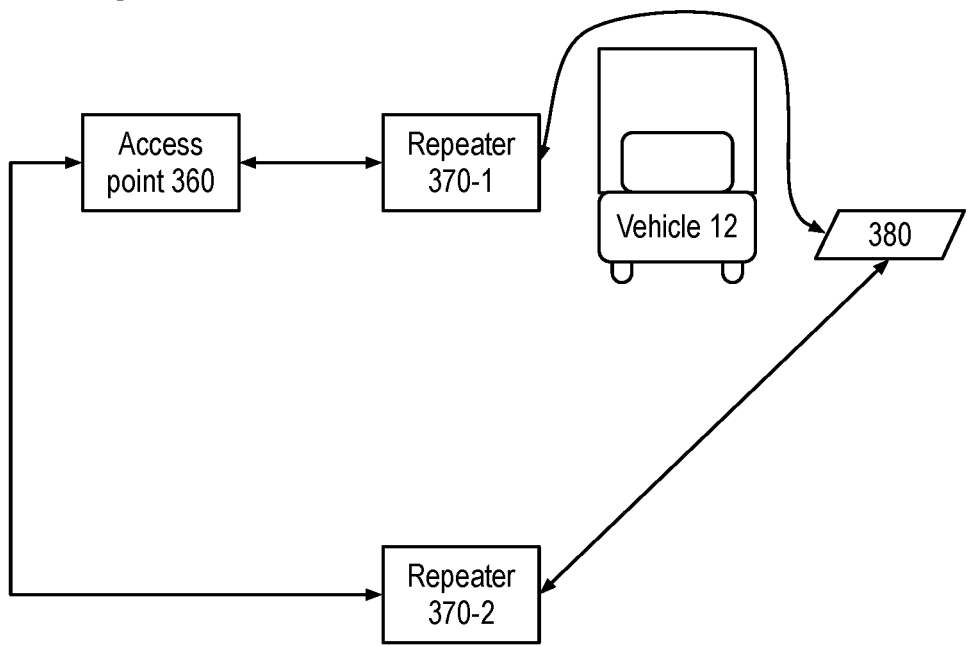

FIG. 5C shows a problem that can arise with the wireless network of the previous Figures.

Suppose that the first repeater 370-1 was allocated to service messages between the wireless node 380 and the access point 360.

Now suppose that a large vehicle 12 is parked on or near the wireless node 380, causing the signal path to become much longer and the signal strength of the wireless communications between the first repeater 370-1 and the wireless node 380 to become much weaker.

This may make the communications path between the second repeater 370-2 and the wireless node 380 much more reliable.

But there is no way to predict these occurrences. And the reallocation of the repeaters 370 servicing the wireless nodes 380 is difficult to perform in real time, in part because there may be thousands of wireless nodes 380 in a large parking facility.

FIG. 5D shows a more detailed view of the interactions of FIG. 5A to FIG. 5C in the wireless network 362 implementing the localized communication protocol 750. The access point 360 may include a received uplink message 514. How the received uplink message 514 gets to the access point 360 will now be discussed and is shown in further detail in FIG. 5E.

The first repeater 370-1 may include a first repeater identification 376-1 and the second repeater 370-2 may include a second repeater identification 376-2. These identifications 376-1 and 376-2 are preferably locally distinct so that all the repeaters 370 that can wirelessly communicate with the wireless node 380 can be distinguished by their respective identifications 376.

The wireless node 380 may use a selected repeater identification 386 to generate an uplink message 508 containing the selected repeater identification 386.

The wireless node 380 may transmit the uplink message 508 through a node transceiver 384 to the first repeater 370-1 and to the second repeater 370-2.

The first repeater 370-1 may use its first repeater transceiver 374-1 to create the first received uplink message 510-1 containing the selected repeater identification 386.

The second repeater 370-2 may use its second repeater transceiver 374-2 to create the second received uplink message 510-2, also containing the selected repeater identification 386.

Each of these repeaters 370-1 and 370-2 operates upon the selected repeater identification 386 and its repeater identification to decide whether to generate and send its uplink message to the access point 360 to create the received uplink message 514.

The first repeater 370-1 compares the selected repeater identification 386 to the first repeater identification 376-1. The first repeater 370-1 sends the first uplink message 512-1 in response to the selected repeater identification 386 matching the first repeater identification 376-1.

In many implementations, the first uplink message is generated only when there is a match.

In some implementations, the same buffer may be used for the first received uplink message 510-1 and for the first uplink message 512-1, so that the issue of generating the first uplink message 512-1 may or may not be relevant.

The second repeater 370-2 sends the second uplink message 512-2 in response to the selected repeater identification 386 matching the second repeater identification 376-2 in a fashion as discussed for the first repeater 370-1.

The access point 360 receives the uplink message from only one of the repeaters through the use of this localized communications protocol 750.

The received uplink message 514 is received as the first uplink message 512-1 from the first repeater 370-1 when the selected repeater identification 386 matches the first repeater identification 376-1.

The received uplink message 514 is received as the second uplink message 512-2 from the second repeater 370-2 when the selected repeater identification 386 matches the second repeater identification 376-2.

The localized communication protocol 750 insures that the uplink message 508 originates from the wireless node 380, uses only one repeater 370-1 or 370-2 to transfer the uplink message to the access point 360.

Figure 5E:
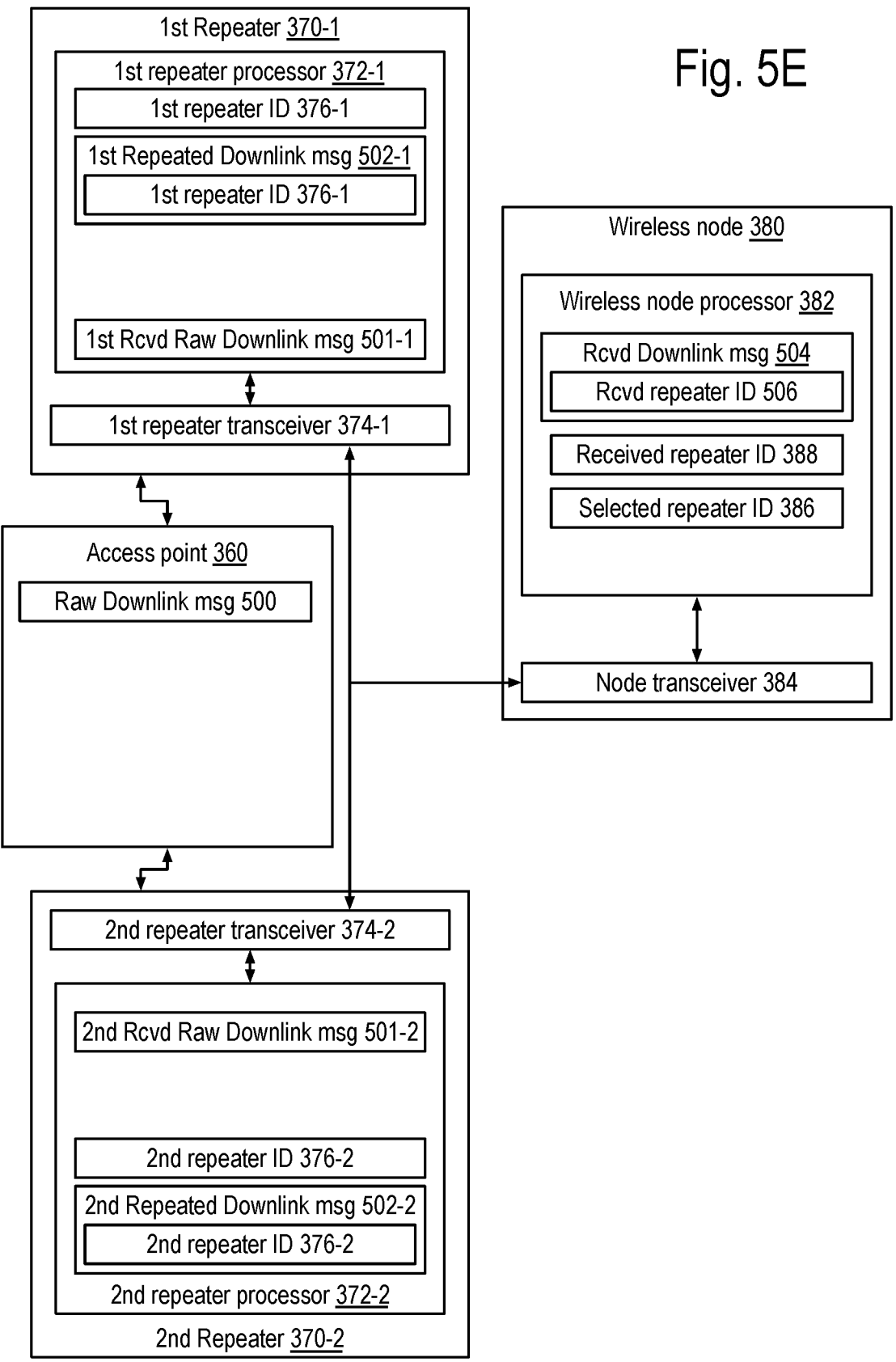
Figure 5F:
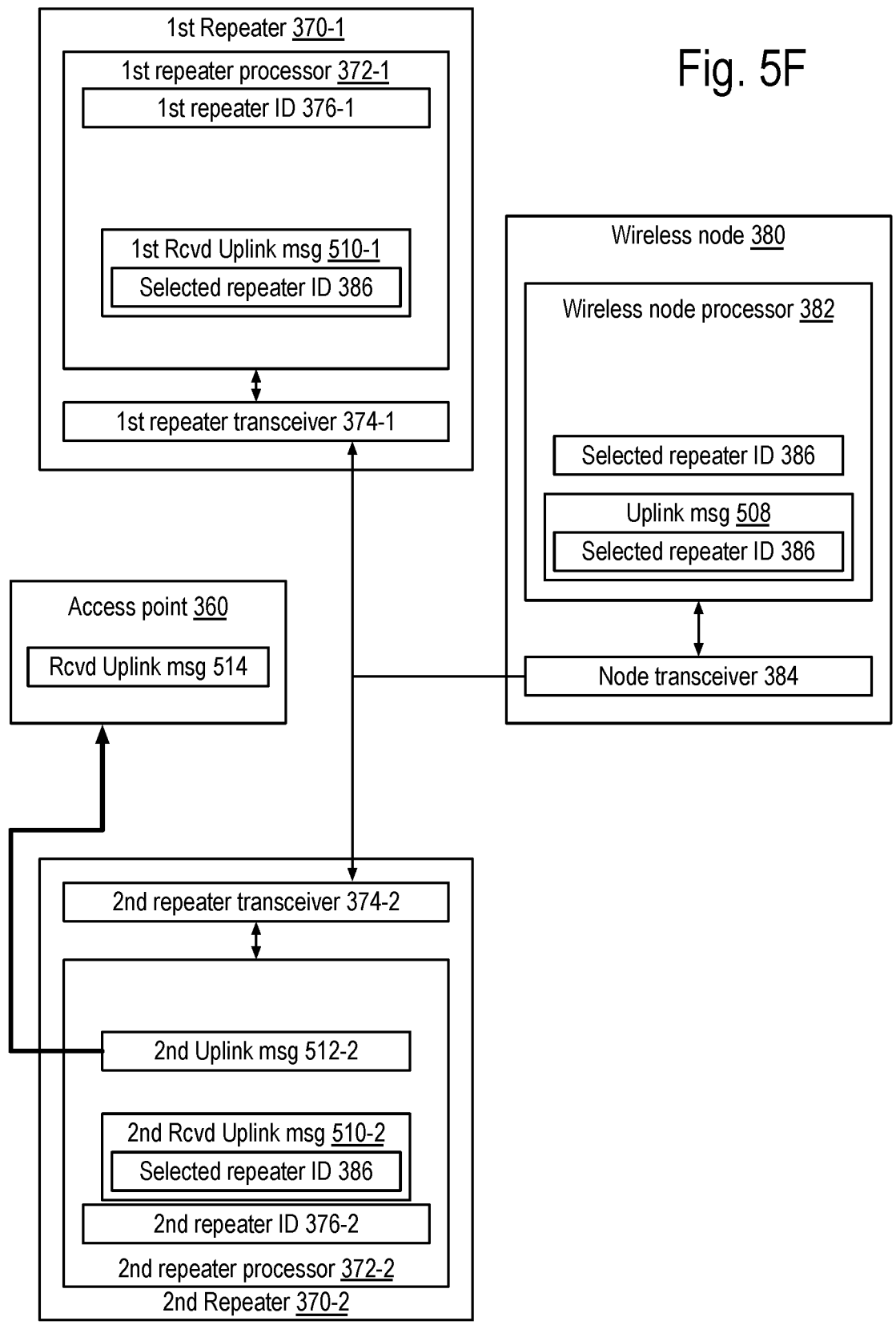

FIG. 5D, and in particular FIG. 5F, show the access point 360 may further include a raw downlink message 500 that is to be sent to the wireless node 380. Consider the following example of how the raw downlink message 500 may be sent to the wireless node 380:

The first repeater 370-1 receives the raw downlink message 500, which is used to generate the first repeated downlink message 502-1 that additionally contains the first repeater identification 376-1. The first repeater transceiver 374-1 sends the first repeated downlink message 502-1 to the wireless node 380.

The second repeater 370-2 receives the raw downlink message 500, which is used to generate the second repeated downlink message 502-2 that additionally contains the second repeater identification 376-2. The second repeater transceiver 374-2 sends the second repeated downlink message 502-2 to the wireless node 380.

The wireless node 380 may receive one or more of the repeated downlink messages 502-1 and 502-2. For the moment, let the wireless node 380 receive at least one downlink message 504 contained a received repeater identification 506.

In some embodiments, the wireless node 380 may determine the selected repeater identification 386 based upon the received repeater identifications 506 and/or based upon the quality of the received downlink messages 504, possibly as consider over a period of time, such as 10 seconds, a minute or more.

In FIG. 5D to FIG. 5F, each of the repeaters 370-1 and 370-2 is shown including a repeater processor, which may differ in structure through the wireless network 362. The potential differences in structure may not affect the operations of the localized communications protocol.

The first repeater 370-1 may include the first repeater processor 372-1, which may interact with the first repeater transceiver 374-1 to wirelessly communicate with the wireless node 380.

The second repeater 370-2 may include the second repeater processor 372-2, which may interact with the second repeater transceiver 374-2 to wirelessly communicate with the wireless node 380.

Here is an example of the kinds of structural differences that may be encountered:

The first repeater processor 372-1 may implement the operations of the localized communications protocol 750 using a finite state machine (FSM) 602 as shown in FIG. 6A.

The second repeater processor 372-2 may implement the operations of the localized communications protocol 750 using a computer 604 as shown in FIG. 6A.

The wireless node 380 may include a wireless node processor 382 that may interact with the node transceiver 384 to create the received downlink message(s) 504 and to send the uplink message 508.

In some embodiments of the localized communications protocol 750, the selected repeater identification 386 may be determined at the wireless node processor 382 based upon a wireless node program system 610 as shown in FIG. 6A. The wireless node program system 610 may have a table of selected repeater identifications 386 that may be used at different times or in different situations, such as during a sporting event.

FIG. 6A shows an example of a repeater processor 372 and/or a wireless node processor 382 communicating with a computer readable memory 530, a disk drive 532, a server 534 and/or the access point 360 to receive at least one program system 610 and/or 614 implementing the localized communications protocol 750 and/or receive an installation package 612 and/or 616 to install the program system.

The repeater processor 372 may be shown through the examples of the first repeater processor 372-1 and/or the second repeater processor 372-2 of FIG. 5D to FIG. 5F.

The repeater processor 372 and/or the wireless node processor 382 may include a processor-unit 600. These processor-units may differ between specific instances of the repeater processors 372 and/or the wireless node processors 382.

Any instance of the processor-unit 600 may include one or more instances of the Finite State Machine (FSM) 602 and/or a computer 604 and/or a memory 608.

The computer 604 may be accessibly coupled 606 to the memory 608 in some situations.

The FSM 602 receives at least one input signal, maintains at least one state and generates at least one output signal based upon the value of at least one of the input signals and/or at least one of the states.

As used herein, the computer 604 includes at least one instruction processor and at least one data processor with each of the data processors instructed by at least one of the instruction processors. At least one of the instruction processors responds to the program steps of at least one of the program systems 610 and/or 614 residing in the memory 608.

As with any memory disclosed herein, the memory 608 may include a non-volatile component, which may retain the program system 610 and/or 614 in the event that electrical power is not supplied to the memory 608. Alternatively, the memory 608 may require a regular, if not necessarily continuous, electrical power supply to retain the program system 610 and/or 614.

Regarding the repeater processor 372:

The FSM 602 may be configured by the repeater installation package 616 to implement the repeater portion 754 and/or 762 of the localized communications protocol 750 as shown and soon to be discussed regarding FIG. 7C.

The computer 604 may be instructed by the repeater program system 614 to implement the repeater portion 754 and/or 762 of the localized communications protocol 750 as shown and soon to be discussed regarding FIG. 7C.

The repeater installation package 616 may also instruct the computer 604 to implement the repeater program system 614 in the memory 608 in some embodiments.

Regarding the wireless node processor 382:

The FSM 602 may be configured by the wireless node installation package 612 to implement the wireless node portion 756 and/or 760 of the localized communications protocol 750 as shown and soon to be discussed regarding FIG. 7C.

The computer 604 may be instructed by the wireless node program system 610 to implement the wireless node portion 756 and/or 760 of the localized communications protocol 750 as shown and soon to be discussed regarding FIG. 7C.

The wireless node installation package 612 may also instruct the computer 604 to implement the wireless program system 610 in the memory 608 in some embodiments.

In discussing the operation of the repeaters 370-1 and 370-2 and the wireless node 380 some details of the messages will be referred to through the examples provided by FIG. 6D to FIG. 6G.

FIG. 6B shows an example of the repeater program system 614 supporting the repeater portion 754 and/or 762 of the localized communications protocol 750 as shown and soon to be discussed regarding FIG. 7C.

Program step 630 supports establishing the repeater identification 376, which in some embodiments may occur once or infrequently.

Note that for the first repeater 370-1, the first repeater identification 376-1 is established.

For the second repeater 370-2, the second repeater identification 376-2 is established.

Figure 6D:
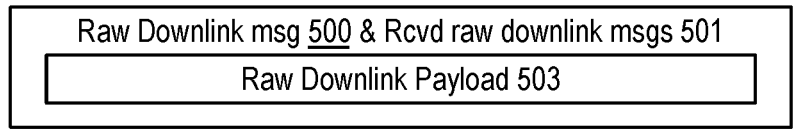
FIG. 6D to FIG. 6G show some details of the messages found in FIG. 5A to FIG. 6C.

Note that the access point 360 sends the raw downlink message 500, which is received by the repeaters 370-1 and 370-2 as the received downlink message 501, shown in FIG. 6D. The messages 500 and 501 include a raw downlink payload 503 destined for delivery to the wireless sensor node 380.

Figure 6E:
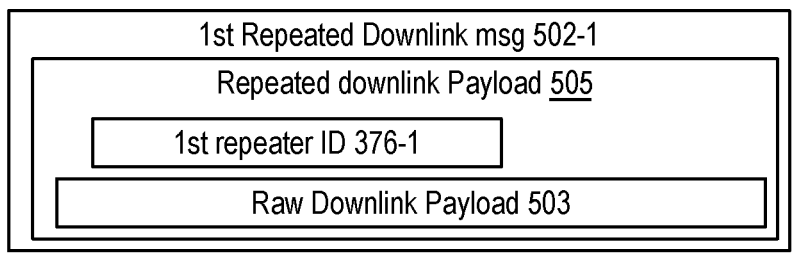

Program step 632 of FIG. 6B supports generating and sending the repeated downlink message 502 with the repeater identification 376. This operation may frequently be implemented by two further process steps:

Program step 634 supports packing the repeater identification 376 into a repeated downlink payload 505 as shown in FIG. 6E.

Program step 636 supports packing the downlink payload of the received downlink message into the repeated downlink payload.

FIG. 6E shows an example of the first repeated downlink message 502-1 for the first repeater 370-1 as shown in FIG. 5D and FIG. 5E. The repeated downlink payload 505 includes the first repeater identification 376-1 and the raw downlink payload 503 of FIG. 6D.

Program step 638 of FIG. 6B supports receiving the uplink message 508 with the selected repeater identification 386 from the wireless node 380.

Figure 6F:
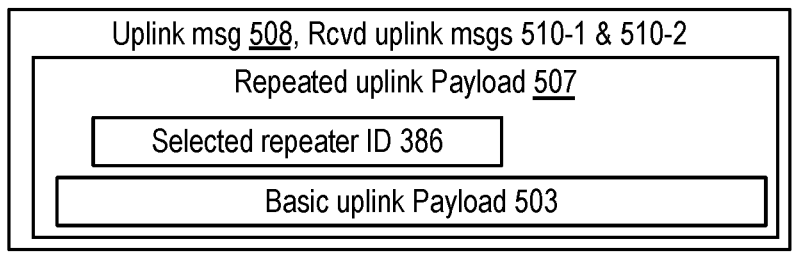

FIG. 6F shows some details of the uplink message 508, the first received uplink message 510-1 and the second received uplink message 510-2.

The first repeater 370-1 creates the first received uplink message 510-1 by receiving the uplink message 508 from the wireless node 380.

The second repeater 370-2 the second received uplink message 510-2 by receiving the uplink message 508 from the wireless node 380.

Each of the messages 508, 510-1 and 510-2 includes the selected repeater identification 386 and the basic uplink payload 503.

Program step 640 of FIG. 6B supports generating and sending the uplink message 512 if the selected repeater identification 386 matches the repeater identification 376.

The first repeater 370-1 generates and sends the first uplink message 512-1.

The second repeater 370-2 generates and sends the second uplink message 512-2.

Figure 6G:
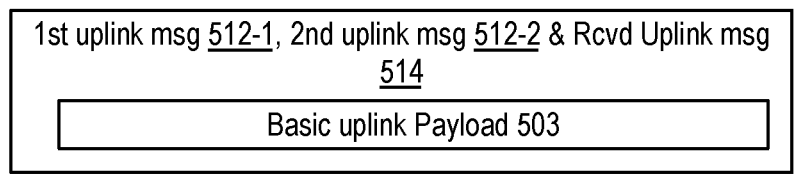

FIG. 6G shows some details of the first uplink message 512-1, the second uplink message 512-2 and the received uplink message 514, which indicates that the selected repeater identification 386 has been stripped from the messages, leaving only the basic uplink payload 503.

FIG. 6C shows an example of the wireless node program system 610 supporting wireless node 380 operation steps 756 and 760 of the localized communication protocol 750 as shown in FIG. 7C.

Program step 650 of FIG. 6C supports the wireless sensor node 380 receiving at least one repeated downlink message 502 with a repeater identification 376 to create a received repeater identification 388 as shown in FIG. 5D and FIG. 5E. This program step may further include at least one of the following:

Program step 652 of FIG. 6C supports the wireless sensor node 380 extracting the repeater identification 376 to create the received repeater identification 388.

Program step 654 of FIG. 6C supports the wireless sensor node 380 unpacking the raw downlink payload from the repeated downlink message 502.

FIG. 6E shows an example of the first repeater downlink message 502-1 including the first repeater identification 376-1 and the raw downlink payload, both as parts of the repeated downlink payload 505.

The first repeater downlink message 502-1 may be generated and send from the first repeater 370-1 to the wireless node 380 as shown in FIG. 5E.

Program step 656 of FIG. 6C supports the wireless sensor node 380 selecting from the received repeater identifications 388 to create the selected repeater identification 386.

Program step 658 of FIG. 6C supports the wireless sensor node 380 generating and sending the uplink message 508 with the selected repeater identification 386. This program step may further include at least one of the following Program step 660 of FIG. 6C supports the wireless sensor node 380 packing the selected repeater identification 386.

Program step 662 of FIG. 6C supports the wireless sensor node 380 generating and packing the basic uplink payload 503.

FIG. 6F shows an example of the uplink message 508 generated and sent by the wireless node 380 as shown in FIG. 5F.

The uplink message 508 is received by the first repeater 370-1 as the first received uplink message 510-1.

The uplink message 508 is received by the second repeater 370-2 as the second received uplink message 510-2.

The messages 508, 510-1 and 510-2 include the selected repeater identification 386 and the basic uplink payload 503, which may both be packaged as the repeated uplink payload 507.

FIG. 6D to FIG. 6G show some details of the messages found in FIG. 5A to FIG. 6C which have been discussed with regards to the program systems 610 and 614 of FIG. 6B and FIG. 6C.

FIG. 7A and FIG. 7B show some details involved in a wireless communications protocol 300.

FIG. 7A shows the wireless communication protocol 700 may implement at least one, and sometimes several, of the following communications methods:

A Frequency Division Multiple Access (FDMA) 702 method, whereby the wireless communications are allocated frequency bands, which may or may not remain fixed as the wireless network evolves through time.

A Time Division Multiple Access (TDMA) 704 method that multiplexes wireless communications based upon a shared estimate across the network of time divisions. An example of a TDMA method may maintain a global clock count at the access point. The access point may transmit a clock synchronization message via the repeaters to all the sensors in the network. Upon receipt by each of the sensors, a local clock estimate may be updated.

The communication to and from the sensors may be coordinated based upon the global clock count at the access point and the local clock estimates at the sensors.

In some embodiments, the repeaters may also maintain a local clock count that may be used to synchronize their transmissions to the access point and control a time delay in sending transmissions to specific sensors.

A Spread Spectrum method 706, which may include implementations of at least one, and possibly more than one, of the following:

A Code Division Multiple Access (CDMA) 708 method that uses of one or more layers of spreading codes.

A Frequency Hopping Multiple Access (FHMA) 710 method that uses differing frequencies band over time as estimated by the global clock count at the access point and the local clock estimate at the sensor and/or at the repeaters.

A Time Hopping Multiple Access (THMA) 712 method that uses differing time offsets for transmission and/or reception by the access point, the repeaters and the sensors.

An Orthogonal Frequency Division Multiple access (OFDM) 714 method may include the following:

The OFDM transmission of a message may include a Fourier or wavelet modulation of a part of the message to create a modulated component that is then up converted and mixed for transmission as an antenna output.

The reception of the message may include an antenna input that is down converted to generate the modulated component, which is then transformed by the inverse Fourier or wavelet modulation to generate part of the received message.

Any of these wireless communications methods may include filtering, signal estimators, error correction encoding and/or decoding, as well as possibly other forms of encryption.

FIG. 7B shows that examples of the wireless communications protocols 700 and/or the wireline communications protocols 730 may implement various versions of standards developed and/or maintained by the Institute of Electrical and Electronic Engineers (IEEE) 720, the China Communications Standards Association (CCSA) 722, European Telecommunications Standards institute (ETSI) 724 and/or Association of Radio Industries and Businesses (ARIB) 726.

Examples of such standards include the IEEE 802 family of communications protocols, and from ETSI 724, the GSM and LTE wireless communications protocols 700.

Examples of the wireline communications protocols 730 may be used to implement wireline communications across one or more of following:

In FIG. 2H, the communications cable 193 may implement a form of Universal Serial Bus (USB) and/or a form of Ethernet, both of which are standards developed by IEEE (720).

In FIG. 3C, the first wireline communications protocol 302-1, the second wireline communications protocol 302-2, the third wireline communications protocol 302-3, the fourth wireline communications protocol 302-4, and/or the fifth wireline communications protocol 302-5 may implemented as standards developed and/or maintained by at least one of the organizations of FIG. 7B.

In FIG. 3D, the first wireline communications protocol 330-1 and the second wireline communications 330-2 may interface at a parking monitor server 162 ion a form of a client server communications protocol, possibly supporting a TCP-IP stack, possibly an internet protocol.

FIG. 7C shows an overall operational description of the localized communication protocol in terms of repeaters 370 and wireless nodes 380. These operations have been discussed throughout the description of FIG. 5A to FIG. 6G.

FIG. 8A to FIG. 8F show some examples of a Power Control Circuit (PCC) 800 supporting the use of a one-charge battery 802 when a rechargeable battery 842 and a photovoltaic cell 840 are unable to supply electrical power 194 to a load 804.

FIG. 8A shows the PCC 800 including at least two couplings, a one-charge coupling 818 and a load coupling 816. The PCC may be adapted to control at least one power switch 811 by controlling the state of the one-charge control signal 820.

The power input to the power switch 811 is coupled through the one-charge coupling 818 to the one-charge battery(ies) 802.

The power output of the power switch 811 is presented to a rectifier 813 before being coupled through the load coupling 816 to drive the load 804 with electrical power 194 from the one-charge battery(ies) 802 when the power switch 811 is closed.

When the power switch 811 is open, the rectifier 813 may prevent the wasting of electrical power in the form of Direct Current (DC) being wasted by being propagated back through the power switch 811 to the one-charge battery 802, that cannot be recharged.

By way of example, the PCC 800 may include a PCC processor-unit 810 which may respond to a recharge state 806 and a load required state 812. The PCC processor-unit

810 may control the one-charge switch 814 in terms of the recharge state 806 and the load required state 812.

In some situations, the one-charge battery(ies) 802 may be connected to the load 804 in response to the load 804 being required and insufficient recharge state.

Connecting the one-charge battery(ies) 802 to the load 804 may be achieved by asserting the one-charge control signal 820 in response to the recharge state 806 being insufficient and the load required 812 being needed soon.

There are several implementations being disclosed and claimed for the PCC 800 and its PCC processor-unit.

FIG. 8B shows a simplified block diagram as to how the PCC 800 and/or the PCC processor-unit may be configured to implement various embodiments of this apparatus and its operations. The processor-unit 810 may include at least one instance of at least one of the following, which have each been previously discussed a Finite State Machine (FSM) 822, a computer 824, and/or a PCC memory 828.

In some implementations, the computer may be accessibly coupled 826 to the PCC memory 826.

The PCC memory 826 may contain a PCC program system 830 that may further include program steps, which will be further discussed regarding FIG. 8C and FIG. 8F shortly. These program steps may instruct at least one instruction processor within the computer 824 to implement the operations of the PCC 800.

The PCC memory 826 may contain a PCC installation package 832.

The PCC installation package may be used to configure the FSM 822 to implement the processor-unit 810 to operate as the PCC 800. In some embodiments, the FSM 822 may include at least one programmable logic circuit, such as a Field Programmable Gate Array (FPGA).

In some embodiments, which may or may not be an alternative, the PCC installation package 832 may include instructions directing the computer 824 to create the PCC program system 830 in the PCC memory 828.

The PCC 800 and/or the PCC processor-unit 810 may be implemented as an integrated circuit.

In some embodiments, one or more of the computer readable memory 530, the disk drive 532, the server 534 and/or the access point 360 may contain and/or provide the PCC program system 830 and/or the PCC installation package 832 to the processor-unit 810.

FIG. 8C shows a simplified flowchart of the PCC program system 830 of FIG. 8B. The simplest form of this program system will be discussed first, then FIG. 8A will be revisited before completing discussion of this flowchart.

Program step 834 supports the control 820 of the one-charge switch 814 in terms of the recharge state 806 and the load required state 812. This program step may further include Program step 836 supporting connecting the one-charge battery(ies) 802 through the one-charge switch 814 in response to the load required state 812 and the recharge state 806 being insufficient.

In some implementations, the PCC processor-unit 810 may operate and/or have access to a clock timer circuit and maintain a long time indication sufficient to not only call out portions of a second, but also of a day and of several months.

The PCC processor-unit 810 need only clocked at one or more thousands of instruction cycles per second and maintain counters or variables of 16 bits or more to achieve this performance threshold.

With the approach of winter, the PCC program system 830 may be implemented to generate and maintain the recharge state 806 and the load required 812 without recourse to any other sensors.

As a consequence, such implementations could project the decline in the recharge state by simply assuming that the sun was obscured or missing from the visible sky.

The load required 812 may similarly be estimated with accuracy, particularly if the clock is shared with other resources, such as found in a repeater 370 as shown in FIG. 8D.

In some other implementations, the recharge state 806 and/or the load required 812 may be sensed.

Returning to FIG. 8A, the PCC processor-unit 810 may further respond to a Photo-Voltaic (PV) state 808.

In some embodiments, the PV state 808 may indicate that a PV cell 840, such as shown in FIG. 8D, may be capable of providing the electrical power 194 for the load 804.

In some of these situations, the PV cell(s) 840 may be used instead to provide electrical power 194 for the load 804.

As with the recharge state 806 and/or the load required 812, the PV state 808 may be based upon the operation of a clock timer and/or sensed.

Returning to FIG. 8C, the PCC program system 830 may include the following:

Program step 837 that supports controlling 820 the one-charge switch 814 in terms of the recharge state 806, the PV state 808 and the load required 812. This program step may further include Program step 838 that supports connecting the one-charge battery(ies) 802 through the one-charge switch 814 in response to the load required 812 and the recharge state 806 being insufficient and the PV state 812 being insufficient.

Examples of the load 804 may include a radio transceiver such as the repeater transceiver 374, a radar 912 such as discussed starting with FIG. 9C, a processor, and/or a processor-unit as found in various situations throughout at least this document.

Some examples of the apparatus that may include the PCC 800 are a parking sensor 200 and/or a repeater 370. The PCC 800 may control the electrical power 194 going to more than one load 804.

FIG. 8D shows the repeater 370 including the repeater transceiver 374 as a first load 804-1 and the repeater processor 372 as a second load 804-2. The repeater may include one or more photovoltaic cell(s) 840, one or more rechargeable battery(ies) 842 as well as the loads 804-1 and 804-2 coupled to the PCC 800. The PCC 800 may operates as follows The electrical power 194 of the photovoltaic cell(s) 840 may be directed to the rechargeable battery (ies) 840 in response to the photovoltaic cell(s) 840 being able to charge the rechargeable battery (ies) 840.

The PCC 800 may uncouple the rechargeable battery (ies) 840 in response to the photovoltaic cell(s) 840 being unable to charge the rechargeable battery (ies) 840.

The PCC 800 may couple the rechargeable battery (ies) 840 to at least one of the loads 804-1 and/or 804-2 in response to determining the rechargeable battery (ies) 840 can provide the sufficient electrical power 194 when it is needed.

The PCC 800 may uncouple the rechargeable battery (ies) 840 from the load 804-1 and/or load 804-2 in response to determining that the rechargeable battery (ies) 840 cannot provide the needed electrical power 194.

And the PCC 800 may couple the one-charge battery (ies) 802 to the load 804-1 and/or 804-2
- in response to the rechargeable battery (ies) 840 being unable to provide sufficient electrical power 194 and
- in response to the load 804-1 and/or 804-2 needing the electrical power 194.

The PCC 800 may be implemented as a circuit board, an integrated circuit and/or as a processor instructed to act as the PCC, such as the repeater processor 372.

In some situations, the charging of one or more rechargeable battery (ies) 842 and the charging of one or more loads 804-1 and/or 804-2 may occur at the same time.

FIG. 9A to FIG. 9C show examples of the parking sensor 200 discussed above that may include any combination of an infrared transceiver (possibly just its transmitter or receiver), an ultrasonic sensor and/or a radar. Such sensors may be configured to operate in accord with the preceding discussion.

FIG. 9A shows an example of two instances of the parking sensor 200 including infrared transceiver components. The parking sensor 200 may be configured to use the infrared transceiver 900 to estimate the distance of the vehicle 12 using a triangulation approach where the first infrared sensor transmits 902 an infrared signal that bounces off of the vehicle 12 and is received 904 by the second infrared sensor.

Note that some parking sensors 200 may have only an infrared transmitter 902, such as the first parking sensor 200-1, and others an infrared receiver 904, such as the second parking sensor 200-2.

In other cases, the parking sensor 200 may include both the infrared transmitter and the infrared receiver, which is referred to herein as an infrared transceiver 900.

FIG. 9B shows an example of one instance of the parking sensor 200 including an ultrasonic sensor 910 that transmits an ultrasonic signal that bounces off of the vehicle 12 and is received by the ultrasonic sensor 910.

FIG. 9C shows an example of one instance of the parking sensor 200 including a radar 912 that transmits a microwave signal as an antenna output 3122 that bounces off of the vehicle 12 to create a Radio Frequency (RF) reflection 3124 received by the radar 912.

FIG. 9D shows some details of the radar 912 implemented as possibly a combination of a micro-radar 3100, a Zero Intermediate Frequency (ZIF) radar 916, and/or a superheterodyne radar 916.

A micro-radar 3100 may have an antenna output 3122 of less than ten milli-watts (mW).

A ZIF radar 916 may lack an Intermediate Frequency (IF) section in both its transmitter and its receiver.

A superheterodyne radar 916 includes an IF section in at least one of its transmitter and/or its receiver.

The superheterodyne radar 916 may further be implemented as a homodyne radar 918 that shares an oscillator between its transmitter and receiver.

Here are some examples of the radar 912 that may be useful in a variety of situations.

Particularly when the parking sensor 200 supports a wireline communication protocol and may further possess the opportunity to be supplied with electrical power 194 across a landline, the radar 912 may not be a micro-radar 3100.

Figure 10A:
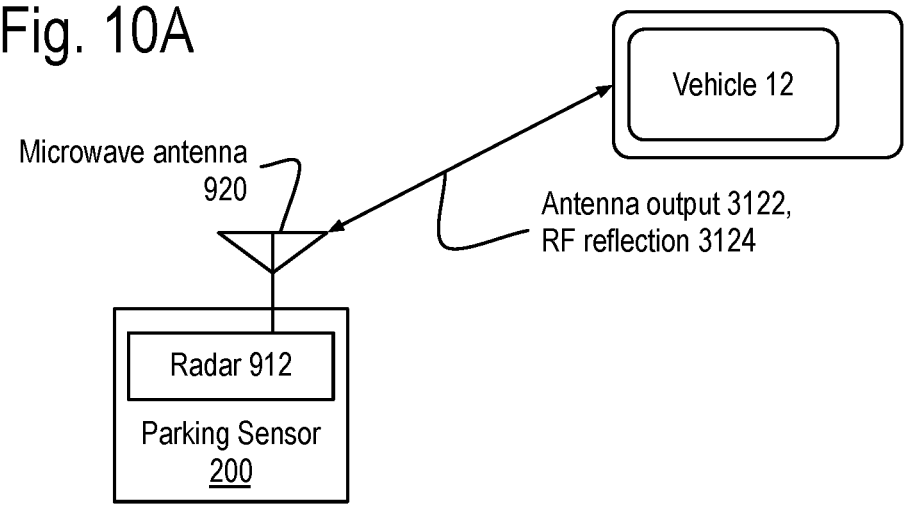
FIG. 10A shows a refinement of the sensor of FIG. 9C including a radar coupled to at least one microwave antenna with a transmission/reception pattern as shown in FIG. 10B. The parking sensor will be position at the center of the polar coordinate grid throughout this disclosure. The transmission/reception pattern may dominate one half the plane of transmission, which will be referred to as the half plane. Dominating the half plane supports the parking sensor distinguishing between vehicles parked in adjacent parking spots.
Figure 10B:
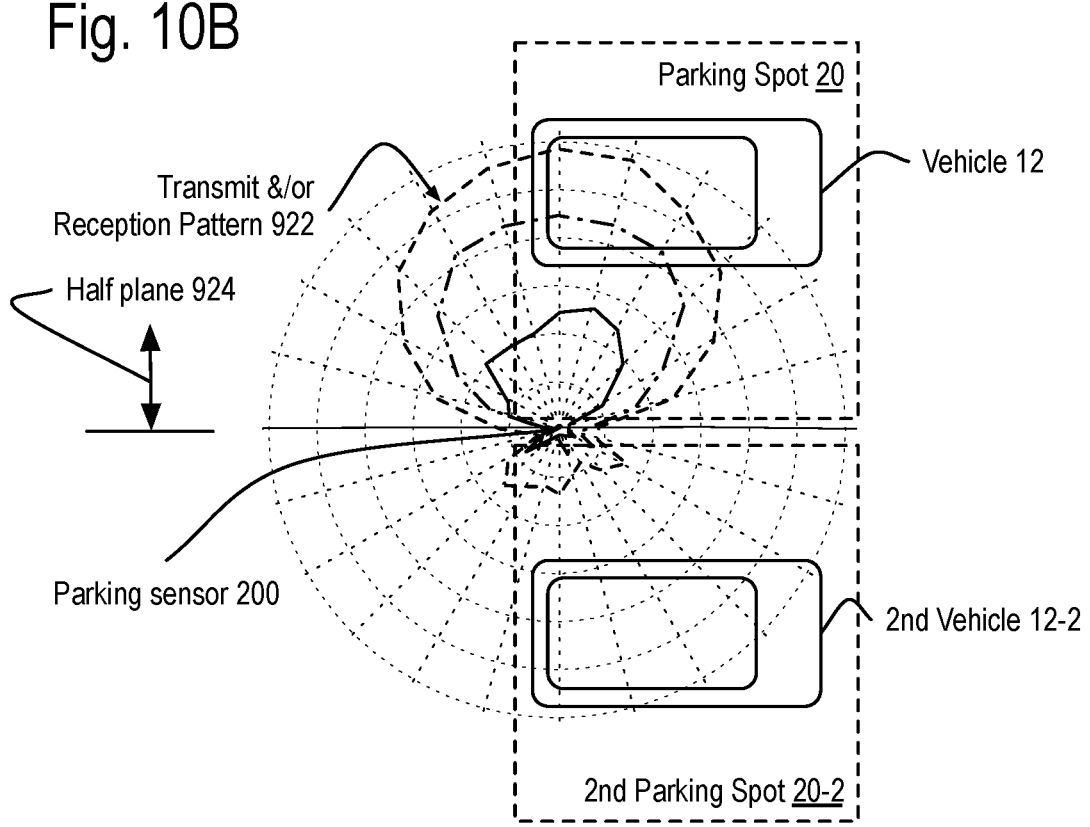

FIG. 10A shows a refinement of the parking sensor 200 of FIG. 9C including the radar 912 coupled to at least one microwave antenna 920 with a transmission/reception pattern 922 as shown in FIG. 10B.

As show herein, the parking sensor 200 will be positioned at the center of a polar coordinate grid throughout this disclosure.

The transmission/reception pattern 922 may dominate one half the plane of transmission, which will be referred to as the half plane 924.

Dominating the half plane supports the parking sensor 200 distinguishing between vehicle 12 and the second vehicles 12-2 parked in adjacent parking spots 20.

Put another way, the transmission reception pattern 922 may be shaped to be asymmetrically receptive in one half plane of reception as shown in FIG. 10B, so that the radar 912 combined with the microwave antenna 920 can distinguish between a first vehicle 12 parked in a first parking spot 20 and a second vehicle 12-2 parked in a second parking spot 20-2.

The radar 912 may operate as the micro-radar 310. The microwave antenna 920 may be adapted to form a single sided lobe pattern with a focused direction used to generate the direction from the parking sensor 200 to the vehicle 12 as part of the determination of the parking position 130 of the vehicle 12 in the parking spot 20.

Figure 11A:
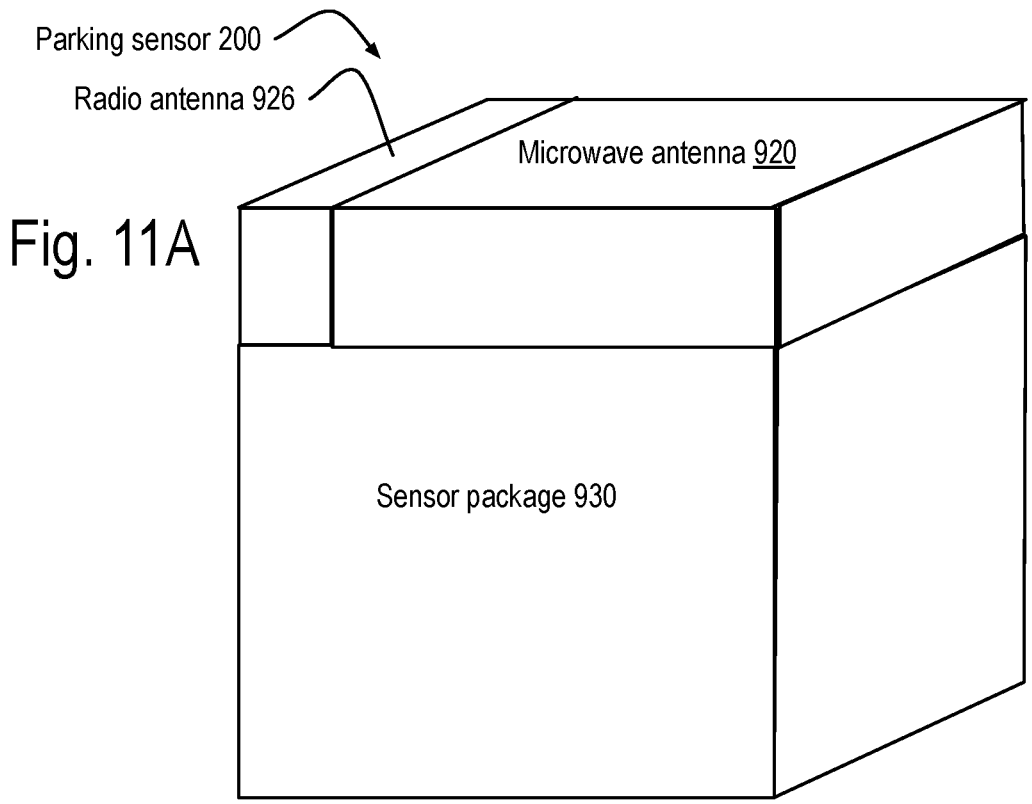
FIG. 11A and FIG. 11B show examples of sensor implementations with a wireline and a wireless network communications interfaces, respectively. The wireline communications interface may further be adapted to provide electrical power to the sensor.
Figure 11B:
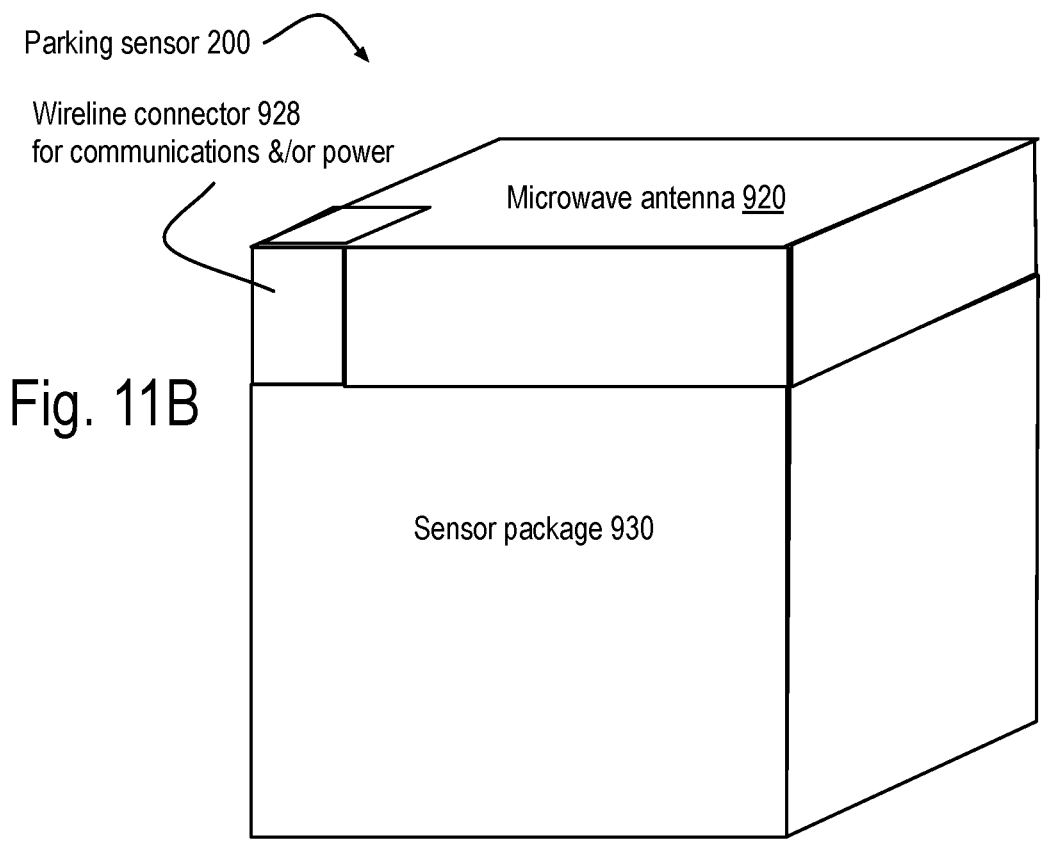

FIG. 11A and FIG. 11B show examples of implementations of the parking sensor 200 with a wireline and a wireless network communications interfaces, respectively.

FIG. 11A shows the parking sensor 200 including a radio antenna 926 adapted for wireless communication and a microwave antenna 920 adapted for use with the radar 912.

FIG. 11B shows another implementation of the parking sensor 200 including a wireline connector 928 adapted for at least communications and the microwave antenna 920 adapted for use with the radar 912.

The wireline communications interface may further be adapted to provide electrical power 194 to the parking sensor 200.

Figure 11C:
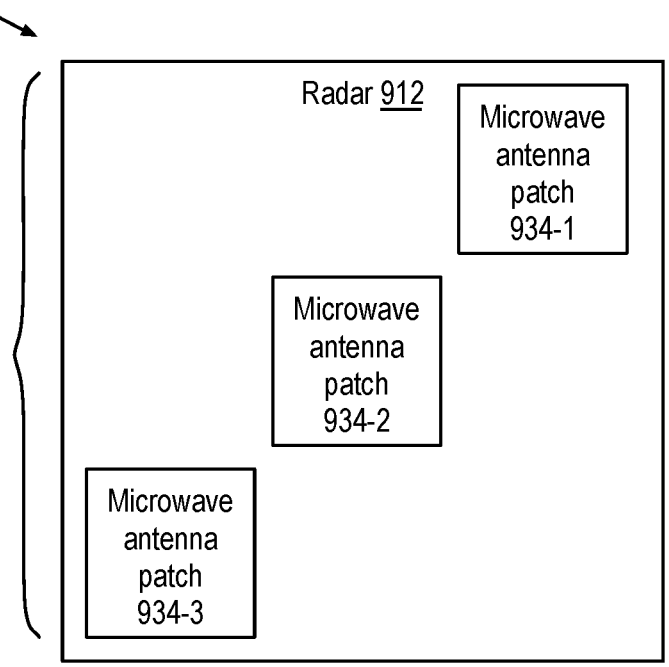
FIG. 11C shows an example of the microwave antenna including a patch antenna and possibly a patch antenna array.

FIG. 11C shows an example of the microwave antenna 920 including at least one patch antenna 934-1 and possibly a patch antenna array 932 including the patch antennas 934-1, 934-2 and/or 934-3.

The radar 912 may be fabricated immediately below the microwave antenna 920, the patch antenna 934-1 and/or the patch antenna array 932.

The radar 912 and/or the microwave antenna 920 may be fabricated as a printed circuit 3104 and/or as an integrated circuit 3102.

Figure 11D:
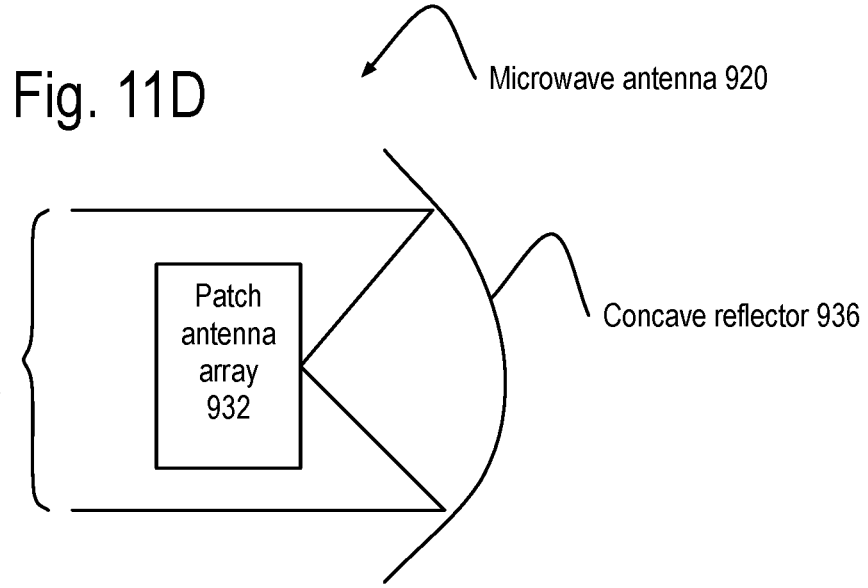
FIG. 11D shows an example of the microwave antenna of FIG. 11C further including a concave reflector to support shaping the transmission/reception pattern.

FIG. 11D shows an example of the microwave antenna 920 of FIG. 11C further including a concave reflector 936 to support shaping the transmission/reception pattern.

FIG. 11E to FIG. 11J show examples of the microwave antenna 920 including a radiator 940 feeding a horn antenna 960 and/or a waveguide 950 and possibly further tuned by one or more tuning bars 962 outside the horn antenna 960.

FIG. 11E shows the microwave antenna 920 including the radiator 940 coupled with the wave guide 950 to send the antenna output 3124 and receive the RF reflection 3124.

FIG. 11F shows the microwave antenna 920 including the radiator 940 coupled with the horn antenna 960 and responding to at least one of the tuning bar(s) to send the antenna output 3124 and receive the RF reflection 3124.

FIG. 11G shows the microwave antenna 920 including the radiator 940 coupled with the wave guide 950 creating a right angle bend and coupled with the horn antenna 960 to send the antenna output 3124 and receive the RF reflection 3124.

FIG. 11H shows a refinement of the microwave antenna 920 of FIG. 11G with the horn antenna 960 responding to at least one of the tuning bars 962 to send the antenna output 3124 and receive the RF reflection 3124.

Figure 11I:
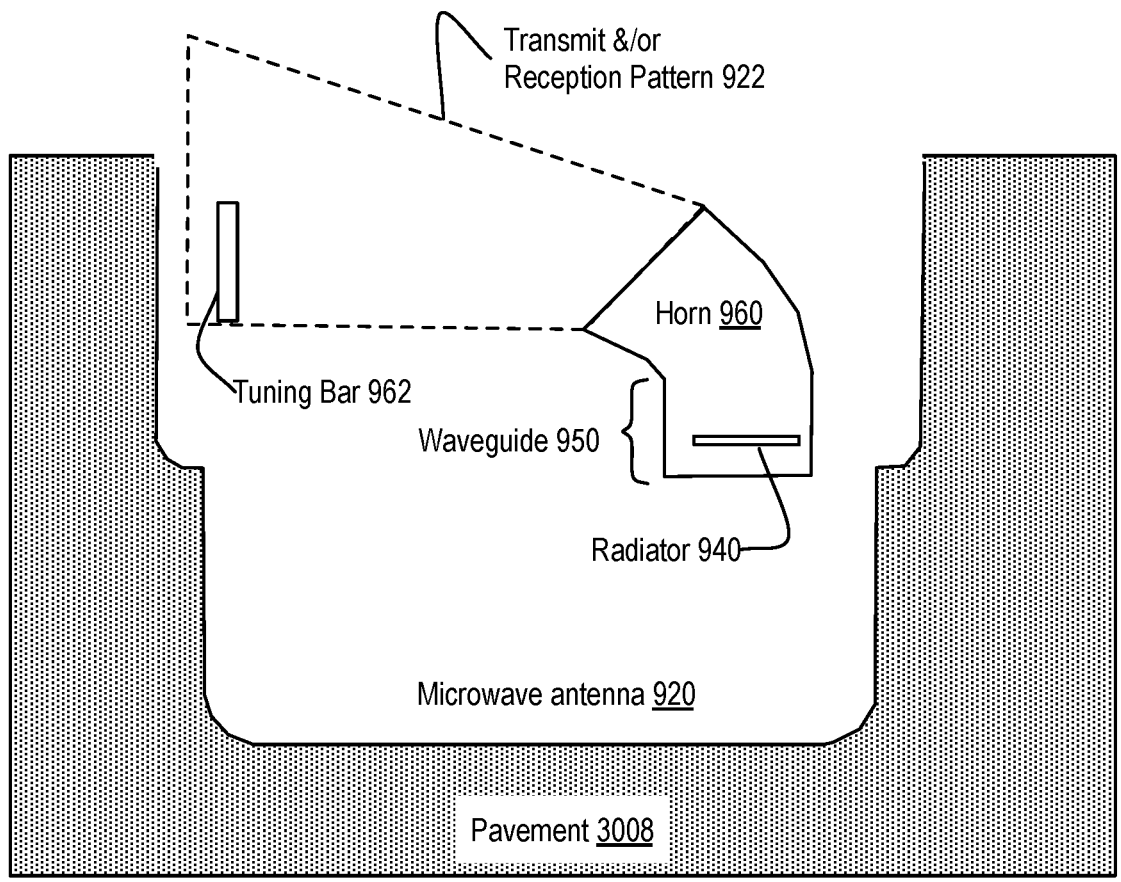
Figure 11J:
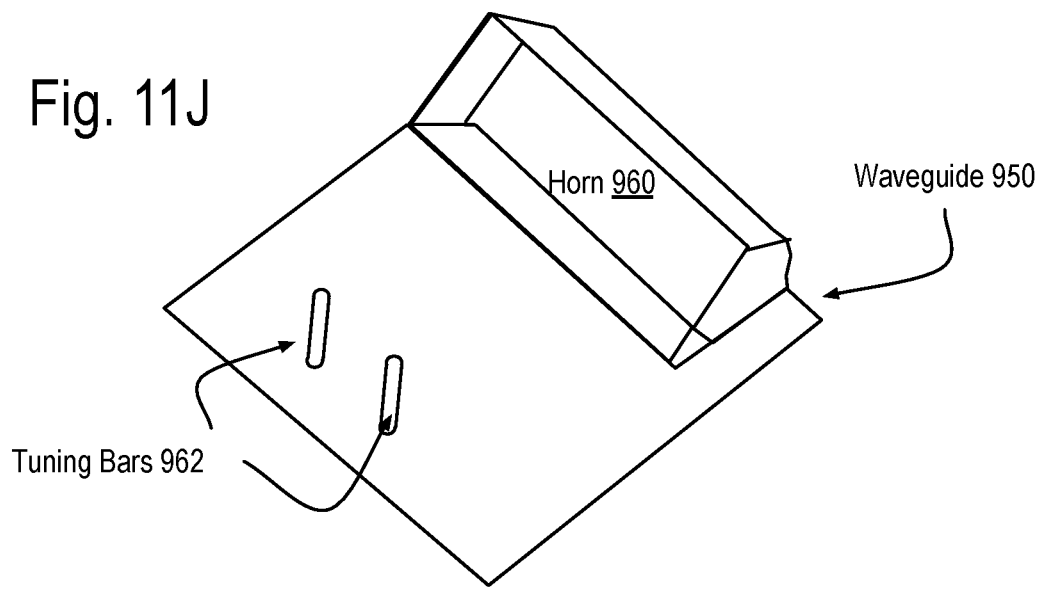

FIG. 11i and FIG. 11J show an implementation of the microwave antenna 920 of FIG. 11H.

In some situations the waveguide 950 may be considered to have a nearly constant aperture cross-section as it bends in one radial dimension.

The bend in the waveguide 950 may be about 60 degrees to 110 degrees. In some embodiments, the bend may be about 80 degrees to 100 degrees. In some further embodiments, the bend may be about 85 degrees to 95 degrees.

The horn antenna 960 may increase in the aperture cross section as it progresses away from the radiator 940.

The horn antenna 960 may have a depth of roughly one quarter or more of the wavelength of the antenna output 3122.

Assume for the moment that the carrier frequency 3123 of the antenna output 3122 is about 6.36 Giga Herz (GHz).

The horn antenna 960 may then have a depth of roughly 1 centimeter (cm) to 1.5 cm.

The tuning bar(s) 926 may have a thickness of at least 2 millimeters (mm) to 1 cm. The tuning bar(s) 926 may have a height of at least one quarter the wavelength of the antenna output 3122 to at most three halves the wavelength. As used herein, the wavelength is about the speed of light divided by the carrier frequency 3123 of the antenna output 3122.

The radiators 940 may include versions of a single pole, a dipole, a patch antenna and/or a patch antenna array.

Figure 12A:
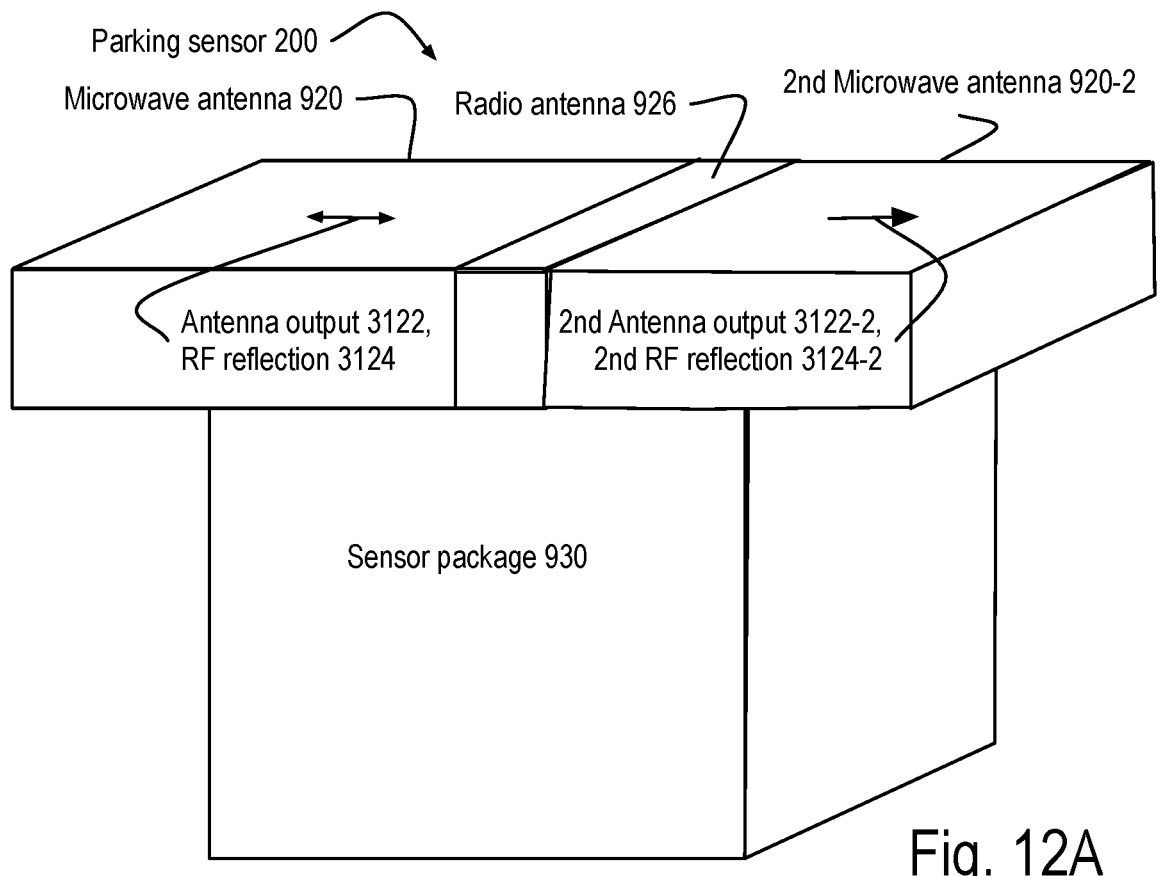
FIG. 12A to FIG. 12D show an example of the sensor including two microwave antennas that may be configured to separately detect the first vehicle 12 in the first parking spot 20 and the second vehicle 12 in the second parking spot 20-2.
Figure 12B:
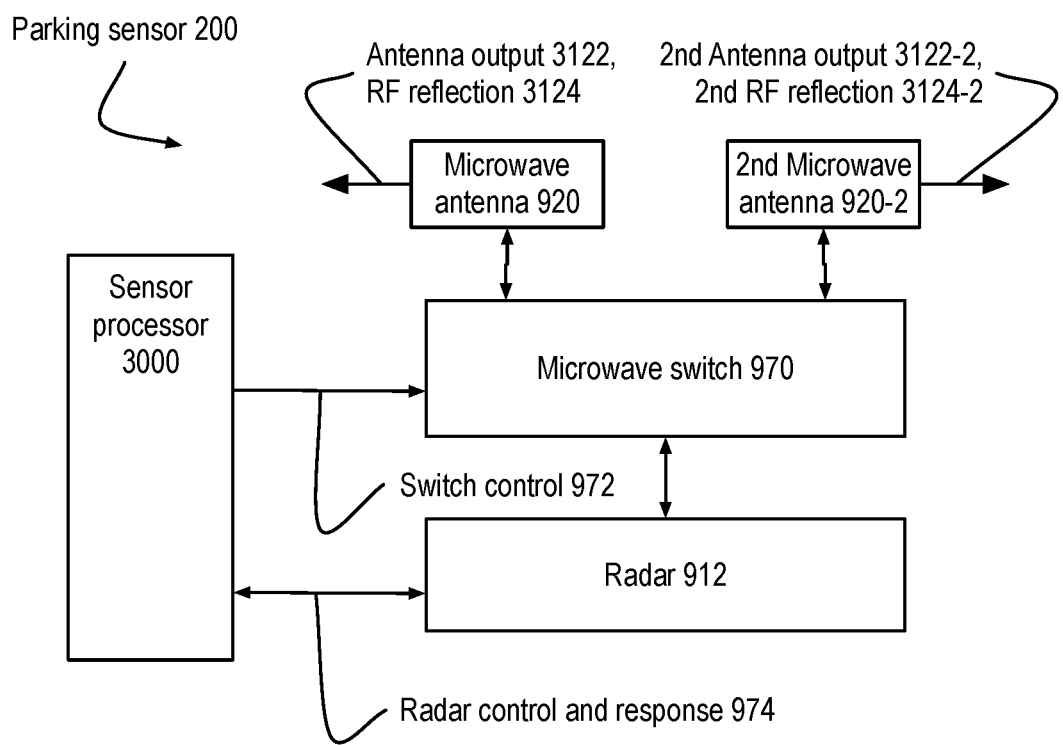
Figure 12C:
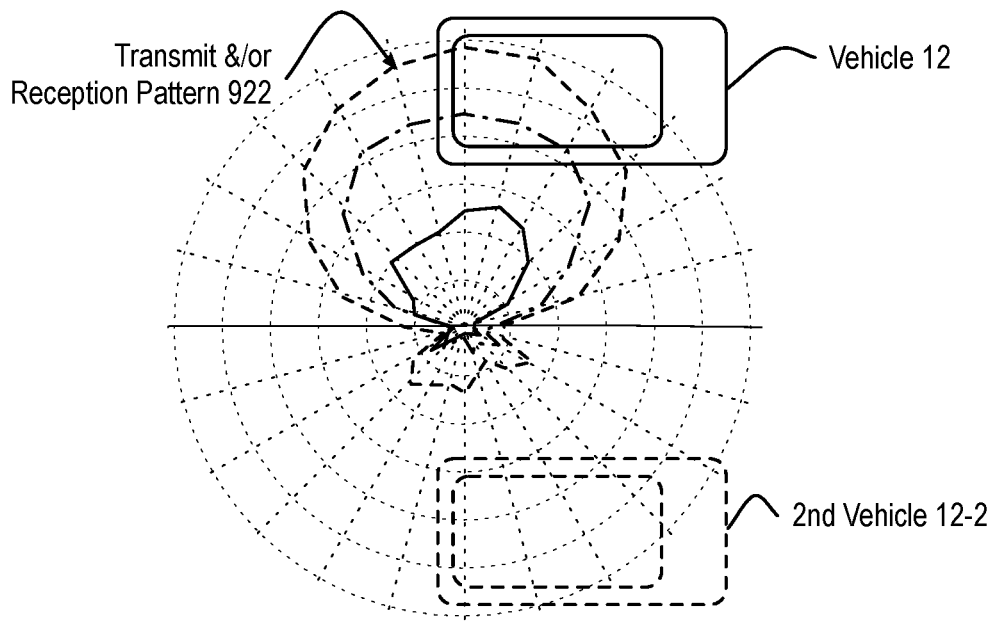

FIG. 12A to FIG. 12C show an example of the parking sensor 200 including two microwave antennas that may be configured to separately detect the first vehicle 12 in the first parking spot 20 and the second vehicle 12-2 in the second parking spot 20-2.

FIG. 12A shows a simplified mechanical drawing of the parking sensor 200 with the first microwave antenna 920 and the second microwave antenna 920-2 positioned on either side of the radio antenna 926. This antenna assembly is attached to the sensor package 930 and possibly a battery store.

The microwave antenna 920 is adapted to generate the antenna output 3122 in a first direction indicated by an arrow and to receive the RF reflection 3124 in that first direction.

The second microwave antenna 920-2 may be adapted to generate the antenna output in a second, nearly opposite direction, and to receive the RF reflection 3124 in the second direction.

FIG. 12B shows a simplified block diagram of the parking sensor 200 showing a microwave switch 970 controlled by a sensor processor 300 to operate the coupling of the radar 912 with one of the two microwave antennas 920 and 920-2.

FIG. 12C shows the parking sensor 200 detecting the first vehicle 12 in the first parking spot 20 using the first microwave antenna 920 coupled through the microwave switch 970 to the radar 912.

Figure 12D:
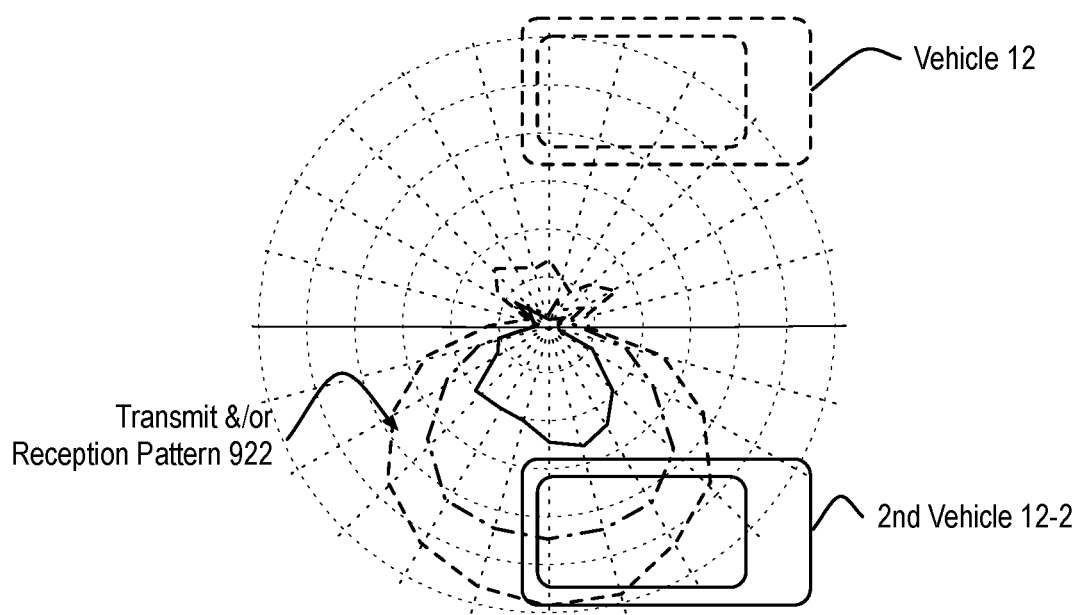
Figure 13A:
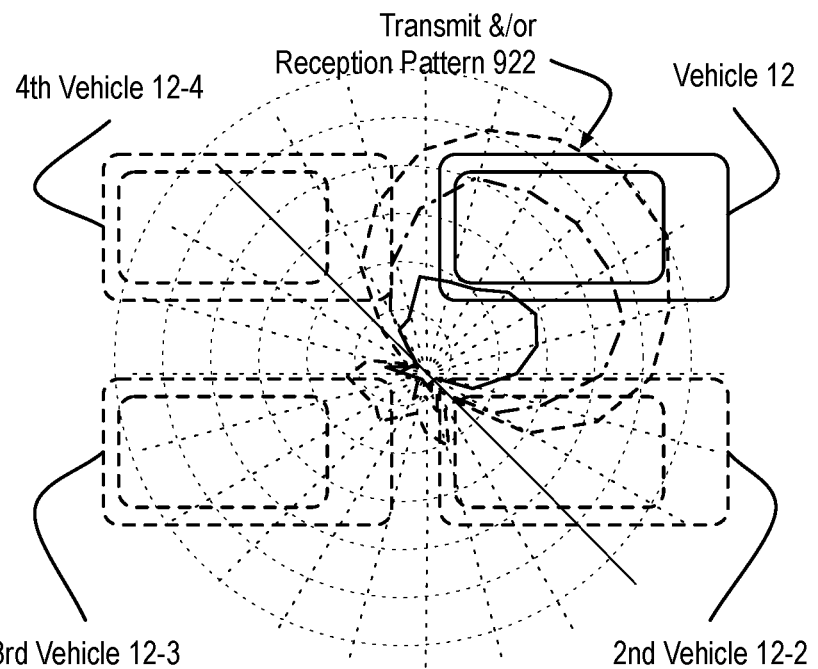
FIG. 13A to FIG. 13D show an example of the use of a parking sensor including four microwave antennas that can determine a vehicle 12 parking in one of four parking spots 20.
Figure 13B:
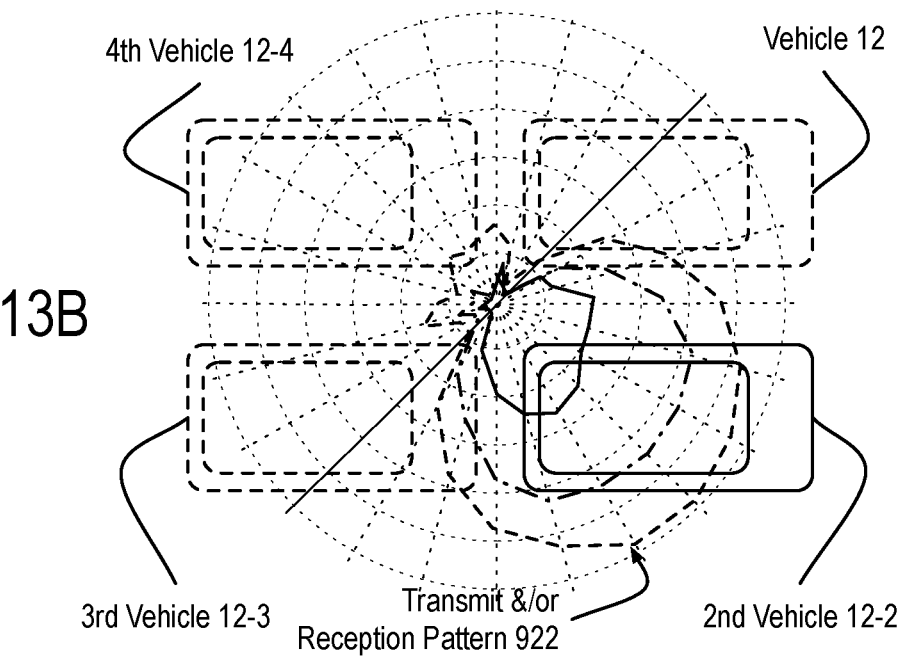
Figure 13C:
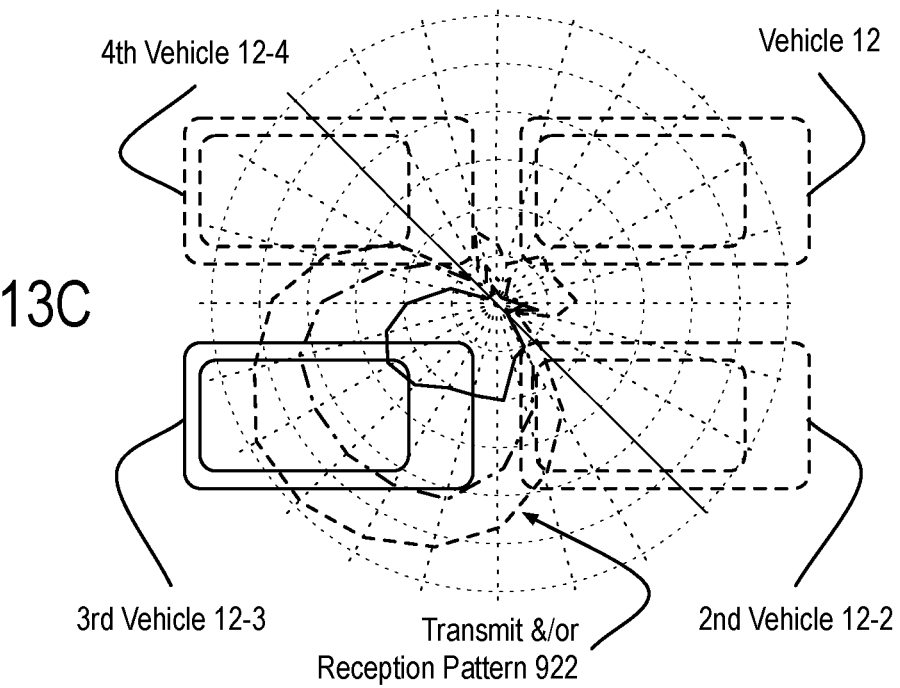
Figure 13D:
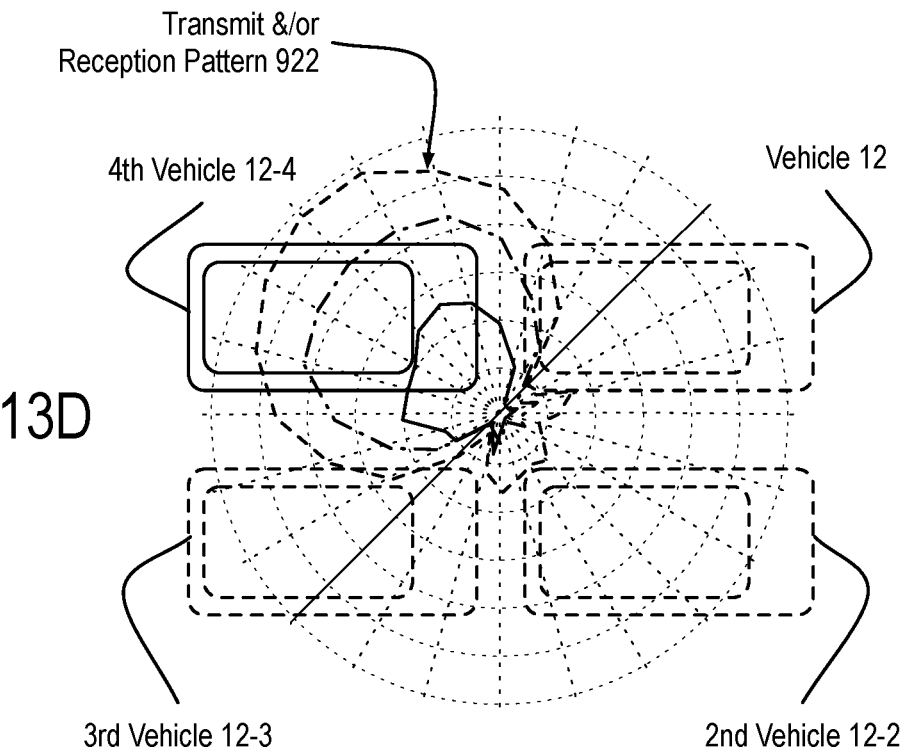

FIG. 12D shows the parking sensor 200 detecting the second vehicle 12-2 in the second parking spot 20-2 by using the second microwave antenna 920-2 coupled through the microwave switch 970 to the radar 912.

One skilled in the art will recognize that implementations of the parking sensor 200 with more than two microwave antennas, for instance, four microwave antennas. FIG. 13A to FIG. 13D show the use of such a sensor adaptation that can determine a vehicle 12 parking in one of four parking spots 20.

The prior art includes a discussion that radar transmission signals in multi-GigaHertz (GHz) bands are unaffected by changing weather conditions. While this is true, the prior art overlooks some issues that the inventor has had to cope with. The inventor has found each of the following issues to seriously affect at least some installations of micro-radar:

Different manufacturing runs may alter the operating characteristics of the micro-radar, even in a laboratory setting.

Varying temperature/weather conditions may alter the operating characteristics.

Varying ground conditions for a micro-radar embedded in the ground may alter the operating characteristics.

The micro-radar components may also drift over time even when there are little or no changes in the weather or ground conditions. The component drift may also alter the operating characteristics.

Often, there may be variations in the noise in the Intermediate Frequency (IF) signal that can compromise the detection and/or distance estimate.

Often, there is a need to operate the micro-radar in a manner that minimizes power consumption. For example, in some wireless sensor nodes, there is a very limited amount of power that can be generated and/or stored by the wireless sensor node, requiring that a micro-radar use power in a frugal manner.

These operating characteristics of the micro-radar may include changes in the IF frequency and/or noise of the micro-radar and/or changes in the timing delays of the receiver. Changes in either or both of these characteristics can adversely affect a sensor's ability estimate the travel time of the radar pulse and from that render the distance estimate to an object less accurate.

The application discloses and claims several embodiments, a superheterodyne radar, possibly the homodyne radar, sensor nodes adapted to interact with the superheterodyne radar, processors responding to the superheterodyne radar, as well as systems and components supporting communications between the superheterodyne radar and the processors. The processors and systems may further support traffic analysis and management of moving and/or stationary vehicles 12. The vehicles 12 may include sections of non-magnetic materials such as aluminum, wood and/or plastics that tend to create false readings for magnetic sensors. The processors and systems may also support measurement and/or management of production processes such as chemical production, device fabrication and container filling of various items such as liquids, grains and/or saw dust.

The superheterodyne radar 916 and/or the homodyne radar 918 may be adapted to operate in response to at least one output of a Digital to Analog Converter (DAC) and sometimes preferably two DAC outputs.

The DAC output may be used to generate an analog sum including an exponentially changing signal and the output of the DAC. Here are two examples of the response of the superheterodyne radar, possibly the homodyne radar, to distinct analog sums, either or both of which may be incorporated into the superheterodyne radar, possibly the homodyne radar, and/or its operations:

First, the superheterodyne radar and/or the homodyne radar may operate in response to a first analog sum of a first DAC output, an exponentially changing signal, and a clock pulse. The response may include generating a receiver mixing signal that is asserted at a succession of time delays that are a function of the first analog sum.

Second, the superheterodyne radar and/or the homodyne radar may be operated based upon a second analog sum of a second exponentially changing signal and a second DAC output to control the Intermediate Frequency of the the down converted RF signal. This second sum may control a duty cycle of a pulse generating oscillator output without changing its frequency. The duty cycle may be measured as the high time divided by the period of the oscillator output.

The superheterodyne radar and/or the homodyne radar may include a RF transceiver/mixer RFTM used to generate carrier signal for the antenna output and to generate the received IF signal.

The superheterodyne radar and/or the homodyne radar may be operated through the control of the first and/or second DAC outputs. Some operations that may be supported include any combination of the following:

Controlling both the first and second DAC outputs to advance or retard the sweep delay relative to the distance to an object.

Setting the second DAC output to generate the IF signal as a noise reading.

And calibrating the first DAC output, and possibly the second DAC output, to establish the IF frequency.

The apparatus may further include a wireless sensor node and/or a wireline sensor node and/or a processor and/or an access point and/or a server.

The wireless sensor node may include a first instance of the superheterodyne radar and/or the homodyne radar and a radio transceiver configured to send a report regarding the sweep delay for the object, when the IF signal has a peak amplitude corresponding to the received RF reflection from the object.

The wireline sensor node may be configured to operate a second instance of the superheterodyne radar and/or the homodyne radar and including a wireline interface configured to send the report regarding the sweep delay for the object.

The processor may be configured to receive the report and configured to respond to the report by generating an estimate of the distance of the object from the superheterodyne radar and/or the homodyne radar.

The access point may be configured to wirelessly communicate with the superheterodyne radar and/or the homodyne radar via the radio transceiver to send a version the report to the processor.

And the server may be configured to communicate the version of the report from the superheterodyne radar and/or the homodyne radar to the processor.

The wireless sensor node and/or the wireline sensor node may further include a sensor processor configured to control the superheterodyne radar and/or the homodyne radar by at least control of the first DAC output and the second DAC output.

At least one of the sensor processor, the access point, the server and/or the processor includes at least one instance of at least one of a finite state machine and a computer accessibly coupled to a memory containing a program system comprised of program steps configured to instruct the computer.

Various implementations of the program system may include at least one of the program steps of:

Operating the superheterodyne radar and/or the homodyne radar based upon control of the first DAC output and/or the second DAC output.

Receiving the IF signal to generate an ADC reading and/or an estimate of the sweep delay for the object.

Estimating the distance of the object based upon the estimated sweep delay.

Generating the report based upon the ADC reading and/or the sweep delay.

Responding to the report by sending the version of the report to the processor.

Second responding to the report and/or the version to estimate the distance of the object from the superheterodyne radar and/or the homodyne radar.

Third responding to the report and/or the version to generate the size of the object.

And/or fourth responding to the distance of the object from the superheterodyne radar and/or the homodyne radar by updating at least one of a traffic monitoring system, a traffic control system, a parking management system, and/or a production management system.

The apparatus may further include at least one of the traffic monitoring system, the traffic control system, the parking management system, and/or the production management system, any of which may include At least one communicative coupling to at least one of the micro-radar, the wireless sensor node, the wireline sensor node, the processor, the access point and/or the server.

The communicative coupling(s) may support communication across at least one of a wireline physical transport and/or a wireless physical transport.

Figure 14:
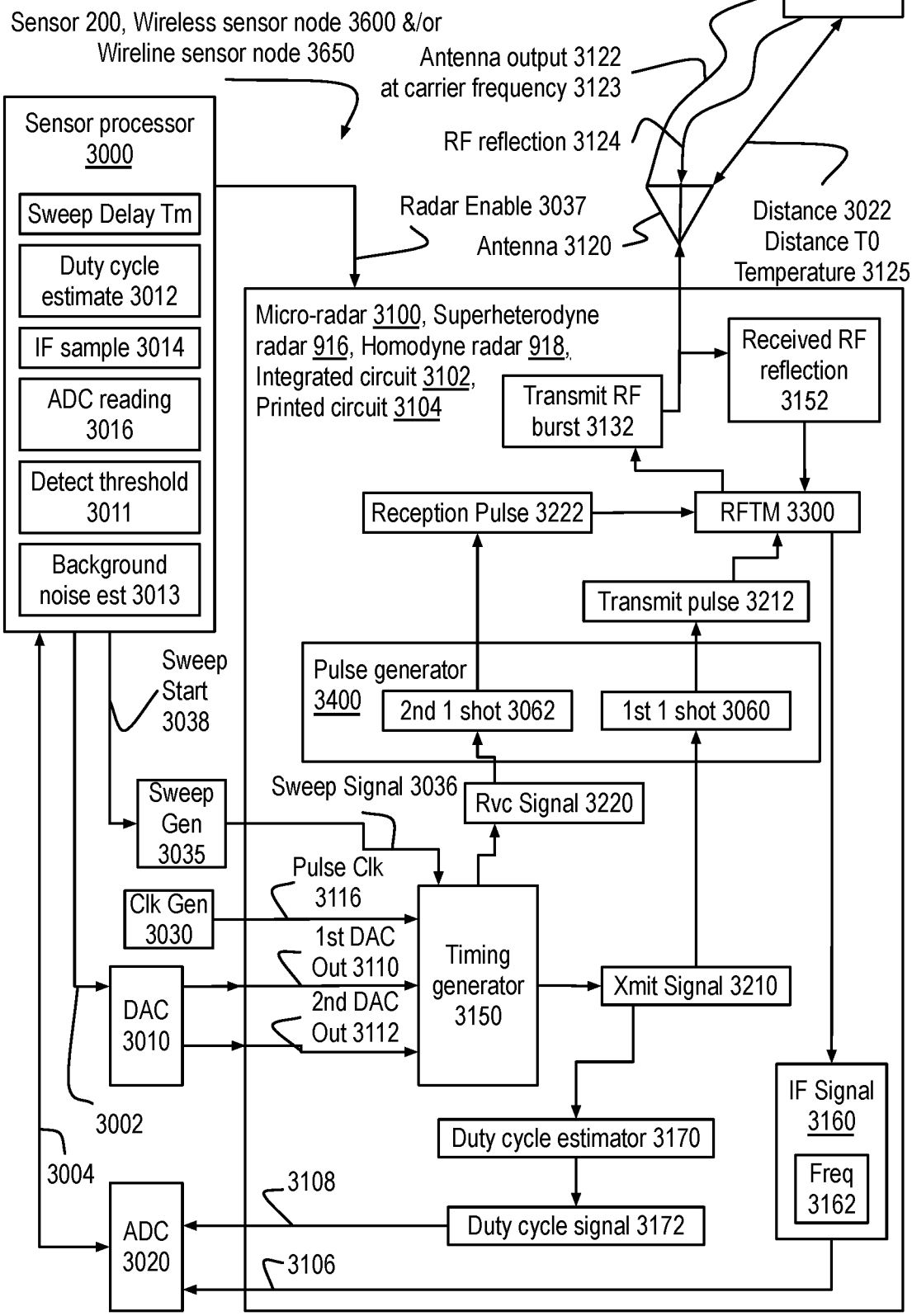
FIG. 14 shows a simplified block diagram of an example of the parking sensor, a wireless sensor node and/or a wireline sensor node that may include a sensor processor configured to operate a micro-radar and/or a superheterodyne radar, based upon a first DAC output and a second DAC output.

FIG. 14 shows a simplified block diagram of an example of a wireless sensor node 3300 and/or a wireline sensor node 3310 that may include a sensor processor 3000 configured to operate a micro-radar 3100, a superheterodyne radar 918 and/or a homodyne radar 918 based upon a first DAC output 3110 and second DAC output 3112.

An object 3020 may be situated at a distance 3022, for example a distance T0, from an antenna 3120 interacting with the micro-radar 3100. In many situations, the antenna and the micro-radar may be considered as located at one location, but in other situations, there may be some distance between them. To simplify this discussion, only the distance 3022 from the antenna will be discussed. The object 3020 may reflect the antenna output 3122 to generate a RF reflection 3124. The micro-radar 3100, the superheterodyne radar 916 and/or the homodyne radar 918 may be adapted to generate a received RF reflection 3152 from the RF reflection 3124.

The micro-radar 3100, the superheterodyne radar 916 and/or the homodyne radar 918 may use a timing generator 3150 adapted to respond to the two DAC outputs 3110 and 3112 to generate a transmit signal 3210 and a reception signal 3220 that stimulate a Radio Frequency (RF) transceiver/mixer (RFTM) 3300 to generate the antenna output 3122 and to down convert an Intermediate Frequency (IF) signal 3160 based upon and proportional to the received RF reflection 3152.

Consider the micro-radar 3100, the superheterodyne radar 916 and/or the homodyne radar 918 response to the first DAC output 3110 and to the second DAC output 3112 over the clock period 3117 of a sweep clock 3116.

The sweep clock 3116 may be generated by a separate clock generator 3030. In other implementations, the micro-radar 3100, the superheterodyne radar 916, the homodyne radar 918 and/or the sensor processor 3000 may include the clock generator.

Figure 15A:
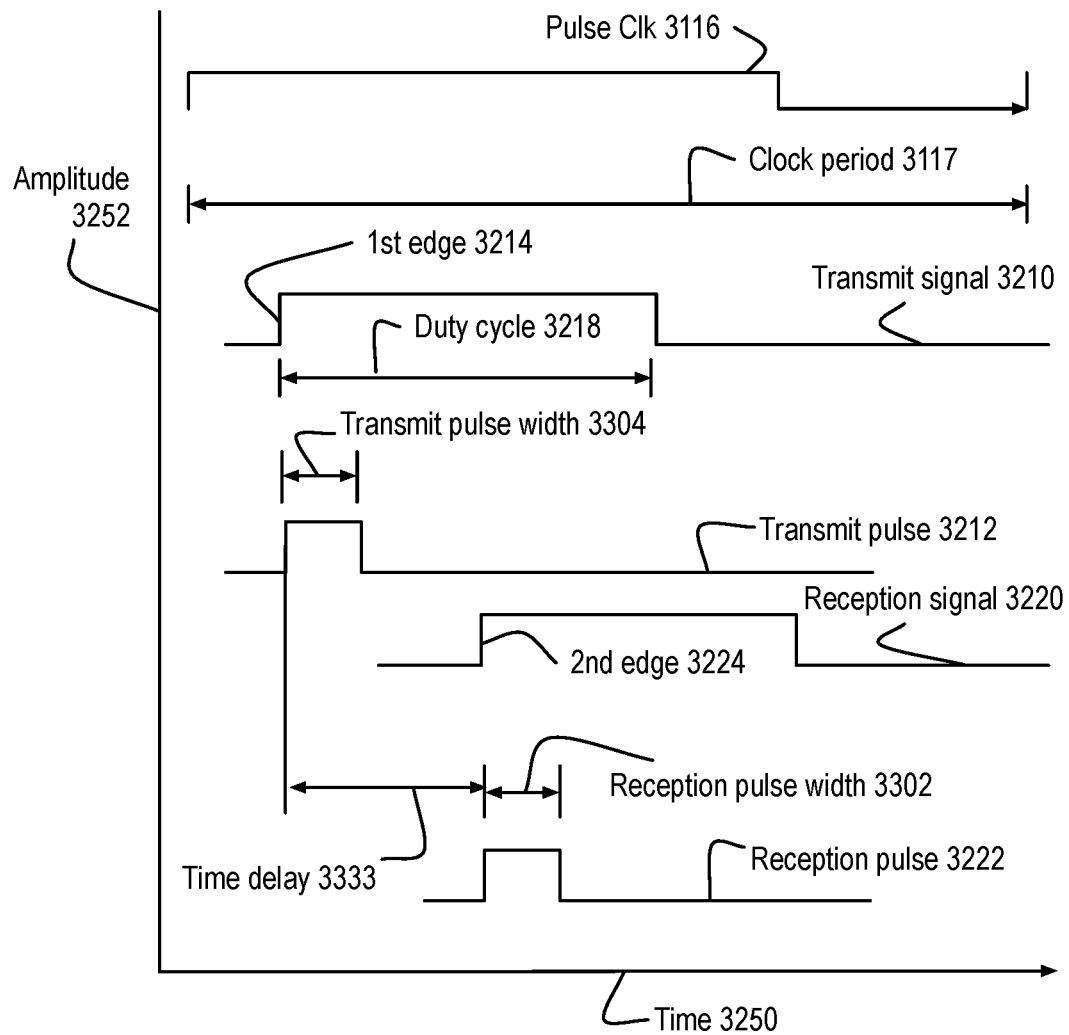
FIG. 15A shows a timing diagram of the relationship between the pulse clock, the transmit signal and the reception signal as generated by the timing generator and used by the radio frequency transceiver/mixer (RFTM) of FIG. 14, including the time delay between the signals and/or the pulses, the pulse widths and duty cycle.

The timing generator 3150 may respond to the first DAC output 3110 by generating a transmit signal 3210 over the clock period 3117 of sweep clock 3116 as shown in FIG. 15A, which will be discussed shortly.

The timing generator 3150 may respond to the second DAC output 3112 by generating a reception signal 3220 with a time delay 3300 from the transmit signal over the sweep clock 3116 period 3117, also shown in FIG. 15A.

A first one-shot multi-vibrator 3060 may respond to the transmit signal 3210 by generating the transmit pulse 3212.

A second one-shot multi-vibrator 3062 may respond to the reception signal 3220 by generating the reception pulse 3222.

The RFTM 3300 may respond to the transmit pulse 3210 by generating a transmitted Radio Frequency (RF) burst 3132 for delivery to the antenna 3120 to generate the antenna output 3122.

The RFTM 330 may mix a received RF reflection 3152 with the transmit RF burst 3132, in response to the reception pulse 3220, to generate the IF signal 3160 with a peak amplitude 3164 at a sweep delay Tm for a distance T0 of the object 3020 from the antenna 3120.

The frequency 3160 of the IF signal 3160 is preferably about one over the compression ratio multiplied by the carrier frequency 3123 of the antenna output 3122, where the compression ratio is about one million.

A pulse generator 3400 may be used to respond to the transmit signal 3210 to generate the transmit pulse 3212 and to respond to the reception signal 3220 to generate the reception pulse 3222. The transmit signal may further stimulate a first one shot multi-vibrator 3060 to at least partly generate the transmit pulse. The reception signal may further stimulate a second one-short multi-vibrator 3060-2 to at least partly generate the reception pulse. Note that in some implementations, the reception pulse may include the transmit pulse occurring before at a time delay 3300 before it. The time delay will be shown in FIG. 2A. FIG. 2A will show the reception pulse not including the transmit pulse.

Figure 15B:
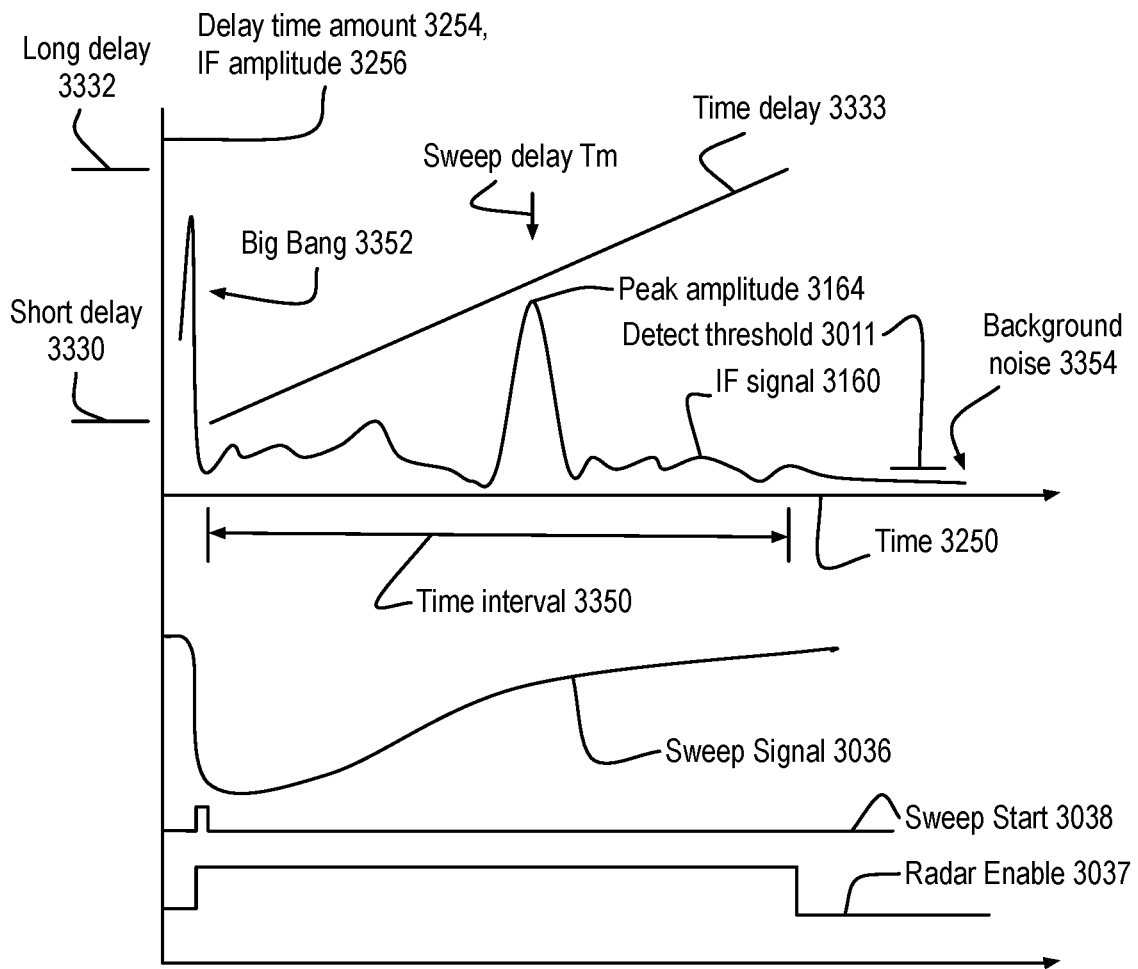
FIG. 15B shows a timing diagram sweep of the time delay from a short delay to a long delay over a time interval, as well as the IF signal over the time interval with a peak amplitude at a sweep delay Tm corresponding to the distance T0 of the object from the antenna as shown in FIG. 14.

Before discussing the timing relationships in FIG. 15A and FIG. 15B, there are two questions to answer: Where does the compression ratio show up in this apparatus? And what is the relationship of the duty cycle 3218 of the transmit signal 3210 to compression ratio and the frequency 3162 of the IF signal 3160?

First, here is how the compression ratio shows up. The carrier frequency 3123 of the antenna output 3122 is in the GigaHertz (GHz) range. For example, in the inventor's products, which include wireless sensor nodes 3310, the carrier frequency is about 6.3 GHz. The return times for the antenna output 3122 to travel the distance T0 of 6 feet to the object 3020 and return are as the RF reflection are about 12 nanoseconds.

But the system clock for the sensor processor 3000 is about 32 KHz. This clock frequency is set low to conserve on power stored in the wireless sensor node 3310. The sensor processor cannot directly detect the reception time Tm of the RF reflection 3124 without consuming a lot more power than can be afforded.

There are RFTM 3212 and similar micro-radar 3100 circuits that held a promise of meeting these needs, in that the frequency 3162 of the IF signal 3160 is one millionth of the carrier frequency 3123, making the IF frequency about 6.3 KHz, which is within the operating frequency of the sensor processor 3000.

Because of the compression ratio, the frequency 3162 of the IF signal 3160 frequency 3162 is small enough that sensing it can be done efficiently enough for a wireless sensor node 3300.

Here is where the duty cycle and its relationship to the compression ratio and the frequency 3162 of the IF signal 3160 shows up:

The inventor obtained some samples of micro-radars, and they worked.

However, when he made then some that had the same schematic and they did not work. It turned out the there were manufacturing variations in the components that changed the compression ratio and consequently, the frequency 3162.

After much experimentation, he found that by adding DAC outputs 3110 and 3112 to generate the transmit signal 3210 and the receive signal 3220, and measuring the duty cycle of the transmit signal, he could control the compression ratio at the same time he controlled the duty cycle.

This also allowed a program to be executed on the sensor processor 3000 that could change the first DAC output 3110 until the duty cycle 3218 was within a factional range of the clock period 3117 of the sweep clock 3116. For instance, he found that if the ratio of the duty cycle to the clock period was 50%, the frequency 3162 of the IF signal 3160 was about 10 KHz, whereas if the ratio was about 70%, the frequency was about 6.3 KHz.

There is no immediate theory that seems to account for this phenomena, but experimentally it has been found to be true.

Further, field testing of the wireless sensor nodes 3310 has revealed that the compression ratio and therefore the frequency 3162 of the IF signal 3160 of these micro-radars 3100 are also sensitive to fluctuations in temperature 3125. However, it was again discovered that if the first DAC output 3110 was adjusted until the duty cycle estimate 3012 was again adjusted until it was in the vicinity of 70%, the frequency 3162 of the IF signal 3160 was again in the range of 6.3 KHz.

Before continuing the discussion of FIG. 14, the timing relationships involved with this micro-radar will be shown and discussed in FIG. 15A to FIG. 15C.

FIG. 15A shows a timing diagram of the relationship between the sweep clock 3116, the transmit signal 3210 and the reception signal 3220 as generated by the timing generator 3150 and used by the RFTM 3300, including the time delay 3300 between the signals and/or the pulses, the pulse widths and duty cycle 3218.

The transmit signal 3210 and the reception signal 3220 may be generated once in every cycle of the sweep clock 3116 by the timing generator 3150. The sweep clock has a clock period 3117, which in some situations is about 6.3 MHz.

The duty cycle 3218 of the transmit signal 3210 is the time in the clock period 3117 in which the signal is high, which is often referred to as logic '1'.

The transmit pulse 3212 is initiated in response to a first edge 3214 of the transmit signal 3210. Since the micro-radar 3100 circuitry is so much faster than the sensor processor 300 and the wireless sensor node 3300 in general, there are no delays shown between the first edge 3214 and the transmit pulse 3212 starting.

The reception pulse 3222 is initiated in response to a second edge 3224 of the reception signal 3220, again shown with no delays. However, there is a time delay 3300 between the first edge 3214 and the second edge 3224, which leads to essentially the same delay between the transmit pulse 3212 and the reception pulse 3222.

The transmit pulse width 3304 is shown as the active high width of the transmit pulse 3210. The reception pulse width 3302 is shown as the active high width of the reception pulse 3220. Both the transmit pulse width 3304 and the reception pulse width 3302 are about the same, and in some situations may be about 4 ns.

FIG. 15B shows a timing diagram sweep of the time delay 3300 from a short delay 3330 to a long delay 3332 over a time interval 3350, as well as the IF signal 3160 over the time interval with a peak amplitude 3164 at a sweep delay Tm corresponding to the distance T0 of the object 3020 from the antenna 3120 as shown in FIG. 14. The time interval may see the sweep start at the short delay and progress to the long delay as is shown. In other implementations, the time interval may see the opposite, that the sweep starts at the long delay progresses to the short delay.

Since the pulse widths 3302 and 3304 are essentially the same, for example, both about 4 ns, avoiding a collision between sending the antenna output 3122 and receiving the RF reflection 3124, can be served by setting the short delay 3330 to 4 ns. Setting the long delay 3332 to 20 ns after the short delay leads to setting the long delay to 24 ns, allowing for seep delays Tm that corresponding to traversing to and from the object at a distance roughly 10 feet, which is sufficient for many applications of the micro-radar 3100.

The IF signal 3160 is shown with a peak labeled a big bang 3352 before the start of the time interval 3350. The big bang is an occurrence where the sweep start 3038 is initiated earlier than shown in this Figure. In such a situation, the transmit RF burst 3132 and the reception pulse 3222 overlap in time, causing a false peak, irrespective of the received RF reflection 3152. In some situations, it may be preferred to operate the micro-radar 3100 so that the sweep start occurs after the big bang, not only saving power but also removing the need to remove the false peak from the detection of the sweep delay Tm.

The sensor processor 3000 shown in FIG. 14 may use an Analog to Digital Converter (ADC) 3020 less than 20 thousand times a second and yet determine the distance T0 very accurately, while being able to calibrate itself to account for variations in manufacturing, temperature 3125 and other ambient conditions.

The IF signal 3160 is also shown in FIG. 2B with a persisting trough occurring after the time interval 3350. This trough is labeled background noise 3354. By operating the micro-radar 3100 after the time interval, the IF signal may be sampled to create one or more ADC readings 3016 that may be used to generate a background noise estimate 3013 shown in FIG. 14. While the background noise has been shown as a persisting trough, it may take any of a wide variation in shapes and be encompassed in the scope of the claims. Background noise is noisy, but tends to be relatively small compared to the the IF signal during the time interval, when received RF reflections 3152 increase the amplitude of the IF signal as shown in FIG. 2B.

Detecting the object 3020 may also involve using a detect threshold 3011, which will be discussed later. The sensor processor 3000 may include the detect threshold, which may be generated from the background noise estimate 3013, shown first in FIG. 14 and further shown in FIG. 2B.

The micro-radar 3100 and/or the RFTM 3200 may be implemented as at least part of an integrated circuit 3102 and/or a printed circuit 3104. Through the use of the first DAC output 3110 and the second DAC output 3112, initial and later calibration of the micro-radar 3100, the integrated circuit 3102 and/or the printed circuit 3104 may be cost effectively performed, thereby minimizing production test costs and improving reliability in varying field conditions.

The micro-radar 3100, the superheterodyne radar 916 and/or the homodyne radar 918 may be operated by the sensor processor 3000 through interactions with the DAC and an Analog to Digital Converter (ADC) 3020. The setting of the DAC outputs 3110 and 3112 have been described to some extent.

A duty cycle estimator 3170 may respond to the transmit signal 3210 to generate a duty cycle signal 3172 presented to an Analog to Digital Converter (ADC) to generate an ADC reading used to calculate a duty cycle estimate 3012.

The IF signal 3160 may be sampled by the ADC 3020 to create a possibly different ADC reading 3016 used to generate the IF sample 3014 at an estimated sweep delay Tm.

FIG. 14 shows one DAC 3010 generating both the first DAC output 3010 and the second DAC output 3112 and being coupled 3002 to the sensor processor 3000.

Various implementations of the DAC 3010 may be used to generate the first DAC output 3110 and/or the second DAC output 3112. These implementations of the DAC 3010 do not have to be the same, may differ in resolution and sampling rate. However, the discussion will proceed to illustrate one DAC generating both the first and second DAC outputs. This is not intended to limit the scope of the claims. It is done for the sake of simplifying the discussion. Also, the resolution of the DAC outputs 3110 and/or 3112 may be at least 10 bits, and in some situations may be preferred to be more than 10 bits.

The coupling 3002 between the sensor processor 3000 and the DAC 3010 today is preferably a wireline coupling, frequently involving one or more electrically conductive materials. However other implementations may be preferred. For example, the coupling may also implement an optical coupling which might not be electrically conductive.

FIG. 14 also shows the sensor processor 3000 second coupled 3004 to an Analog to Digital Converter (ADC) 3020. The sensor processor and/or the wireless sensor node 3300 and/or the wireline sensor node 3310 may be adapted and/or configured to use the ADC 3120 in one or more of the following ways:

The ADC 3020 may respond to the duty cycle signal 3212 and the interactions of the sensor processor 3000 through the second coupling 3004 to generate a duty cycle estimate 3012 in the sensor processor, and/or The ADC 3020 respond to the IF signal 3160 and the interactions of the sensor processor 3000 through the second coupling 3004 to generate an IF sample 3014 in the sensor processor.

Various implementations of the ADC 3020 may be used to generate the duty cycle estimate 3012 and/or the IF sample 3014. These implementations of the ADC 3020 do not have to be the same, may differ in resolution and sampling rate. However, the discussion will proceed to illustrate one ADC generating both the duty cycle estimate 3012 and the IF sample 3014. This is not intended to limit the scope of the claims. It is done for the sake of simplifying the discussion. Also, the resolution of the ADC 3020 may be at least 10 bits, and in some situations may be preferred to be more than 10 bits.

The second coupling 3004 between the sensor processor 3000 and the ADC 3020 today is preferably a wireline coupling, frequently involving one or more electrically conductive materials. However other implementations may be preferred. For example, the second coupling may also implement an optical coupling which might not be electrically conductive.

The interactions across the second coupling 3004 may include a selection of an analog input port and a strobing of the ADC 3020 to provide data to be used as the duty cycle estimate 3012 and/or the IF sample 3014.

The micro-radar 3100, the superheterodyne radar 916 and/or the homodyne radar 918 may include a first ADC coupling 3106 of the IF signal 3160 to the ADC 3160, and/or a second ADC coupling 3108 of the duty cycle signal 3212 to the ADC 3160.

In some embodiments, the sensor processor 3000 may include the DAC 3010 and/or include the ADC 3020. Whereas in other embodiments, the sensor processor, the DAC and the ADC may be separate components fastened to a printed circuit 3104, possibly containing all or part of the micro-radar 3100, and the first coupling 3002 and the second coupling 3004 may be electrical traces on and/or through the printed circuit.

Figure 16:
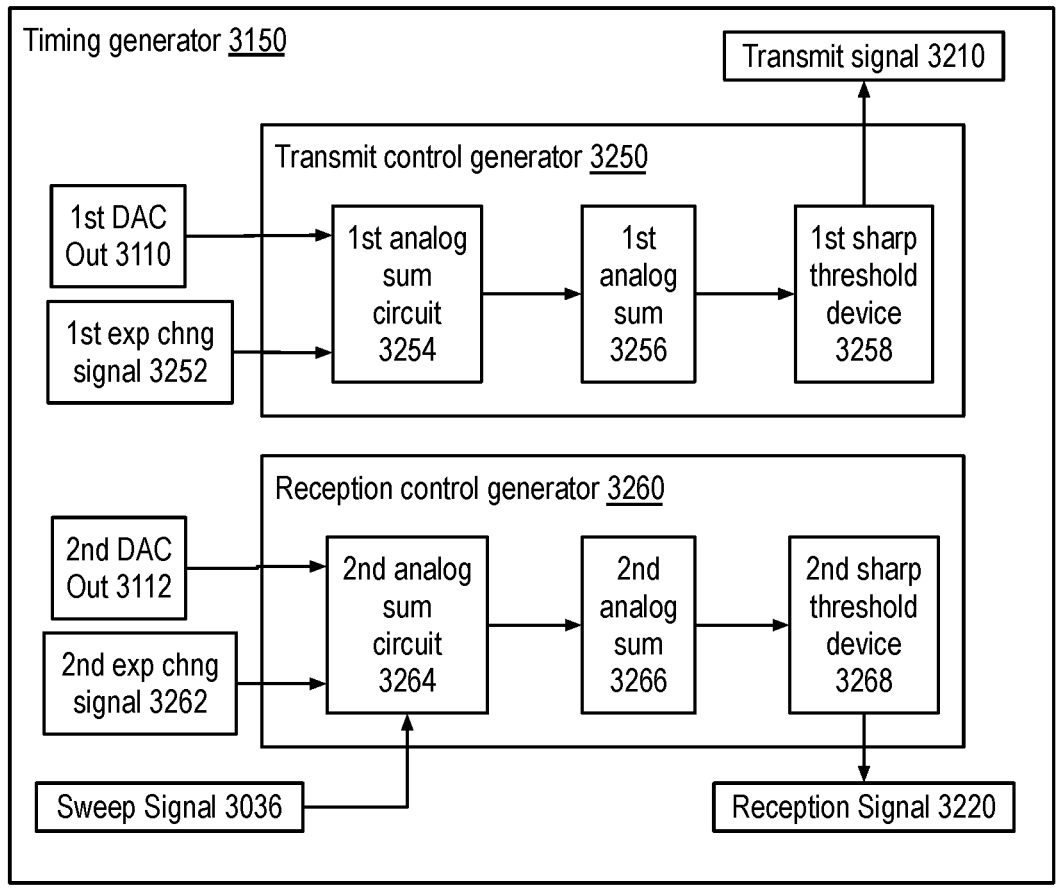
FIG. 16 shows some details the micro-radar, in particular the timing generator of FIG. 14, including a transmit control generator responding to the first DAC output and a reception control generator responding to the second DAC output.

FIG. 16 shows some details the micro-radar 3100, the superheterodyne radar 916 and/or the homodyne radar 918, in particular the timing generator 3150 of FIG. 14, including a transmit control generator 3250 responding to the first DAC output 3110 and a reception control generator 3260 responding to the second DAC output 3112.

The transmit control generator 3250 may include a first analog sum 3256 of a first exponentially changing signal 3252 and the first DAC output 3110 triggering a first sharp threshold device 3258 to generate the transmit signal 3210 with a duty cycle 3218 as shown in FIG. 2A. The transmit signal may stimulate the duty cycle estimator 3170 to generate the duty cycle signal 3172 as shown in FIG. 14. Note that the first analog sum may be generated by a first analog sum circuit 3256.

The reception control generator 3260 may includes a second analog sum 3266 of the second DAC output 3112, a second exponentially changing signal 3262 and the sweep clock signal 3116 triggering a second sharp threshold device 3268 to generate the reception signal 3220. The second analog sum may be generated by a second analog sum circuit 3266.

The first and second analog sum circuits 3254 and 3264 may be implemented in a wide variety of ways, including through the use of differential amplifiers and/or weighted resistor networks designed based upon Ohm's Law to generate the analog sum 3256 and/or 3266.

The first exponentially changing signal 3252 is used to generate the transmit signal 3210, and will tend to need a fast time of change, possibly changing from a saturation to depleted state in a few nanoseconds.

The second exponentially changing signal 3262 is used to generate the time delay 3300 sweep from a short delay 3330 to a long delay 3332 over the time interval 3350, which may be on the order of 20 ms.

Circuitry to generate the first exponentially changing signal 3252 and/or the second exponentially changing signal 2166 may be implemented based upon capacitor charging and/or discharging across a resistor, which may be further implemented with various components of one or more transistors acting as the capacitor and/or the resistor.

In some embodiments, the exponentially changing signals 3252 and/or 3262 may be generated through piecewise linear behavior of threshold switching components. Such signals may not change in an exactly exponential fashion, but will display a distinctive change in the rate of change which will be monotonically increasing or monotonically decreasing within one sweep clock 3116 period 3117.

The first exponentially changing signal 3252 may have an RC delay of 20 ns. The second exponentially changing signal 3262 may have an RC decay of 20 ms. The delay sweep shown in FIG. 2B may be controlled by a signal set by the sensor processor 3000 that may short the capacitor that generates the second exponentially changing signal.

The transmit pulse 3212 use only the high speed RC signal and the reception pulse 3222 may use both the reception signal 3220 and the transmit signal 32210.

Figure 17:
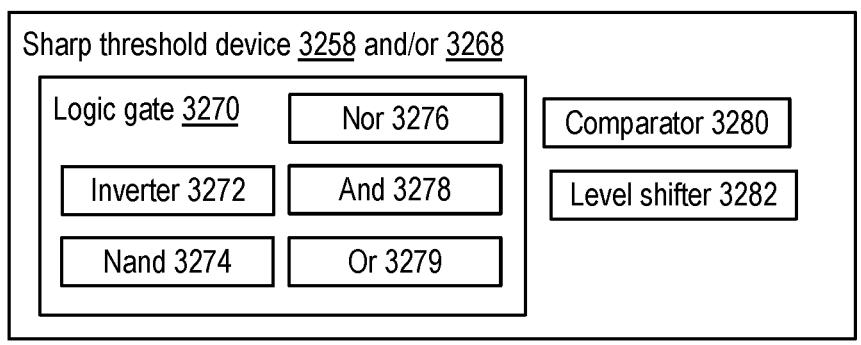
FIG. 17 shows the first sharp threshold device and/or the second sharp threshold device of FIG. 16 may include at least one instance of a logic gate, a comparator and/or a level shifter.

FIG. 17 shows the first sharp threshold device 3258 and/or the second sharp threshold device 3268 may include at least one instance of a logic gate 3270, a comparator 3280 and/or a level shifter 3282. The logic gate 3272 which may be implemented as an inverter 3272, a NAND gate 3274, a NOR gate 3276, an AND gate 3278, and/or an OR gate 3279. In situations where the logic gate has more than one input, the analog sum 3256 or 3266 may be supplied to one or more of the inputs. Any remaining inputs may be tied to logic 1 or 0 as needed.

The simplicity of using basic power logic gates 3270 instead of more power consuming comparators 3280 is very desirable but adds to the need to calibrate out the part to part voltage threshold differences found in these gates. Threshold variations may cause two major issues in the design: the IF signal 3160 frequency 3162 may vary based on the part of the RC curve that is used as the switching point, and the time delay 3300 of the transmit pulse 3212 versus the reception pulse 3222 may create uncertainty in the detection distance t0 versus sweep delay Tm relationship.

To address these situations, a method of calibrating the micro-radar 3100 that can adjust for both of these uncertainties and compensate them over temperature 3125 without a lot of power consumption or specially calibrated parts was developed. This method will be described later in FIG. 23 in terms of a program system 3500 that may instruct a computer 3852.

Figure 18:
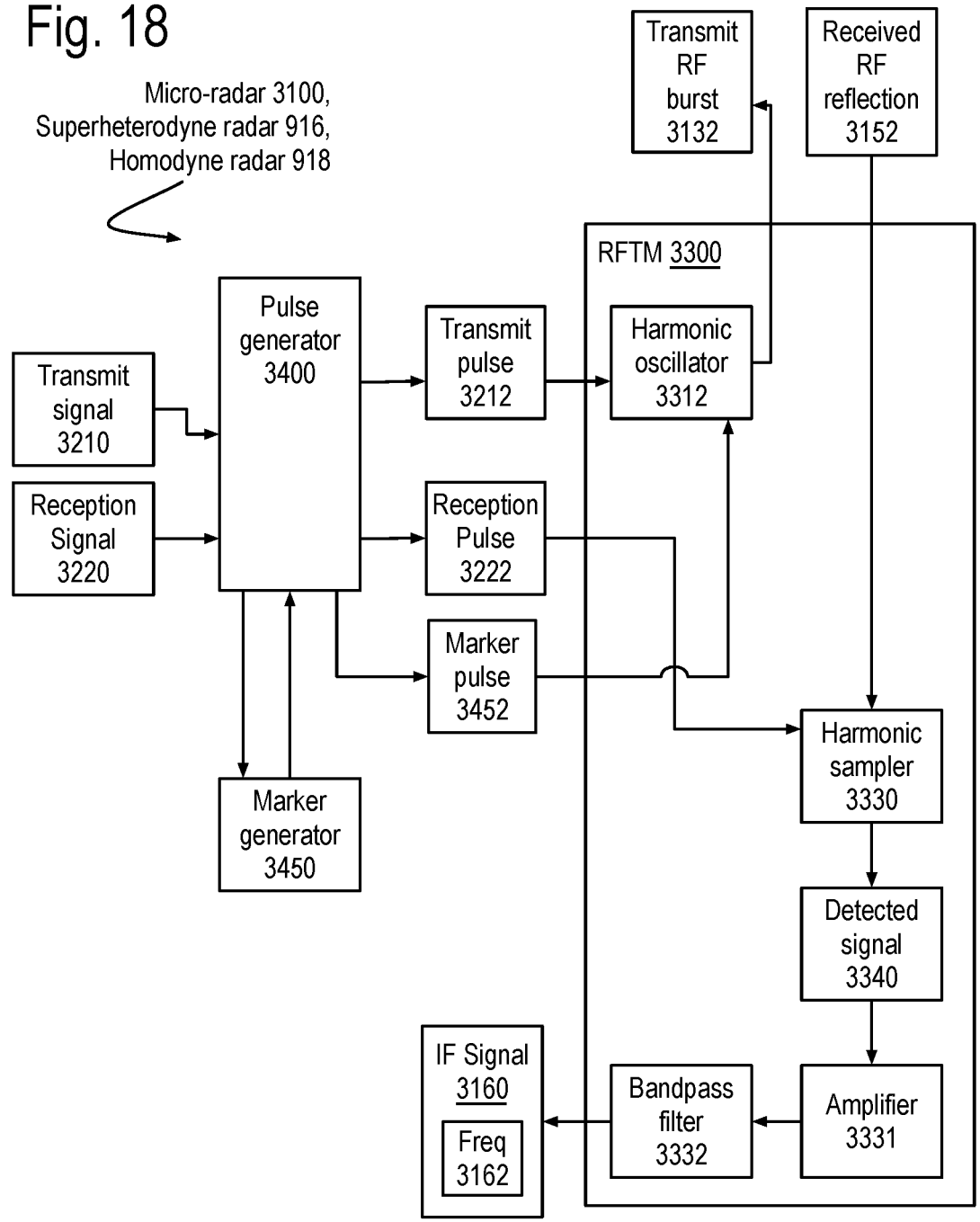
FIG. 18 shows an example of the RFTM of FIG. 14 based upon the circuitry of U.S. Pat. No. 6,414,627 (hereafter referred to as the '627 patent).

FIG. 18 shows an example of the RFTM 3300 of FIG. 14 based upon the circuitry of U.S. Pat. No. 6,414,627 (hereafter referred to as the '627 patent). In this example, the carrier frequency 3123 of antenna output 3122 is 24 GHz. A single antenna 3120 is used as shown in FIG. 14. The RFTM emits 24 GHz RF sinewave packets and samples echoes with strobed timing such that the illusion of wave propagation at the speed of sound is observed, thereby forming an ultrasound mimicking radar (UMR). A 12 GHz frequency-doubled transmit oscillator in the RFTM is pulsed by the transmit pulse 3212 a first time to transmit a 24 GHz harmonic burst as the transmit RF burst 3132 and pulsed by the reception pulse 3222 a second time to produce a 12 GHz local oscillator burst for a sub-harmonically pumped, coherently integrating sample-hold receiver (homodyne operation). The time between the first and second oscillator bursts is swept as shown in FIG. 2B to form an expanded-time replica of echo bursts at the receiver output as the IF signal 3160.

A random phase RF marker pulse may be interleaved with the coherent phase transmitted RF antenna output 3122 to aid in spectrum assessment of the micro-radar's 3100 nearly undetectable emissions. The low-cost micro-radar 3100 can be used for automotive backup and collision warning, precision radar rangefinding for fluid level sensing and robotics, precision radiolocation, wideband communications, and time-resolved holographic imaging.

The RFTM 3300 may be implemented as a transmit oscillator and as a swept-in-time pulsed receive local oscillator. This dual function use of one oscillator eliminates the need for two microwave oscillators and facilitates operation with only one antenna for both transmit and receive functions. Further, it assures optimal operation since there are no longer two oscillators that can go out of tune with each other (in a two oscillator system, both oscillators must be tuned to the same frequency).

The transmit RF burst 3132 may be short, perhaps on the order of a few nanoseconds and sinusoidal, is transmitted to as the antenna output 3122 and reflected as the RF reflection 3124 from the object 3020. Shortly after transmission, the same RF oscillator used to generate the transmit pulse is re-triggered to produce a local oscillator pulse (homodyne operation) as the reception pulse, which gates a sample-hold circuit in to produce a voltage sample. This process may be repeated at a several megaHertz rate as controlled by the sweep clock 3116. With each successive repetition, another sample may be taken and integrated with the previous sample to reduce the noise level. Also, each successive local oscillator pulse is delayed slightly from the previous pulse such that after about the time interval 3350, the successive delay increments add up to a complete sweep or scan from the short delay 3330 to the long delay 3332, for example, of perhaps 100-nanoseconds or about 15 meters in range. After each scan, the local oscillator delay is reset to a minimum and the next scan cycle begins.

The micro-radar 3100 produces a sampled voltage waveform on a millisecond scale that is a near replica of the RF waveform on a nanosecond scale. This equivalent time effect is effectively a dimensionless time expansion factor. If the compression ratio is set to 1-million, 24 GHz sine waves are output from the micro-radar as 24 kHz sine waves. Accordingly, the radar output can be made to appear like an ultrasonic ranging system. In addition to having the same frequency, e.g., 24 kHz, a 24 GHz radar actually has the same wavelength as a 24 kHz ultrasonic system. In addition, the range vs. round-trip time is the same (in equivalent time for the radar, of course).

The emission spectrum from the RFTM 3300 is very broad and often implemented as an Ultra Wide-Band (UWB) compliant signal generator. Sometimes, a narrowband, incoherent RF marker pulse may interleaved with the short coherent RF pulses used for ranging to produce a very visible spectrum with an identifiable peak, i.e., carrier frequency 3123. However, the marker pulse may create spurious echoes. Accordingly, the marker pulse may be randomized in phase so its echoes average to zero in the RFTM. At the same time, the desired ranging pulses as the antenna output 3122 and the RF reflection 3124 phase-coherently integrating from pulse to pulse into a clean IF signal 3160.

FIG. 18 shows some details of the micro-radar 3100, the superheterodyne radar 916 and/or the homodyne radar 918, and the RFTM 3300 of FIG. 14 adapted to operate as in the '627 patent. A harmonic oscillator 3312 receives the transmit pulse 3212 from the transmit signal 3210 via pulse generator 3400 and produces RF burst pulses as the transmit RF burst at the antenna 3120 as shown in FIG. 14.

In some implementations the transmit signal 3210 may be a 1-10 MHz square wave that is passed through pulse generator to form about 1 ns wide transmit pulses 3212 with rise and fall times on the order of 100 picoseconds (ps). The transmit pulse 3212 and the reception pulse 3222 may be clock pulses with very fast rise and fall times. The transmit pulse 3212 and pulse generator 3400 may together be viewed as a clock signal generator. These short pulses bias-on the harmonic oscillator 3312, which is designed to start and stop oscillating very rapidly as a function of applied bias. The oscillations of the transmit pulses 3212 are phase coherent with the drive pulses, the phase of the RF sinusoids of the transmit RF burst 3132 relative to the drive pulse remains constant, i.e., coherent, each time the harmonic oscillator 3312 is started—there is little clock-to-RF jitter. However, as will be discussed below with reference to the marker generator 3450, separate marker pulses M may have a random phase relative to the clock.

A high degree of phase coherence for the transmit pulse 3212 may be obtained with a very fast rise time transmit signal 3210 that shock-excites the harmonic oscillator 3312 into oscillation. Accordingly, the pulse generator 3400 may have transition times of about 100 ps to ensure coherent harmonic oscillator startup.

The harmonic oscillator 3312 may operate at a fundamental frequency of 12.05 GHz with a second harmonic at 24.1 GHz. A frequency of 24.1 GHz or thereabouts may be preferred since commercial and consumer devices such as radar rangefinders can operate in the 24.0-24.25 GHz band without a license. The transmitted RF bursts 3132 may be typically 12 cycles long at a carrier frequency 3123 of 24.1 GHz The reception signal 3220 may be a 1-10 MHz square wave passed through pulse generator 3400 to form the reception pulse 3222 as about 1 ns wide pulses with rise and fall times below 100 ps. These short pulses bias-on the harmonic oscillator 3312 to generate the reception pulse 3222 in a similar fashion to the transmit pulses 3212 to form the reception pulses as 0.5 ns wide gate pulses. The reception pulses 3222 gate the harmonic sampler 3330 at typical frequency of 12 GHz to sample the received RF reflection 3152.

The harmonic sampler 30 develops a detected signal 3332, representing the coherent integration of multiple gatings of sampler 30, which is amplified by a low frequency amplifier 3331 and filtered in bandpass filter 3332 to produce the IF signal 3160 signal.

The micro-radar 3100, the superheterodyne radar 916 and/or the homodyne radar 918 may include a marker generator 3450. The marker generator may be triggered by pulses from the pulse generator 3400 to form marker pulses 3452 which are much wider than the transmit pulse 3212 or the reception pulse 3222. Due to the width of the marker pulses 3452, the radiated spectrum becomes relatively narrow, since the emission spectrum is roughly related by 1/PW, where PW is the width of the emitted pulses. One purpose of the narrow marker pulse spectrum is to aid in identifying the RF carrier frequency 3123 and spectral width of the transmitted pulses 3212 and/or the transmit RF burst 3132.

Note that in some implementations, the amplifier 3331 and the bandpass filter 3332 may be implemented by a single component. Such a component may be a fixed gain (possibly about 45 dB) 6 pole bandpass amplifier centered at 6.5 kHz with a bandwidth of approximately 24 kHz. In other implementations, fewer gain stages may be used with the filtering reduced to say 4 poles.

Figure 19:
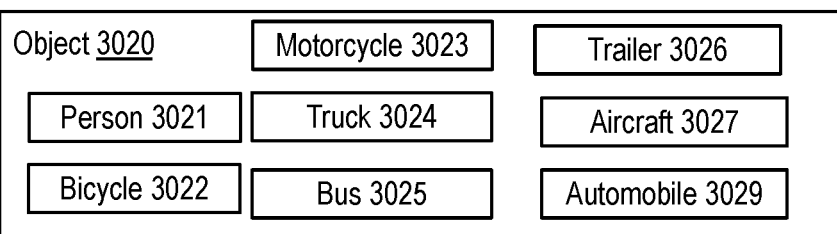
FIG. 19 shows some examples of the object as at least one of a person, a bicycle, a motorcycle, an automobile, a truck, a bus, a trailer and/or an aircraft.

FIG. 19 shows some examples of the object 3020 as at least one of a person 3021, a bicycle 3022, a motorcycle 3023, an automobile 3029, a truck 3024, a bus 3025, a trailer 3026 and/or an aircraft 3027.

Figure 20:
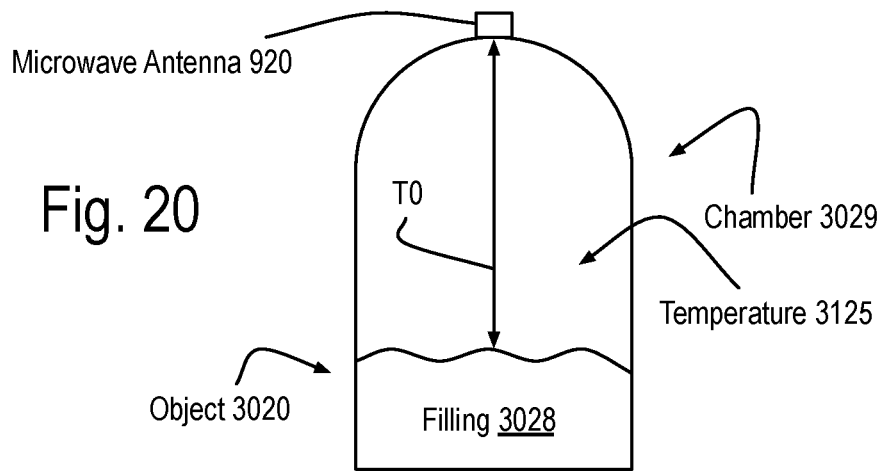
FIG. 20 shows some examples of the object as a surface of a filling of a chamber.

FIG. 20 shows some examples of the object 3020 as a surface of a filling 3028 of a chamber 3029, where the filling may be a liquid and/or granules such as grain, powders and/or sand. The chamber may be used for storage and/or mixing of components which may be considered as the filling in some implementations.

Figure 21:
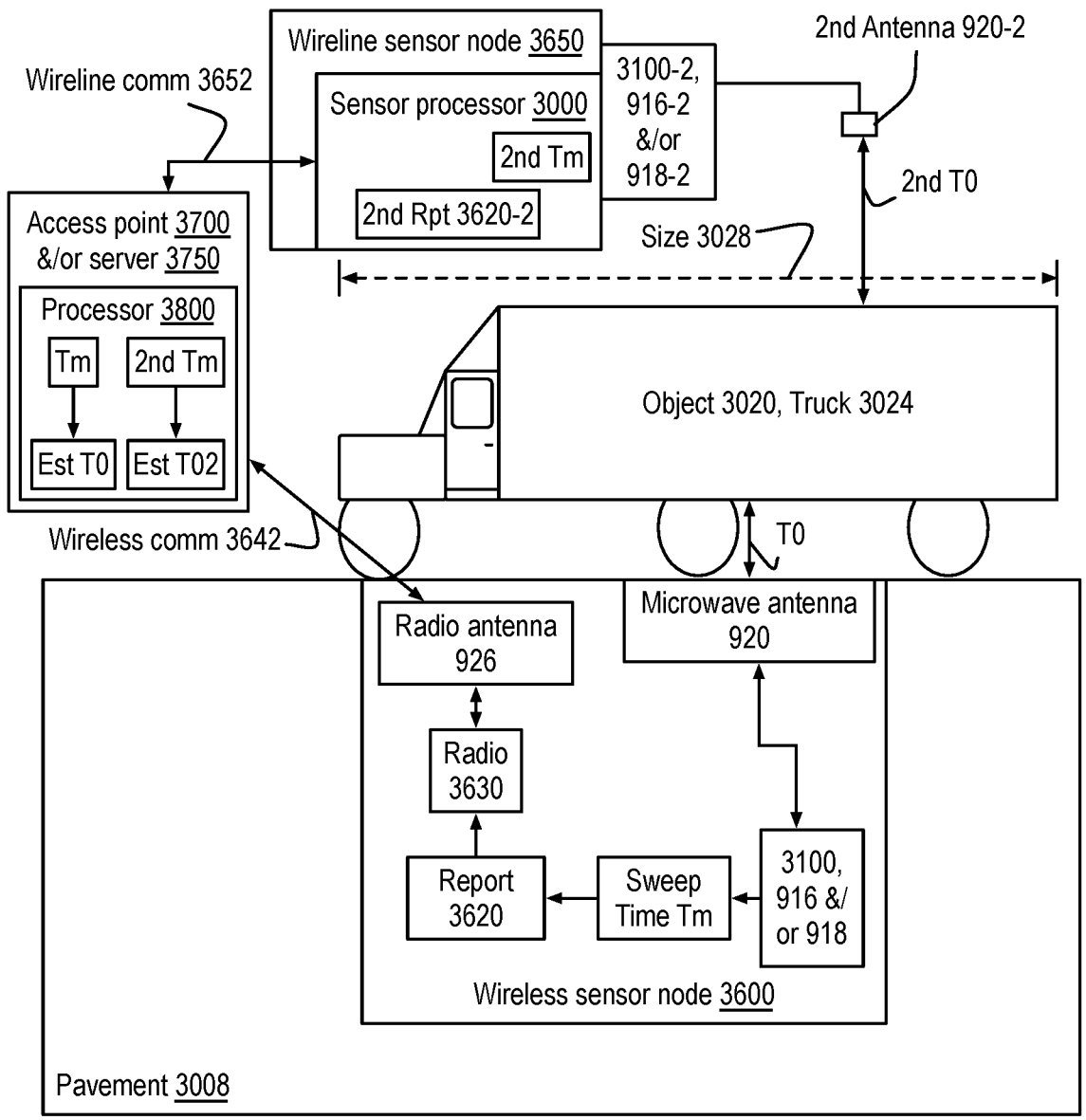
FIG. 21 shows some other apparatus embodiments that involve the micro-radar, the superheterodyne radar and/or the homodyne radar of FIG. 14, including but not limited to, the wireless sensor node and the wireline sensor node, sending a report based upon the estimate sweep delay. A processor may respond to the reports to generate an estimated distance approximating the distance T0 of the microwave antenna from the object. Access points and/or servers may include the processor and/or share communications between the sensor nodes and/or the micro-radars and/or the processors.

FIG. 21 shows some other apparatus embodiments that involve the micro-radar 3100, the superheterodyne radar 916 and/or the homodyne radar 918 of FIG. 14, including but not limited to, the wireless sensor node 3600, the wireline sensor node 3650, each of which may send reports 3620 and/or 3620-2 regarding the sweep delay Tm sampled by their respective the micro-radar 3100, the superheterodyne radar 916 and/or the homodyne radar 918, to an access point 3700 and/or a server 3750. A processor 3800, which may be separate from, or included in the access point and/or the server may respond to one or both reports to generate an estimated distance approximating the distance T0 of the relevant microwave antenna 920 or 3120-2 from the object 3020, in this example, a truck 3024.

The wireless sensor node 3600 may include a radio 3630 coupled to a radio antenna 926 to wirelessly communicate 3642 the report 3620 to the access point 3700. As shown in this Figure, the processor 3800 may be included in the access point and configured to use the report 3620 to create the sweep delay Tm, local to the access point and/or the processor. The processor may further be configured to respond to the sweep delay Tm by generating an estimated T0 distance of the microwave antenna to the object 3020. The radio antenna 926 and the microwave antenna 920 may be located near the top of the wireless sensor node 3600, which may be embedded in the pavement 3008.

The wireline sensor node 3650 may not include the second micro-radar 3100-2, second superheterodyne radar 916-2 and/or second homohdyne radar 918-2, but may communicate with it in a fashion similar to that described with regards FIG. 14. The second antenna 3120-2 may or may not be located close to the second micro-radar 3100-2, second superheterodyne radar 916-2 and/or second homohdyne radar 918-2. The wireline sensor node may operate the second micro-radar 3100-2, second superheterodyne radar 916-2 and/or second homohdyne radar 918-2 to generate a second sweep delay Tm corresponding to a second distance T0 of the second antenna from the object 3020. The wireline sensor node may wireline communicate 3652 with the server 3750 and/or the access point 3700. The processor 3800 may be included in the server and may be configured to respond to reception of the second report by generating the second sweep delay Tm. The processor may further respond by generating a second distance estimate T02 based upon the second sweep delay Tm.

FIG. 22 shows some details of at least one of the sensor processor 3000 and/or the processor 3800 may be individually and/or collectively may be implemented as one or more instances of a processor-unit 3820 that may include a finite state machine 3850, a computer 3852 coupled 3856 to a memory 3854 containing a program system 2300, an inferential engine 3858 and/or a neural network 3860. The apparatus may further include examples of a delivery mechanism 3830, which may include a computer readable memory 3822, a disk drive 3824 and/or a server 3826, each configured to deliver 3828 the second program system 2300 and/or an installation package 3809 to the processor-unit 3820 to implement at least part of the disclosed method and/or third apparatus. These delivery mechanisms 3830 may be controlled by an entity 3820 directing and/or benefiting from the delivery 3828 to the processor-unit 3820, irrespective of where the server 3826 may be located, or the computer readable memory 3822 or disk drive 3824 was written.

As used herein, the Finite State Machine (FSM) 3850 receives at least one input signal, maintains at least one state and generates at least one output signal based upon the value of at least one of the input signals and/or at least one of the states.

As used herein, the computer 3852 includes at least one instruction processor and at least one data processor with each of the data processors instructed by at least one of the instruction processors. At least one of the instruction processors responds to the program steps of the second program system 2300 residing in the memory 3854.

As used herein, the Inferential Engine 3858 includes at least one inferential rule and maintains at least one fact based upon at least one inference derived from at least one of the inference rules and factual stimulus and generates at least one output based upon the facts.

As used herein, the neural network 3860 maintains at list of synapses, each with at least one synaptic state and a list of neural connections between the synapses. The neural network 3860 may respond to stimulus of one or more of the synapses by transfers through the neural connections that in turn may alter the synaptic states of some of the synapses.

FIG. 23 shows a flowchart of the program system 3500 of FIG. 21 including at least one of the shown program steps.

Program step 3502 supports operating the micro-radar 3100 by control of the first DAC output 3110 and/or the second DAC output 3112.

Program step 3504 supports calibrating the first DAC output 3110 based upon the duty cycle estimate 3012 to insure the frequency 3162 of the IF signal 3160. Note that this program step may be used to help calibrate the second DAC output 3112, by measuring the duty cycle of the reception signal 3220 with another ADC 3020 input. This program step may by executed every so often, possibly every few seconds or minutes, to compensate for temperature 3125 or other ambient condition changes.

Program step 3506 supports calibrating the second DAC output 3112 to insure the time interval 3350 sweeps between the short delay 3330 and the long delay 3332.

Program step 3508 supports receiving the IF Signal 3106 to generate one or more ADC readings 3016 and/or an estimated sweep delay Tm for the object 3020.

Program step 3510 supports estimating the distance based upon the estimated sweep delay Tm to generate the estimated distance T0 as shown in FIG. 21.

Program step 3510 may be executed by a computer in any of the sensor nodes 3600 and/or 3650, the processor 3800, the access point 3700, and/or the server 3750. However, another approach may be to generate 3512 and send 3514 at least one report 3620 as shown in FIG. 21, which is then used as the basis of response for a system.

Program step 3512 supports generating the report 3620 based upon the one or more ADC readings 3016 and/or the estimate sweep delay Tm.

Program step 3514 supports sending the report 3620, which in various embodiments may be targeted for the access point 3700, the server 3750 and/or the processor 3800. The report may be sent from the wireless sensor node 3600 and/or from the write sensor node 3650. Depending upon the communications technology employed in the sending, the report 3620 may be implemented as one or more packets, frames or encoded in a data stream.

Program step 3516 supports responding to the report 3620 by sending a version of the report to the processor 3800.

Program step 3518 supports a second responding to the report 3620 and/or a version of the report to estimate the distance T0 of the object 3620.

Program step 3520 supports a third responding to the report 3620 and/or a version of the report to estimate the size 3028 of the object 3020, which may be the length of a truck 3024 in some embodiments.

Note that the report 3620 and/or one of the versions of the report may include the distance estimate T0 and/or the size estimate 3028 of the object 3020 in some embodiments.

Program step 3522 supports a fourth responding to the report 3620 and/or a version of the report by updating a system and/or system component. Consider for the moment the systems and/or components shown in FIG. 24.
  Any of the processor 3800, the access point 3700, and/or the server 3750 may be updated.
  In some embodiments, the wireless sensor node 3600 and/or the wireline sensor node 3650 and/or one of the sensor processors 3000 may be updated.
  Also, a traffic monitoring system 3900, a traffic control system 3902, a parking management system 180 and/or a production management system 3906 may be updated.

Returning to FIG. 23, program step 3524 supports compensating for the temperature 3125 shown in FIG. 14 in operating the micro-radar 3100, often by altering the first DAC output 3110 and/or the second DAC output 3112. This supports what the inventor has experimentally found to be the operational reality of the components of the micro-radar, as opposed to the temperature immunity of the antenna output 3122 and the RF reflection 3124 reported by the prior art.

The duty cycle estimate 3012 may be based upon measuring the output of the sharp threshold device 3258 and/or 3268 (for example as a comparator 3280) corresponds directly to the operating point of the RC curve. That means that adjusting the duty cycle higher, moves the operating range of the comparator to a lower (faster moving) part of the RC curve which in turn reduces the IF frequency 3162. It was found out experimentally that operating at a 70% duty cycle corresponds to approximately a 6.5 KHz IF frequency. The first step in the calibration process then is to adjust the DACs 3010 to measure a 70% duty cycle on the output.

The temperature 3125 may affect the IF signal 3160 in a couple of ways. First, the threshold offsets of the sharp threshold devices 3258 and 3268 may vary with temperature causing a time shift between the transmit pulse 3212 and the reception pulse 3222. Second, the noise of the IF signal 3160 may increase as the temperature 3125 increases.

The time shift variation between the transmit pulse 3212 and the reception pulse 3222 may be eliminated by occasionally performing calibration radar sweeps supported by program step 3506, which sample the leading edge of the big bang using the second DAC output 3112 measured during calibration. A feedback loop is implemented in firmware to adjust the DAC such that the leading edge of the big bang is fixed to the same value it had during calibration. The DAC offset from its calibrated value is then filtered (to smooth operation) and applied to the DAC value used during normal operation of the micro-radar 3100.

Eliminating the noise in the IF signal 3160 may not be practical. However, the influence of the extra noise may be used during detection to adjust a detection threshold 3011. While noise increases with increased temperature 3125, the radar return signal, or RF reflection 3124 does not.
  In certain situations, adjusting DAC 3010 thresholds to temperature 3125 may improve sensitivity at low temperatures, which may not be the desired effect.
  Also, as temperatures 3125 lower the micro-radar 3100 might uncover return signals that do not scale with temperature.
  A method for measuring the background noise would allow its effects to be corrected. One method may be to measure temperature 3125 and apply a log scale factor that is linear if noise is measured in decibels (dB).

In order to reduce the power consumption of the micro-radar 3100, the sensor processor only needs to listen for the RF reflection 3124 after the initial Rx/Tx overlapping period, called the big bang.

Adjusting the second DAC output 3112 may advance or delay the reception signal 3220 when compared to the transmit signal 3210. Experimentally it was determined that there is a near linear relationship between the offset time DAC setting and that the leading edge of the big bang. The leading edge of the big bang may act as a useful timing reference, because it is not influenced by the RF reflections 3124 of the micro-radar 3100. Measuring the leading location of the big bang 3352 at two different duty cycles 3012 can support computing the second DAC output 3112 that will set the big bang before the start of the time interval 3350 of the time interval 3300 as shown in FIG. 2B.

The calibration steps 3504 and 3506 create an initial setting of the first DAC output 3110 for the transmit pulse 3212 and the second DAC output 3112 for reception pulse 3222 for use in normal operation and a second setting of the second DAC output that corresponds to setting the leading edge of the big bang at a fixed time location (currently 64 samples). This last value may be used by the temperature compensation algorithm denoted as program step 3524.

The input to the detection algorithm 3526 may be 512 samples at 40 micro-seconds per sample for a total time of 20.48 milliseconds.

In order to improve the signal to noise ratio (SNR) for the detection step 3526, sampling the IF signal 3160 may be divided into time segments, each 32 samples long. It was experimentally found that better results could be obtained if the segments overlap by 16 samples. This leads to one complete scan being split into 31 bins of 32 samples each. The energy of the IF signal in each bin is then computed by first subtracting the average (DC) component of the IF signal and then computing the sum of the squares of the samples. A single average is computed for all bins, based on that part of the sweep that is past the influence of the big bang. In some modes of operation of the sensor processor 3000 may present the value of each bin in dB for test and debugging purposes. For detection 3526, a separate baseline may be computed for each bin. A threshold may then computed based on this baseline.

For motion detection 3526 of the object 3020, often 32 non-overlapping 32 sample bins may be used. Motion is detected by subtracting the raw samples of one radar sweep from a previous sweep. This has a couple of nice features: the average value of the difference is zero so that average need not be computed or subtracted before energy is computed, and the big bang signal present in the data is also subtracted so that the sensitivity is constant across the sweep. For motion detection the detection threshold 3011 may be used for all bins.

Program step 3528 supports operating the first DAC output 3110 and the second DAC output 3112 to insure that the sweep delay Tm corresponds to a specific distance T0.

Program step 3530 supports second operating the first DAC output 3110 and the second DAC output 3112 to insure the IF signal 3160 results from no received RF reflection 3124, so that the IF signal results from the background noise 3354 as shown in FIG. 2B to create the background noise estimate 3013 shown in FIG. 14.

Program step 3532 supports using the background noise estimate 3013 to adjust the detect threshold 3011 shown in FIG. 14. The detect threshold is then used in program step 3526 to detect the object 3020, particularly when it is moving as discussed above.

Figure 24:
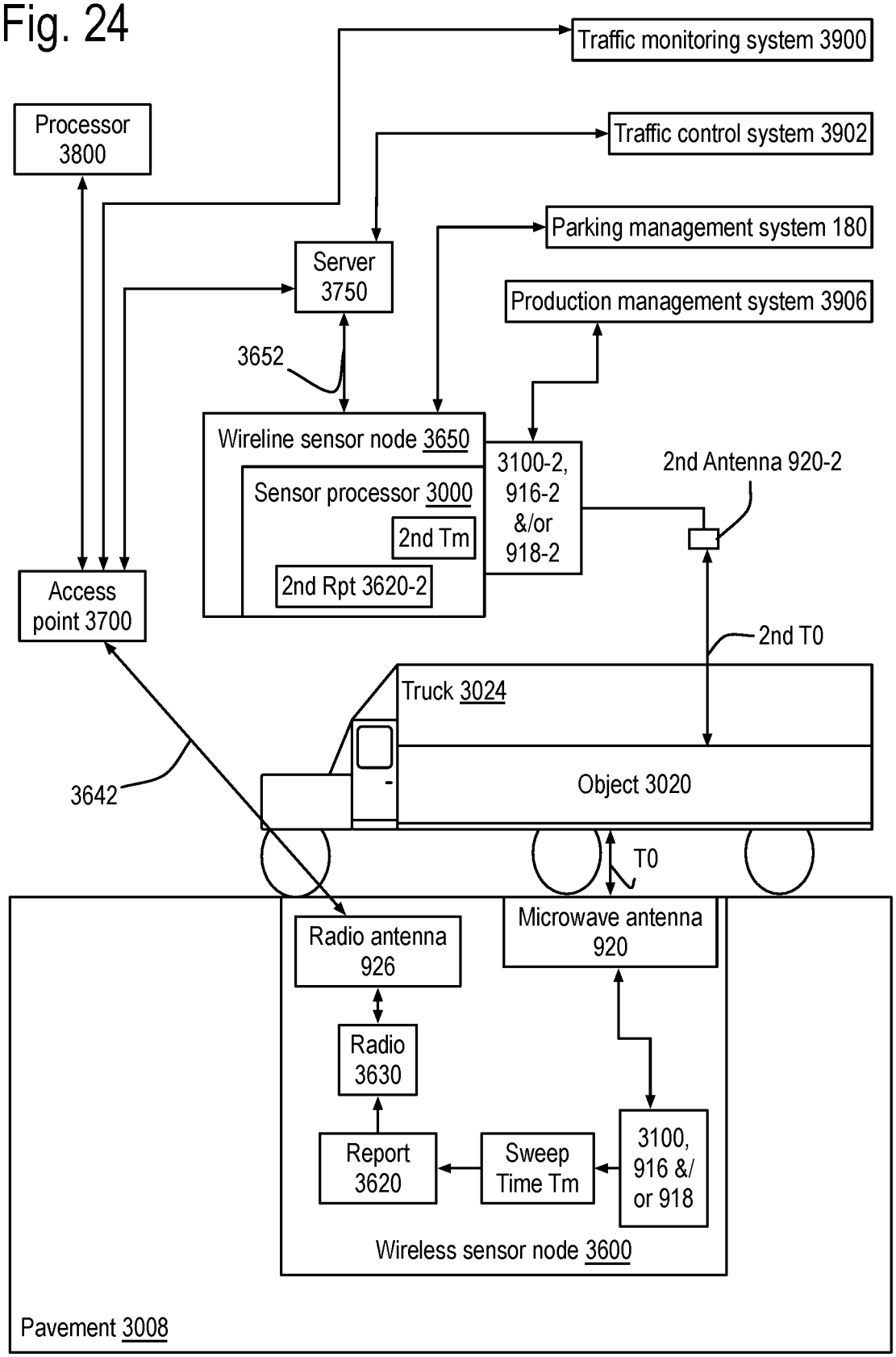
FIG. 24 shows a simplified network diagram of various systems that may communicate with the micro-radars, the superheterodyne radars, and/or the homodyne radars, and/or the wireless sensor node and/or the wireline sensor node and/or the processor and/or the access point and/or the server of FIG. 21. The various systems include but are not limited to a traffic monitoring system, a traffic control system, the parking management system and/or a production management system.

FIG. 24 shows a simplified network diagram of various systems that may include one or more communicative couplings 3642 and/or 3652 to the micro-radar 3100 and/or 3100-2, the superheterodyne radar 916 and/or 916-2, and/or the homodyne radar 918 and/or 918-2 and/or the wireless sensor node 3600 and/or the wireline sensor node 3650 and/or the processor 3800 and/or the access point 3700 and/or the server 3750. The various systems include but are not limited to a traffic monitoring system 3900, a traffic control system 3902, a parking management system 180 and/or a production management system 3906. Note that the second micro-radar 3100-2 may be used to estimate the distance T0 to the object 3020, which may be the surface of a filling 3028 in a chamber of the truck 3024, to determine how full it is of grapes or oranges, for example.

The preceding discussion serves to provide examples of the embodiments and is not meant to constrain the scope of the following claims.

The invention claimed is:

1. An apparatus, comprising: a parking sensor configured to determine a parking position of a vehicle in a parking spot; wherein said vehicle contains, for at least part of the time, an On Board Device (OBD) configured to present a vehicle identification in response to said vehicle parking near said parking spot; and said apparatus further comprising at least one instance of a superheterodyne radar operated to send a report regarding a sweep delay for said vehicle, wherein said sweep delay indicates when an IF signal has a peak amplitude in a sweep in a time for a distance of said vehicle from an antenna.

2. The apparatus of claim 1, further comprising:
a parking processor configured to generate and/or maintain a parking session for said vehicle parked in said parking spot, said parking session including said vehicle identification and an identification of said parking spot.

3. The apparatus of claim 2, further comprising
a parking management configured to respond to said parking session by generating and/or maintaining at least one of a parking permit, a parking payment, a parking reservation, and/or a parking ticket.

4. The apparatus of claim 3, further comprising at least one of
said OBD implemented by at least one of a cell phone, a tablet computer, a wearable device, a media player, said vehicle, and/or a vehicle processor;

said parking sensor including at least one of at least part of an infrared sensor, an ultrasonic sensor and/or a radar adapted to at least partly determine said parking position;

said parking processor adapted to access and/or include a parking session memory containing said parking session; and/or said parking management including at least one management processor configured to generate and/or maintain at least one of said parking permit, said parking payment, said parking reservation, and/or said parking ticket.

5. The apparatus of claim 4, further comprising at least one of
said OBD including at least one of an accelerometer and/or a motion sensor configured to at least partly indicate said vehicle is parked;

said radar implemented as at least one of a micro-radar adapted to output less than or equal to ten milliwatts, a Zero Intermediate Frequency (ZIF) radar, and said superheterodyne radar.

6. The apparatus of claim 3, further comprising at least one of:
a wireless sensor node and/or a wireline sensor node, each configured to operate at least one instance of said superheterodyne radar to send said report regarding said sweep delay; and/or a second processor configured to receive and to respond to said report by generating an estimate of said distance of said vehicle from said superheterodyne radar; and/or an access point configured to wirelessly communicate with said superheterodyne radar via said radio transceiver to send a version said report to said processor; and/or a server configured to communicate said version of said report from said superheterodyne radar to said processor.

7. The apparatus of claim 6, wherein said wireless sensor node and/or said wireline sensor node further comprises said processor coupled to said superheterodyne radar to provide said stimulus.

8. The apparatus of claim 6, wherein at least one of said processor, said access point, said server and/or said sensor processor includes at least one instance of at least one of a finite state machine and a computer accessibly coupled to a memory containing a program system comprised of program steps configured to instruct said computer.

9. The apparatus of claim 8, wherein said program system comprises at least one of the program steps of:
operating said superheterodyne radar to control said compression ratio and said IF signal;

receiving an ADC reading based upon said IF signal and/or said sweep delay for said object;

generating said report based upon said ADC reading and/or said sweep delay;

responding to said report by sending said version of said report to said second processor;

second responding to said report and/or said version to generate said distance of said object from said superheterodyne radar;

third responding to said distance of said object from said superheterodyne radar by updating at least one of a traffic monitoring system, a traffic control system, a parking management system, and/or a production management system;

second operating said superheterodyne radar to insure said sweep delay Tm corresponds to a specific distance T0 of said object;

third operating said superheterodyne radar to generate said IF signal dominated by a background noise to create a background noise estimate;

using said background noise estimate to adjust a detect threshold of said object; and/or detecting said object based upon said ADC reading and said detect threshold.

10. The apparatus of claim 9, wherein the program step of operating said superheterodyne radar further comprises at least one of the program steps of controlling a first DAC output and a second DAC output to generate said sweep delay for said object;

setting said second DAC output to generate said IF signal for said background noise to dominate; and calibrating said first DAC output to establish said IF frequency.

11. The apparatus of claim 9, further comprising:

at least one of said traffic monitoring system, said traffic control system, said parking management system, and/or said production management system is adapted to communicate with at least one of said superheterodyne radar, said wireless sensor node, said wireline sensor node, said second processor, said access point and/or said server.

12. The apparatus of claim 9, wherein said antenna output is compliant with an Ultra-Wide Band (UWB) signal protocol.

13. The apparatus of claim 9, wherein said IF signal has a frequency of between 6 Kilo (K) Hertz (Hz) and 7 KHz.

14. The apparatus of claim 9, wherein said compression ratio is about one million.

15. The apparatus of claim 14, wherein said compression ratio is one million to within twenty percent.

16. The apparatus of claim 1, wherein said vehicle includes at least one of a bicycle, a motorcycle, an automobile, a truck, a bus, a trailer, and/or an aircraft.

* * * * *